(12) United States Patent
Hanuschik et al.

(10) Patent No.: US 12,193,120 B2
(45) Date of Patent: Jan. 7, 2025

(54) UNIVERSAL APPLIANCE INTERFACE

(71) Applicant: One Hearth, Inc., Sunnyvale, CA (US)

(72) Inventors: Michael Hanuschik, Sunnyvale, CA (US); Peng Chau Quah, Kirkland, WA (US)

(73) Assignee: One Hearth, Inc., Sunnyvale, CA (US)

( * ) Notice: Subject to any disclaimer, the term of this patent is extended or adjusted under 35 U.S.C. 154(b) by 0 days.

(21) Appl. No.: 18/640,998

(22) Filed: Apr. 19, 2024

(65) Prior Publication Data

US 2024/0373512 A1    Nov. 7, 2024

Related U.S. Application Data

(60) Provisional application No. 63/604,771, filed on Nov. 30, 2023, provisional application No. 63/541,619, filed on Sep. 29, 2023, provisional application No. 63/468,969, filed on May 25, 2023, provisional application No. 63/468,967, filed on May 25, 2023, provisional application No. 63/460,820, filed on Apr. 20, 2023, provisional application No. 63/460,817, filed on Apr. 20, 2023, provisional application No. 63/460,819, filed on Apr. 20, 2023.

(51) Int. Cl.
| | |
|---|---|
| *H05B 1/02* | (2006.01) |
| *G09B 19/00* | (2006.01) |
| *H05B 6/06* | (2006.01) |
| *H05B 6/12* | (2006.01) |

(52) U.S. Cl.
CPC ....... *H05B 1/0222* (2013.01); *G09B 19/0092* (2013.01); *H05B 1/0266* (2013.01); *H05B 6/062* (2013.01); *H05B 6/1209* (2013.01)

(58) Field of Classification Search
CPC .... H05B 1/0222; H05B 6/062; H05B 1/0266; H05B 6/1209; G09B 19/0092
USPC ....... 219/650, 620, 621, 625, 626, 627, 635, 219/663, 664, 665, 666, 667, 391, 411, 219/413, 414, 429, 432, 443, 449, 452, 219/453, 464
See application file for complete search history.

(56) References Cited

U.S. PATENT DOCUMENTS

| | | |
|---|---|---|
| 2003/0218002 A1 | 11/2003 | Fulton |
| 2007/0221668 A1 | 9/2007 | Baarman |
| 2016/0014849 A1* | 1/2016 | Hegedis ............... G01K 1/143 |
| | | 219/627 |
| 2016/0235239 A1 | 8/2016 | Patadia |
| 2017/0139385 A1 | 5/2017 | Young |
| 2018/0116457 A1 | 5/2018 | Mills |

(Continued)

FOREIGN PATENT DOCUMENTS

| | | |
|---|---|---|
| EP | 2592974 | 9/2019 |
| KR | 20230165613 | 12/2023 |

OTHER PUBLICATIONS

Kim, Machine translation of "Smart cooking device and recipe information generation method therefor", KR-20230165613, May 27, 2022, 59 pages.

*Primary Examiner* — Quang T Van

(74) *Attorney, Agent, or Firm* — Van Pelt, Yi & James LLP

(57) ABSTRACT

Providing a universal cooking interface that is adaptive to the context of different types of cookware includes recognizing a type of a cookware object that is in a presence of a cooking device. It further includes adapting a contextual user interface of the cooking device based on the recognized type of the cookware object.

18 Claims, 45 Drawing Sheets

(56) References Cited

U.S. PATENT DOCUMENTS

| | | | |
|---|---|---|---|
| 2019/0125120 A1* | 5/2019 | Jenkins | F24C 15/105 |
| 2023/0031545 A1 | 2/2023 | Oleynik | |
| 2023/0040750 A1 | 2/2023 | Ciepiel | |
| 2024/0180209 A1 | 6/2024 | Bentley | |

* cited by examiner

622

636
Light Diffuser
632
Light Guide

634 — Light Strip

Light

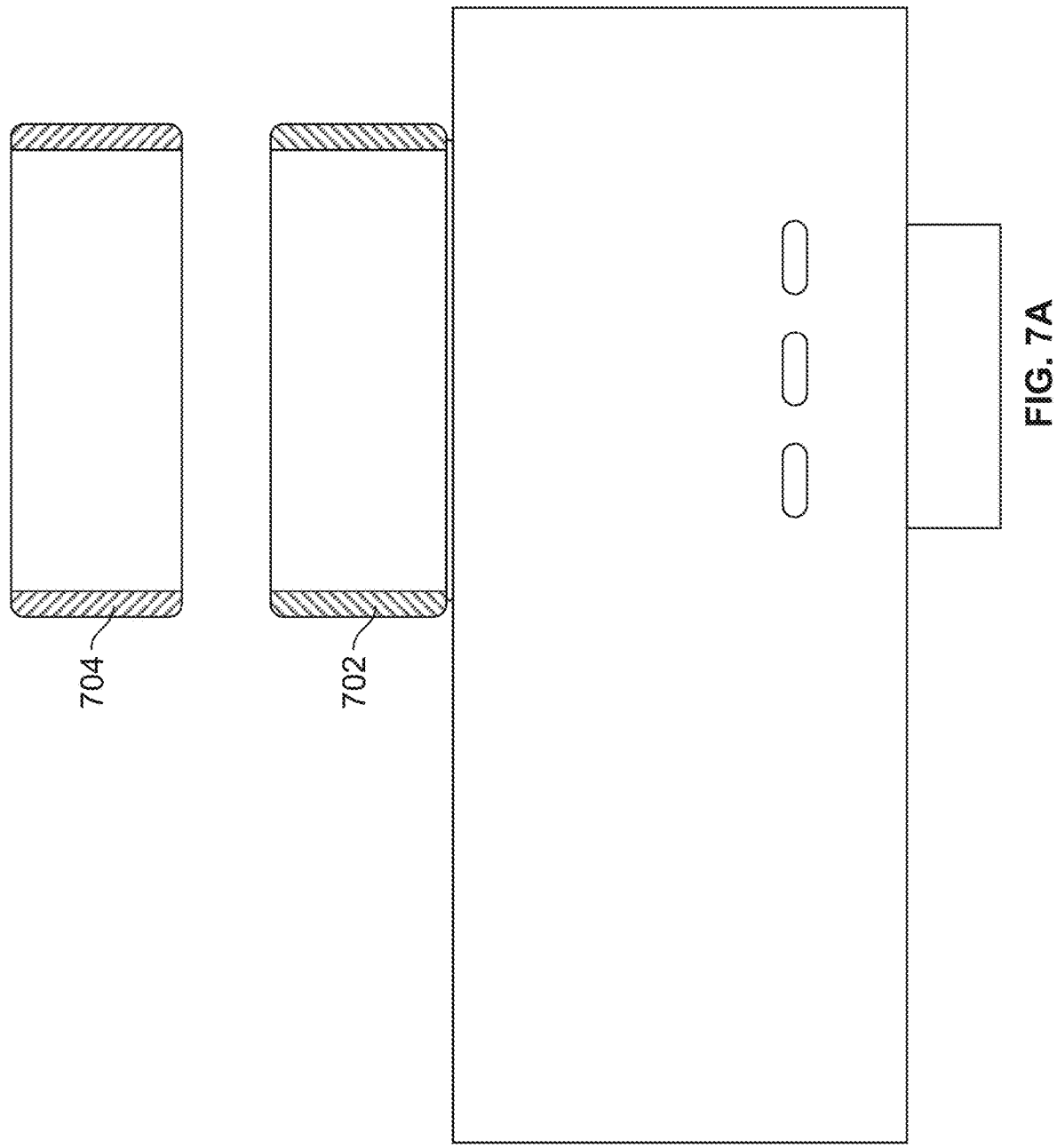

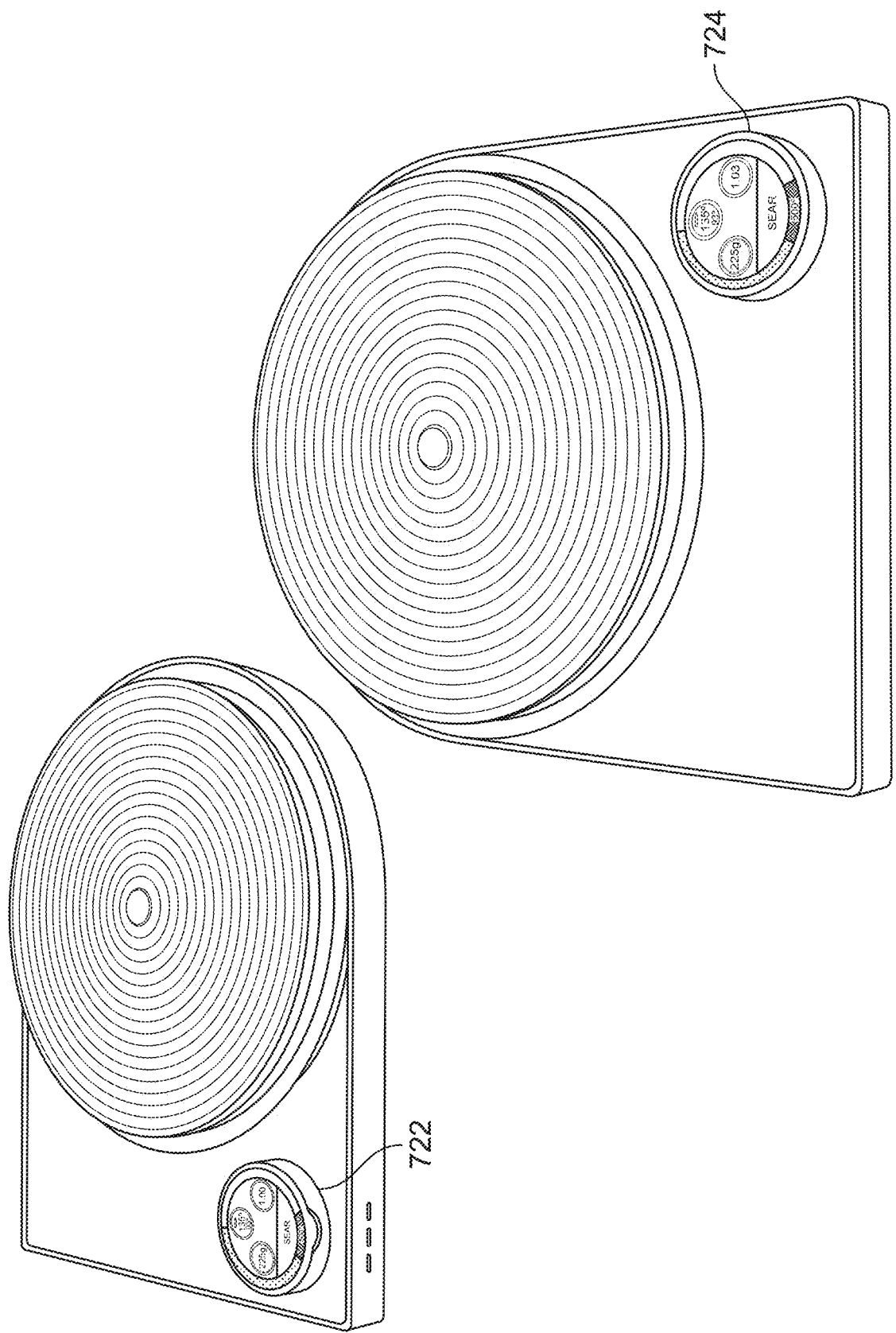

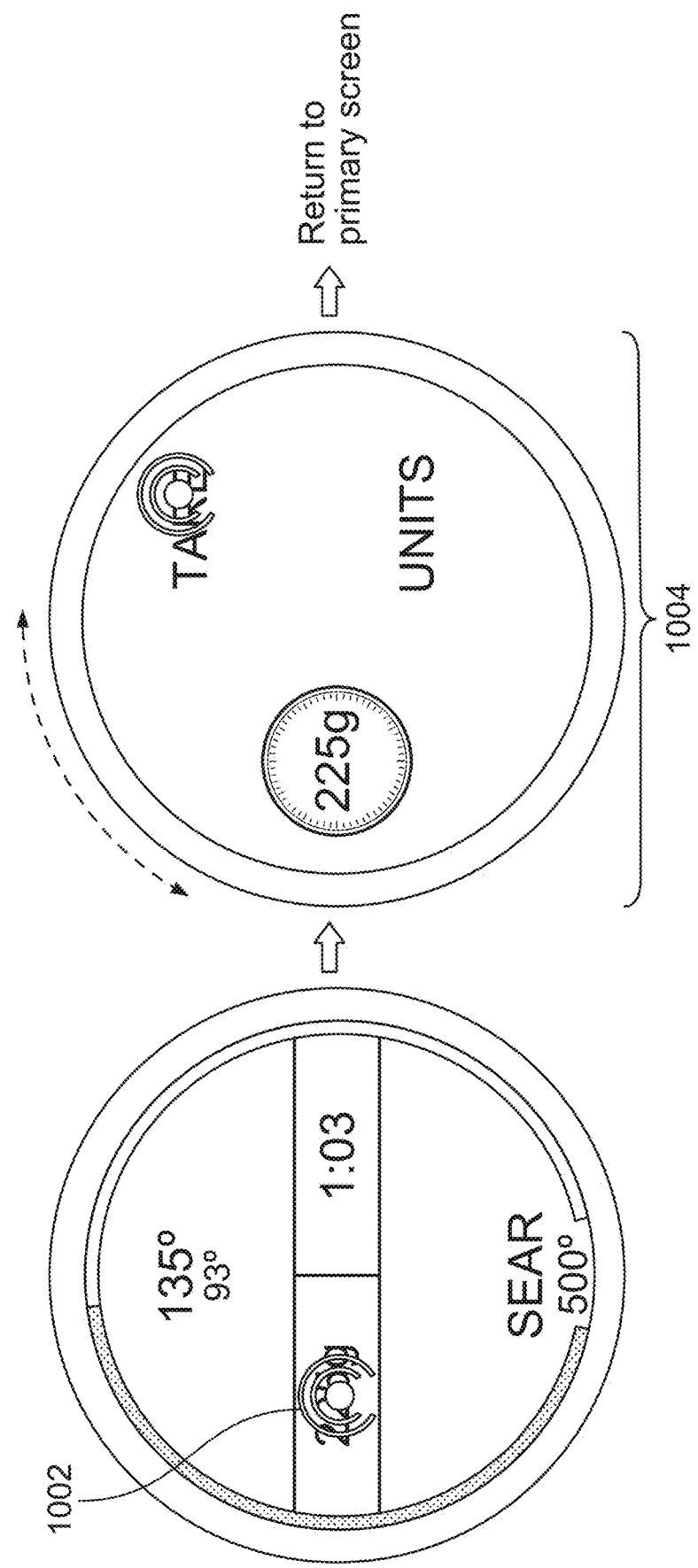

| Non-Stick Pan/ SS Pan | Temperature pre-set (°F) | Temperature Range (°F) | Speed |
|---|---|---|---|
| SIMMER | 206 | 198-210 | F |
| SWEAT | 253 | 248-266 | M |
| TOAST | 284 | 248-356 | M |
| FRY | 230 | 203-230 | F |
| MELT | 113 | 95-122 | S |
| SAUTE | 356 | 266-392 | F |
| SEAR | 450 | 392-480 | F |
| <EXIT> | | | |

FIG. 14A

| Multi-cooker | Temperature pre-set (°F) | Temperature Range (°F) | Speed |
|---|---|---|---|
| RICE | - | - | |
| LO PRESSURE | - | - | |
| HI PRESSURE | - | - | |
| YOGURT | 108 | 108-112 | M |
| SOUS VIDE | 145 | 115-183 | F |
| KEEP WARM | 170 | 160-200 | M |
| SLOW COOK | 206 | 206-210 | M |
| STEAMER | 220 | 212-248 | F |
| DEEP FRY | 350 | 325-375 | F |
| SAUTE | 356 | 266-392 | F |
| <EXIT> | | | |

| RICE Menu |
|---|
| SUSHI |
| PORRIDGE |
| SWEET |
| WHITE |
| BROWN |
| MIXED |
| QUICK COOK |

FIG. 14B

| Non 1H cookware | Temperature pre-set (°F) | Temperature Range (°F) |
|---|---|---|
| LOW | 108 | 77-140 |
| WARM | 170 | 141-200 |
| SIMMER | 225 | 201-250 |
| MEDIUM | 260 | 251-280 |
| SAUTE | 300 | 281-320 |
| MED HI | 350 | 321-375 |
| HI | 400 | 376-430 |
| FRY SEAR | 455 | 431-482 |
| <EXIT> | | |

FIG. 14D

| Input | | Measurements/ data | Insight/ Application |
|---|---|---|---|
| Onboard Sensors | Temperature - Center contact | Ambient/ Cookware | Accurate cookware temperature, cooking stage, altitude, thermal mass, cookware thermal properties, ingredient doneness |
| | Temperature - Under glass hot spot | Cookware | Cookware temperature distribution, heating evenness, ingredient position |
| | Temperature - Probe | Ingredient internal | Internal temperature of ingredient like meat |
| | | Heating medium (water/oil) | Water (Sour Vide), Deep frying oil |
| | Weight - Load cell | Ingredient | Amount/quantity, thermal mass (combined with temperature) |
| | | Weight loss | Reduction, evaporation, frying doneness |
| | | User actions | Stirring, Basting, Flipping, Adding, removing |
| | Sound - Acoustic (Transmitter and Receiver) | Culinary/Thermo-Acoustic | Water phase change (boiling, steaming), browning, burning, Pressurization (steam release), types of boiling (liquid density), ingredient doneness |
| | | User actions | Stirring, Flipping |
| | | Cookware resonance | Cookware recognition, Cookware thermal properties |
| | Sound - microphone | Ambient sound | Background sound filtering (for acoustic transmitter/receiver) |
| | | Speech | Speech-to-text (recipe, ingredient, steps, comment) |
| | Induction | Actual Power Level | Amount heat/ energy supplied |
| | | Impedance | Material properties, cookware recognition, Cookware thermal properties, cooking state(boiling or other time-varying change from evaporation or food cooking) |
| | | Operating frequency | Material properties, cookware recognition, Cookware thermal properties |

FIG. 15A

| Input | | Measurements/ data | Insight/ Application |
|---|---|---|---|
| Built-in UI | Smart Dial | Level Setting | High, Medium, Low |
| | | Temperature Setting | Temperature fine tuning, adjustment |
| | | Cooking Technique | Cooking profile, context, temperature setting, user intent |
| | | Start/ Stop | Interruption |
| | | Weighing Scale Taring | Recipe, user intent |
| | | Timer setting | Recipe, user intent |
| | | Probe Temperature Setting | Temperature fine tuning, adjustment |

FIG. 15B

| Input | | Measurements/ data | Insight/ Application |
|---|---|---|---|
| Mobile Device with App | Microphone | Ambient Sound | Background sound filtering (for contact acoustic) |
| | | Speech | Speech-to-text (recipe, ingredient, steps, comment) |
| | | Cooking Sound | Additional dimension of culinary acoustic |
| | Camera | Ingredient | Ingredient recognition, ingredient size, cooking state |
| | | User action | Stirring, Basting, Flipping, Adding, removing |
| | | Location | Context, Altitude |
| | App | Usage | Recipe, cooking style, cooking profile |
| | | Preference | User input, intent, Context |

FIG. 15C

| Pan PID coefficients | Classic | Pessen | Some over | No over |
|---|---|---|---|---|
| Proportional (P) | 5.76 | 6.72 | 3.168 | 1.92 |
| Integral (I) | 0.350 | 0.280 | 0.350 | 0.350 |
| Derivative (D) | 0.088 | 0.105 | 0.231 | 0.231 |

Stainless pan 1

| | Classic | Pessen | Some over | No over |
|---|---|---|---|---|
| P | 3.6 | 4.2 | 2 | 1.2 |
| I | 6.3 | 5 | 6.3 | 6.3 |
| D | 1.6 | 1.9 | 4.1 | 4.1 |

Stainless pan 2 — 1902  /  SS pan 2 with water — 1904

| | Classic | Pessen | Some over | No over | Punstable/time | Classic | Pessen | Some over | No over |
|---|---|---|---|---|---|---|---|---|---|
| P | 8.4 | 9.8 | 4.6 | 2.8 | 14 | 8.4 | 9.8 | 4.6 | 2.8 |
| I | 0.2 | 0.1 | 0.2 | 0.2 | 0.2 | 0.1 | 0.1 | 0.1 | 0.1 |
| D | 0 | 0.1 | 0.1 | 0.1 | 0 | 0 | 0 | 0.1 | 0.1 |

Pot 1 / Pot with water

| | Classic | Pessen | Some over | No over | Punstable/time | Classic | Pessen | Some over | No over |
|---|---|---|---|---|---|---|---|---|---|
| P | 5.3 | 6.2 | 2.9 | 1.8 | 8.9 | 5.3 | 6.2 | 2.9 | 1.8 |
| I | 0.9 | 0.3 | 0.4 | 0.4 | 0.4 | 0.2 | 0.2 | 0.2 | 0.2 |
| D | 0.1 | 0.1 | 0.3 | 0.3 | 0 | 0 | 0.1 | 0.1 | 0.1 |

FIG. 19

| Time since start(mm:ss.ms) | Thermal_1 (C) | Thermal_2 (C) | Thermal_3 (C) | SetPoint (C) | Weight (Total) | Weight delta(g) | Stir detected | Browning % detected | Flip detect | Removal detect | Device state | PANID |
|---|---|---|---|---|---|---|---|---|---|---|---|---|
| 00:00.0 | 18.32 | 18.32 | 18.32 | 20 | 0 | 0 | | 0 | FALSE | FALSE | ON | null |
| 00:10.0 | 68.32 | 58.32 | 59.32 | 100 | 1000 | 1000 | FALSE | 0 | FALSE | FALSE | ON | A |
| 00:30.0 | 100 | 98 | 99 | 100 | 1250 | 250 | FALSE | 0 | FALSE | FALSE | ON | A |
| 00:40.0 | 100 | 100 | 100 | 100 | 1250 | 0 | TRUE | 10 | FALSE | FALSE | ON | A |
| 07:00.0 | 98 | 100 | 99 | 100 | 1200 | -50 | FALSE | 85 | TRUE | FALSE | ON | A |
| 07:10.0 | 100 | 100 | 100 | 100 | 1200 | 0 | FALSE | 15 | FALSE | FALSE | ON | A |
| 12:10.0 | 100 | 100 | 100 | 100 | 1150 | -50 | FALSE | 90 | FALSE | FALSE | ON | A |
| 12:25.0 | 55 | 55 | 55 | 40 | 1150 | 0 | FALSE | 0 | FALSE | FALSE | OFF | A |
| 12:45.0 | 40 | 40 | 40 | 40 | 1010 | -140 | FALSE | 0 | FALSE | TRUE | OFF | null |

FIG. 24

- User turns on device
- User sets to 100C cooking temp
- After 30 seconds of preheating, user adds 250g protein ⟋ 2502
- After 10 more seconds the user stirs
- After 7 minutes, protein is getting brown, and is flipped
- After 6 more minutes, the protein other side is brown
- The user sets the temperature down to warm
- After 35 seconds of keeping warm, the user transfers the cooked protein to a plate

FIG. 25

UNIVERSAL APPLIANCE INTERFACE

CROSS REFERENCE TO OTHER APPLICATIONS

This application claims priority to U.S. Provisional Patent Application No. 63/460,817 entitled UNIVERSAL APPLIANCE INTERFACE filed Apr. 20, 2023 which is incorporated herein by reference for all purposes, and claims priority to U.S. Provisional Patent Application No. 63/460,819, entitled INDUCTION-BASED EMULATION OF GAS HEATING filed Apr. 20, 2023 which is incorporated herein by reference for all purposes, and claims priority to U.S. Provisional Patent Application No. 63/460,820, entitled RECIPE RECORDING, REPLAY, AND AUTOMATION filed Apr. 20, 2023 which is incorporated herein by reference for all purposes, and claims priority to U.S. Provisional Patent Application No. 63/468,967, entitled UNIVERSAL APPLIANCE INTERFACE filed May 25, 2023 which is incorporated herein by reference for all purposes, and claims priority to U.S. Provisional Patent Application No. 63/468,969, entitled RECIPE RECORDING, REPLAY, AND AUTOMATION filed May 25, 2023 which is incorporated herein by reference for all purposes, and claims priority to U.S. Provisional Patent Application No. 63/541,619, entitled INTELLIGENT INDUCTION COOKING SYSTEM filed Sep. 29, 2023 which is incorporated herein by reference for all purposes, and claims priority to U.S. Provisional Patent Application No. 63/604,771, entitled SENSING SYSTEM FOR COOKWARE AND COOKWARE CONTENT filed Nov. 30, 2023 which is incorporated herein by reference for all purposes.

BACKGROUND OF THE INVENTION

Cooking can be a complex, multi-step process, requiring extensive knowledge of cookware, ingredients, various cooking techniques, as well as how and when to apply them. As such, navigating the cooking process can be challenging.

BRIEF DESCRIPTION OF THE DRAWINGS

Various embodiments of the invention are disclosed in the following detailed description and the accompanying drawings.

FIG. 7A illustrates an embodiment of a user interface element.

FIG. 7B illustrates embodiments of a cooking system in left and right-hand configurations.

FIG. 10 illustrates an embodiment of a weighing scale function.

FIG. 14A illustrates an embodiment of available cooking techniques for a non-stick pan.

FIG. 14B illustrates an embodiment of available cooking techniques for a multi-cooker.

FIG. 14D illustrates an embodiment of a default cooking technique menu configuration profile for non-registered cookware.

FIG. 15A illustrates an embodiment of insights determined from input sensor data.

FIG. 15B illustrates examples of cooking insights derived from user interface measurements.

FIG. 15C illustrates embodiments of cooking insights derived from measurements collected by an external device.

FIG. 19 illustrates examples of control loop parameters customized for different types of cookware.

FIG. 24 illustrates an embodiment of a log of sensor events.

FIG. 25 illustrates an embodiment of a transcription of recipe steps and events.

DETAILED DESCRIPTION

Figure 1:
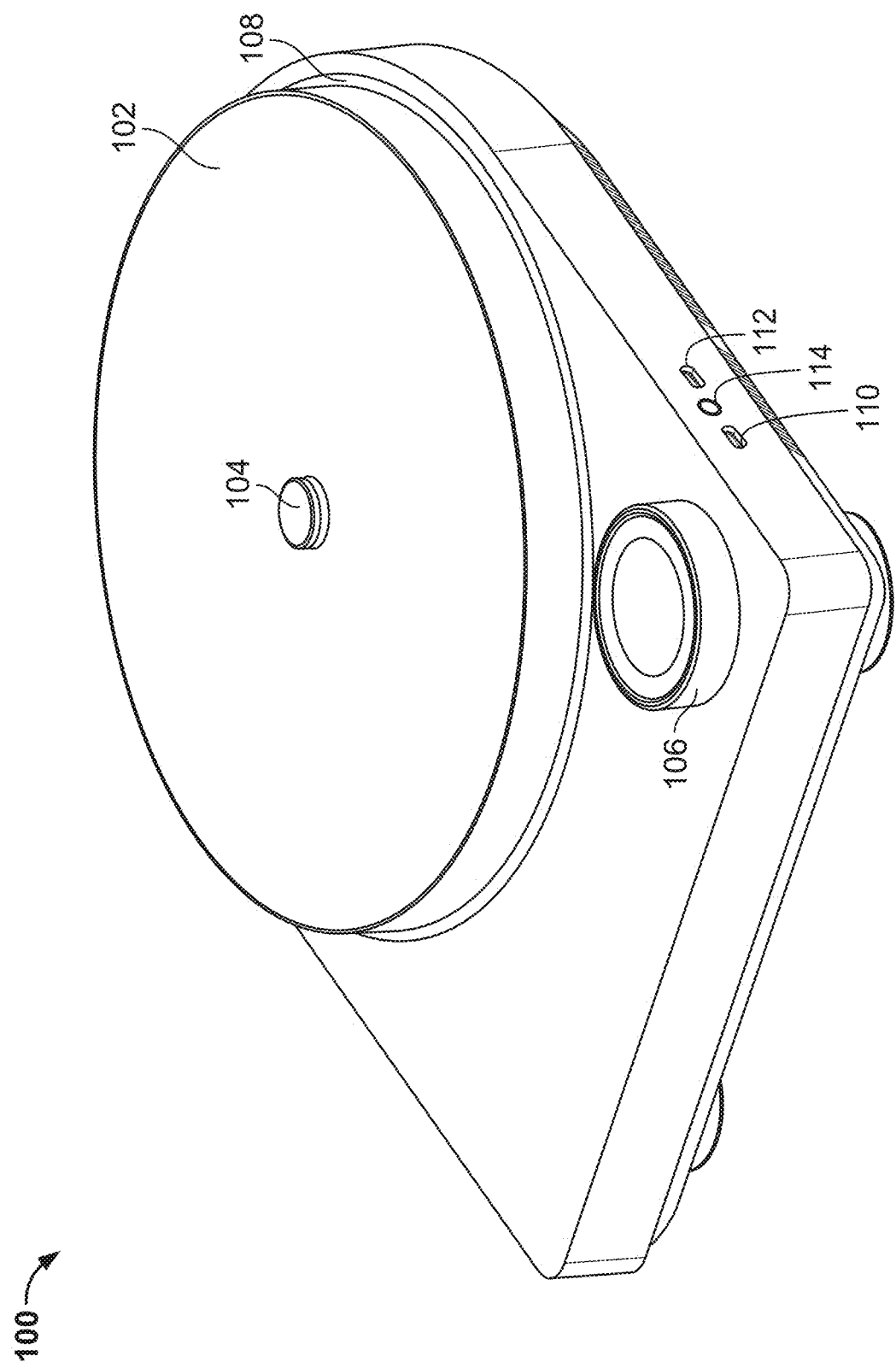
FIG. 1 illustrates an embodiment of an induction cooking device.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The following are embodiments of an intelligent induction cooking system. Embodiments of the intelligent induction cooking system described herein provide an integrated cooking system that integrates induction heating, detection of cookware, sensor measurements, app control, etc. to optimize the cooking experience. For example, compared to existing cooking systems, embodiments of the integrated induction cooking system described herein provide an improved cooking user experience by integrating cookware detection to determine dynamic, contextual user interfaces (UIs) to provide users information and prompts (e.g., what type of cooking techniques are available, available results of the food being cooked, etc.) that adapt to the type of cookware being used. This includes generating user interfaces customized for the type of cookware that is detected as being present. As another example, the integrated system, by integrating cookware detection with various sensor measurements and induction coil control, provides closed loop temperature control that both accurately and efficiently modulates power delivery from the induction coil to the cookware to provide predictable and repeatable cooking results and user experiences. As yet another example, the intelligent induction cooking system described herein, by integrating sensor measurements, cookware detection, user inputs, induction coil control, etc., facilitates automated cooking features, such as recipe recording and replication of recorded recipes on other induction cooking devices.

FIG. 1 illustrates an embodiment of an induction cooking device. In some embodiments, induction cooking system 100 includes one or more induction coils. In some embodiments, the induction cooking device includes multiple rings of coils with independent control. While embodiments involving an induction cooktop system are shown and described herein for illustrative purposes, the induction system described herein can also take other forms, such as a built-in induction cooking system.

In this example, the induction coils are located under top plate 102. As one example, the top plate is made of a material such as glass ceramic. Cookware, when being used, is placed on top plate 102. In some embodiments, the system includes cookware alignment, centering, or securing features (e.g., dimples, rings, etc.). Examples of such alignment, centering, and securing features include recesses in the top plate to accept protruding dimples on the bottom of cookware, a protruding ring on cookware that slots into a corresponding recessed ring in the top plate, a combination of rings/dimples/recesses, dimples with electrical connections, dimples/rings with electrical and/or magnetic connections, etc.

In some embodiments, induction cooking device 100 further includes multiple sensors, such as integrated or onboard sensors. Examples of sensors include temperature sensors and weight sensors. In this example, a temperature probe or sensor protruding from the center of the top plate is shown at 104. Further embodiments and details regarding sensors are described below. In some embodiments, the system includes an integrated accurate weighing scale. As one example, the weighing scale is integrated with the top plate of the system. Further details regarding temperature and weighing sensors are described below.

In some embodiments, induction cooking device 100 includes a variety of interfaces, such as those to provide or receive information. As one example, the induction cooking device includes dial 106. In this example, the dial is an example of a physical interface by which a user can control the operation of the cooking device. While an example of a dial is described herein for illustrative purposes, the cooking system can be adapted to accommodate other types of user controls, such as sliders, knobs, etc.

In some embodiments, the dial includes a screen via which information pertaining to cooking is presented, and via which user inputs can also be received. In some embodiments, the dial includes various mechanisms and controls via which the user can make selections to control the operation of the cooking device. As one example, the screen of the dial is a touchscreen (e.g., capacitive touchscreen). In some embodiments, the dial includes a rotational ring, which a user can rotate to adjust their selection of an item presented in the user interface (displayed in the screen of the dial). In some embodiments the dial can be pushed down to make a selection.

In some embodiments, the dial is an intelligent dial that is used as a main or primary control element of the induction cooking system. For example, as described above, input is provided via rotating the ring, pressing down on the dial, touching on the touch screen display, etc. In other embodiments, the system is also controllable via voice commands with voice feedback through an integrated microphone and speaker.

Further details regarding the physical design of the dial are described below. As will be described in further detail below, in some embodiments, the user interface provided via the display of the dial is a contextual user interface that adapts to various contexts. For example, the user interfaces displayed via the dial are adapted to the type of cookware that is being detected as being utilized. In this way, a universal interface is provided in which the user interface automatically adapts to what cookware is being utilized (rather than requiring each different type of cookware to have its own interface). This allows the system to be used to replace multiple standalone kitchen and cooking appliances (e.g., slow cooker, instant pot, rice cooker, etc.). Further details regarding embodiments of such a contextual user interface are described below.

In the example of FIG. 1, the induction cooking device further includes a light ring 108. For example, the light ring is a ring of lights (e.g., LED (light-emitting diode) ring) that is used to produce light of various color and intensity. As one example, the color and intensity of the light is controlled to visually present an indication of temperature (e.g., of the cookware). As another example, the color and intensity of the light produced by the light ring is controlled to emulate a look and feel of a radiant heating source such as a flame of a gas stove. For example, having the light ring on generates a glowing effect with reflection on cookware that is on the cooking system.

Other example interfaces shown in FIG. 1 include various ports, such as USB-C ports 110 and 112, as well as a 3.5 mm audio jack 114. The device may include any other number of ports or interfaces as appropriate. In some embodiments, the system includes built in or integrated speakers and microphones. In some embodiments, microphones of the system are also usable as acoustic sensors.

The following are embodiments of a housing for the induction cooking system described herein. In some embodiments, the housing is designed for service and refurbishment (and is robust for disassembly). In some embodiments, the housing is recyclable. In some embodiments, the housing is made from a single material. In some embodiments, the housing and overall dimensions of the system are compact, stable, and are designed for desirable acoustic properties, such as when used in conjunction with fans (e.g., internal cooling fans, further details of which are described below).

Figure 2:
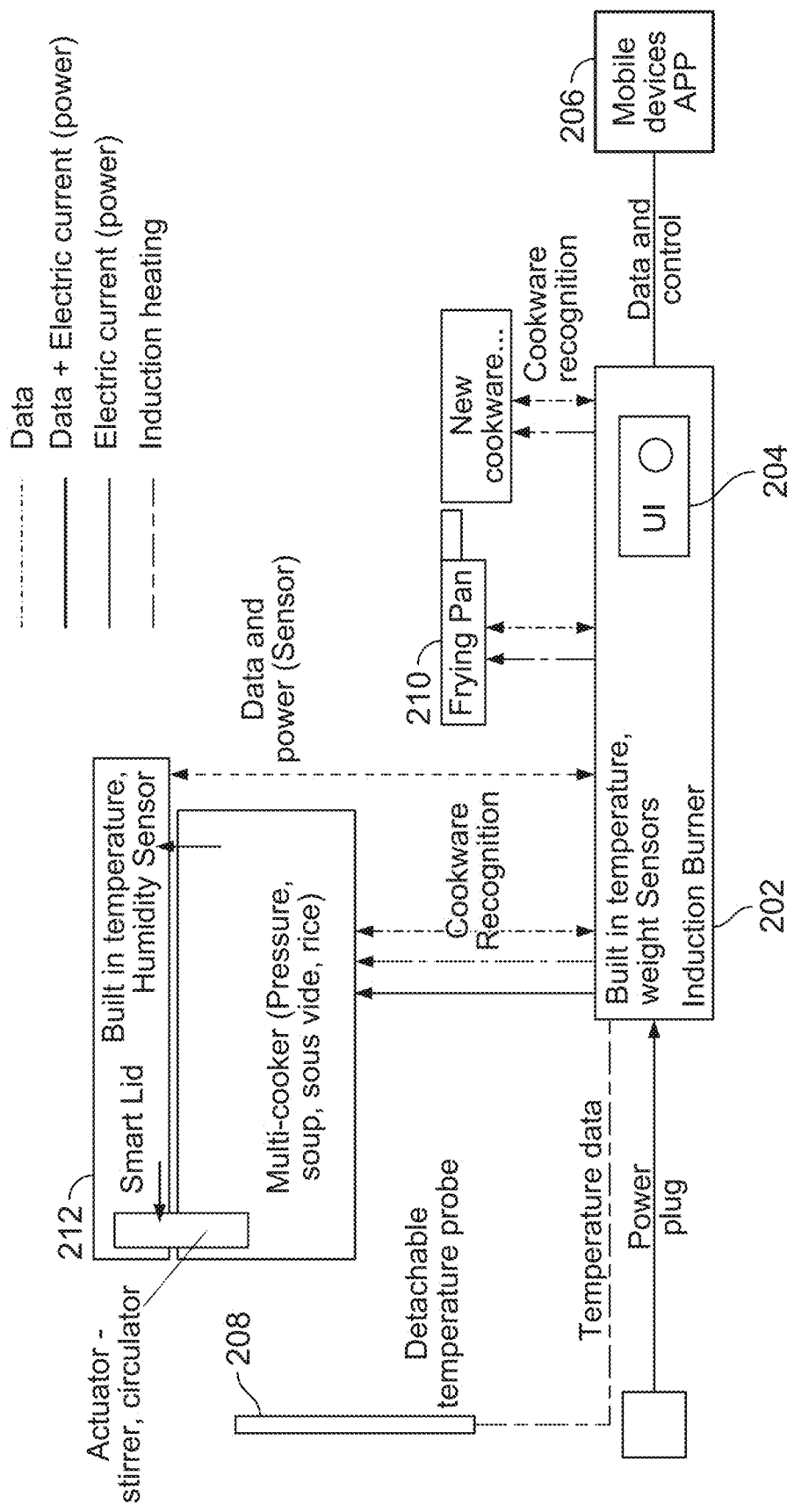
FIG. 2 illustrates an embodiment of an induction cooking system.

FIG. 2 illustrates an embodiment of an induction cooking system. In this example, induction burner 202 is a system diagram of an induction cooking device such as induction cooking device 100. As shown in this example, the cooking system is an integrated cooking system that includes induction burner(s), sensors, external control (e.g., via a mobile app), etc.

In this example, the induction burner 202 includes user interface (204), such as that provided by dial 106 of device 100 of FIG. 1.

As shown in this example, induction burner system 202 further supports various types of connectivity/communications interfaces, such as Wi-Fi, Bluetooth, etc. Hardware for such wireless connectivity may be upgradeable. As another example, the device includes a hardwire network connection, such as Ethernet. In this example, the induction system 202 further supports connectivity with an external application or device, such as an app installed on a mobile device 206. The connectivity between the induction burner system 202 and the mobile device 206 can be both wireless and/or wired, such as over Wi-Fi, via a direct connection such as Bluetooth, over a wired connection such as USB-C, etc.

In various embodiments, the system connects with the mobile app installed on the mobile device (e.g., smartphone) to expand control options and automation, including OTA (over-the-air) updates, recipe download, additional customization and control, changing burner settings, registering new third-party cookware, etc.

In some embodiments, the mobile app is a ChatGPT (or any other chatbot, as appropriate) powered app. In some embodiments, the mobile app is configured to, in conjunction with the mobile device hardware and capabilities, perform remote monitoring and control of the induction cooking system. The mobile app is configured to provide guided recipes. The mobile app is also configured to record recipes. In some embodiments, users are able to browse feeds via the mobile app.

In some embodiments, the mobile app facilitates user input. In some embodiments, the mobile app accesses or interfaces with hardware capabilities and functionality of the hardware device on which it is running, such as cameras, speakers, microphones, etc.

In some embodiments, a mobile app is installed on a mobile device such as a smartphone, where the mobile app is configured to utilize sensors such as cameras of the mobile device. In some embodiments, a stand is utilized in conjunction with the cooking system to facilitate positioning of the mobile device. In various embodiments, the mobile app, using hardware (e.g., camera, speaker, microphone, etc.) of the mobile device, as well as artificial intelligence, facilitates:

guided recipe assistance (to understand where the user is in the cooking process and guide them along)
recipe recording
automated recipe creation
determining when cooking of ingredients is complete (e.g., pancakes, steak, grilled cheese, boiling water, etc.)
seasoning of the pan
safety issue detection (e.g., smoke, flame, etc.)

In this example, the induction burner includes various built-in temperature and weight sensors. For example, the induction cooking system includes multiple temperature sensors to measure the temperature of the cookware being utilized (e.g., to measure cookware surface temperature). In some embodiments, the induction burner system 202 further supports connection to other sensors, such as detachable temperature probe 208 (which can be plugged in via the USB-C connections described above). One example of such a detachable/attachable temperature probe is a meat probe. In some embodiments, the induction cooking system includes integrated weight sensors, which can be used to measure the weight of cookware, changes in weight (e.g., due to addition/removal of food content in the cookware), etc. Further embodiments regarding weight sensors are described below. Another example of a sensor is an air pressure sensor, which can be used to detect the state (e.g., doneness) of ingredients being cooked.

In the example of FIG. 2, use of the induction cooking system with various different types of cookware is shown. For example, the induction cooking system is able to accommodate different types of cookware such as frying pan 210, multi-cooker 212, as well as other types of cookware. In this example, multi-cooker 212 includes an intelligent lid with built in temperature and humidity sensors. The multi-cooker also includes components such as an actuator-stirrer, circulator, etc. The multi-cooker may be used to perform multiple cooking techniques or cooking functions, such as pressure cooking, soup making, sous-vide, rice cooking, etc.

In some embodiments, the induction cooking system is configured to perform cookware recognition to detect a type of cookware being utilized. Further embodiments regarding cookware recognition are described below.

In some embodiments, user interface 204 is adapted based on the detected type of cookware. For example, the information that is presented, the options that are available to a user for selection, etc. are configured based on the context of what type of cookware has been detected as being in use. Further embodiments of adaptive user interfaces based on detected types of cookware are described below.

Figure 3:
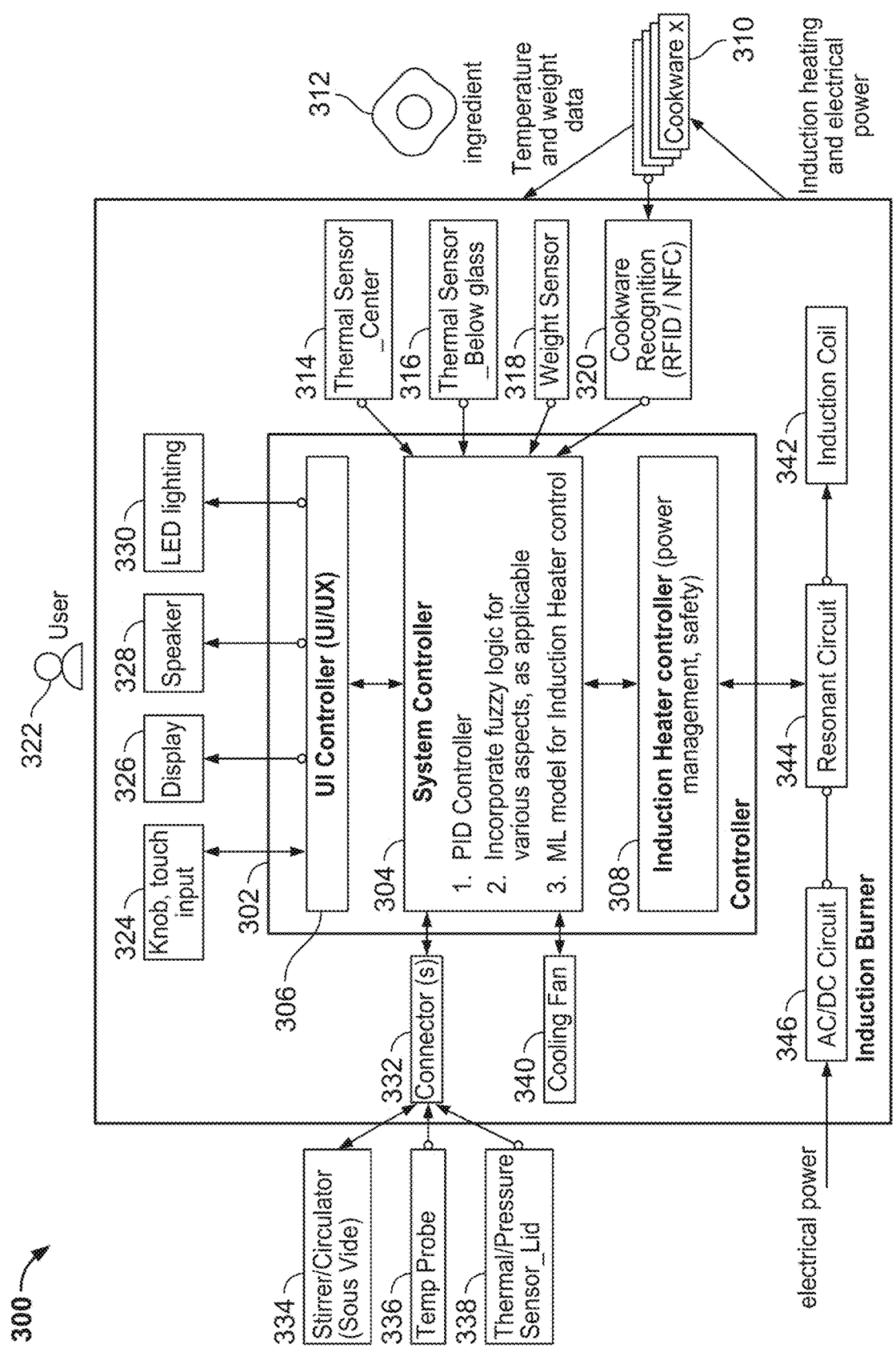
FIG. 3 illustrates an embodiment of an induction cooking system control architecture.

FIG. 3 illustrates an embodiment of an induction cooking system control architecture. In some embodiments, architecture 300 is an example of a control architecture for controlling the components of induction cooking system 202 and induction cooking device 100.

As shown in this example, the control architecture 300 includes controller 302. In this example, controller 302 further includes system controller 304, UI/UX controller 306, and induction heater controller 308.

In some embodiments, system controller 304 is configured to receive information from various components and interfaces and provide various commands to control hardware associated with the induction cooking system.

As one example, the system controller receives information and measurements from various sensors pertaining to the cookware (310) and ingredients (312) in the cookware, such as temperature and weight measurement data from temperature sensors, weight sensors, cookware detection sensors, etc. Examples of integrated temperature sensors include a thermal sensor 314 in the center of the top plate, such as temperature sensor 104. Another example sensor that the system controller receives temperature measurements from is one or more thermal sensors 316 that are below the top plate. The system also receives weight information from weight sensor 318. In some embodiments, measurements usable for cookware detection are received from cookware recognition sensors 320. Examples of such cookware recognition data include RFID (Radio Frequency Identification) data, NFC (Near Field Communication), etc. Cookware recognition can also be performed via signature identification using sensors of the system described herein. Further details regarding cookware recognition are described below.

In some embodiments, system controller 304 is configured to receive information from, and provide commands to UI (user interface)/UX (user experience) controller 306. For example, UI controller 306 is configured to receive information from, and/or provide information to various user interfaces via which user 322 interacts, such as a knob or touch input 324 (e.g., knob or touch screen of dial 106), display 326 (e.g., of dial 106), audio speaker 328, and lighting ring 330 (e.g., lighting ring 108).

In some embodiments, in addition to speaker(s) 328, the system also includes one or more microphones. In some embodiments, the microphones are used to facilitate voice control and voice command as an input. In some embodiments, the system responds with voice/audio feedback (e.g., via speakers integrated into the system, or via an external device such as a speaker or mobile device).

In some embodiments, the system/induction stove is turned on by turning the dial or pressing on the dial, with visual (e.g., light ring) and audio (e.g., sound from the system, including cooling fan) feedback next to the active display of the intelligent dial to show various information such as the heat/temperature/power setting selected by the user. The system can be turned on whether or not cookware is in the presence of the system (e.g., on the top plate). This is similar to user experience of a gas stove, where the user can always turn on the stove before or after placing the cookware.

In this example, the system controller further receives information from, and/or controls, components connected to the device (e.g., via connectors 332 such as USB-C connections, or as part of an integrated multi-cooker that is controllable by the system, or any other type of port, as appropriate). Examples of such connected components include stirrer/circulator 334 (e.g., used when performing sous vide), external temperature probe 336, external thermal/pressure sensor 338 (which, as one example, is part of a sensor of a multi-function cookware that is being utilized in conjunction with the induction cooking system). In some embodiments, power to a cookware device is provided via the induction coils, and/or a power connection such as USB-C. For example, a multi-cooker can be connected to and powered by the system. The cooking system also has control over the components of the multi-cooker.

In this example, the system controller is also configured to control cooling fan 340. This includes receiving fan information (e.g., fan speed), as well as providing controls (e.g., to adjust fan speed). In some embodiments, the system includes one or more fans to provide internal cooling. For example, fan 340 is a compact fan (e.g., laptop fan) that can be adjusted to perform various types of sound adjustment, such as noise cancelling, creation of desirable acoustics, etc. For example, the fan can be controlled by the system controller to suppress certain acoustic frequencies, as well as enhance certain frequencies to create an appropriate sound level and quality. In some embodiments, the system uses the noise level of the fan (e.g., as measured by a microphone integrated in the system) as acoustic feedback on the power level of the system. The system may include multiple fans, such as fans for cooling the power supply, fans for cooling the induction coil 342, etc.

The following are further embodiments of noise cancelling (e.g., cancelling of fan and all other sources of noise in the system). For example, as described above, certain acoustic frequencies can be suppressed or enhanced to create the appropriate sound level and quality. In some embodiments, the noise level is used as acoustic feedback on power level. Multiple fans may be used for cooling, where noise cancelling may be implemented on the fans to create desired sounds. As another example, the fan can be controlled to optimize the sound that is generated to emulate the sound of cooking with a gas stove. As one example, the sound of cooking with gas is characterized (e.g., as (1) Brown noise-spectral density drops 6 dB per octave, and (2) Gray noise-white noise (all frequencies randomly) convolved with A-weighting of human ear perception). The electronic noise and harmonics of the induction system are characterized. The system performs optimization (e.g., component selection, control algorithm changes, air flow optimization of the cooling fan) in order for the sound being generated by the induction cooking system (e.g., as characterized by amplitudes as a function of frequency) to emulate the profile of a gas stove (e.g., to emulate higher pitch "whistling" sounds in typical gas stoves).

In this example, system controller 304 interacts with induction heater controller 308. Induction heater controller 308 is configured to perform power management pertaining to the induction coil 342. In some embodiments, the induction coil is controlled by the induction heater controller via control commands issued by system controller 304. For example, system controller 304 is configured with logic to determine how and when to adjust the power delivered to the induction coil, such as to control the temperature of the cookware (as monitored, for example, by the various sensors of the system). For example, the system controller includes a PID (proportional-integral-derivative) controller. The PID controller is used to control the resonant circuit 344, which in turn controls the induction coil.

The following are further embodiments of heating control. As one example, the heating control is implemented by system controller 304. For example, as described above, system controller 304 is configured to collect various sensor measurements, such as temperature, weight, induction power being delivered, etc. The system controller then processes the information and uses it (e.g., as feedback) to determine how to control the cooking process.

The following is an example of heating control. In some embodiments, the system measures temperature of the cookware, including rate of change of temperature. In some embodiments, the system measures weight of the cookware, including changes and rate of change (e.g., due to liquids evaporating, the addition of ingredients, etc.). Examples of weight sensors include load cells and strain gauges, which may be placed below the top plate or under the appliance. In some embodiments, the system measures the level of induction power being delivered to the cookware, including the rate of change in power. In some embodiments, measurement of temperature of ingredients is performed with a probe (e.g., probe 208).

In some embodiments, based on all the input and output information, the system predicts the state (e.g., temperature, pressure, moisture, doneness, crispness, etc.) of the ingredients in the cookware. For example, a closed-loop control algorithm takes into account all the sensor data input, user input, derived cookware or foodstuffs state, etc., modulates the power delivery to the cookware, and delivers predictable and repeatable cooking results and user experience.

The following are further embodiments of heating control. In some embodiments, the intelligent cooking system includes a control system to perform automated cooking routines or functions with different combinations of cookware and accessories, such as the following:

Frying Pan (regular or non-stick): Assisted pan cooking (searing, frying, sauté)
Multi-cooker (pot): Pressure cooking, Rice cooking, Sous vide, yogurt making, braising, slow cooking, etc.
Ceramic/clay pot: rice cooking, slow cooking
Waffle pan: waffle making
Kettle: water boiling, including temperature control
Carbon Steel pan:
  automated pan maintenance guidance (e.g., remind user to "wipe out the pan", "dry the pan and lightly oil before storage", etc.)
  automated seasoning program (e.g., the system prompts the user to oil the pan accordingly, and then heat up the pan to seasoning temperature, hold, and turn off automatically)
  safety detection and warping prevention to ensure limiting of the heating rate and temperature set point when the pan is empty or left unattended, to protect the pan from being damaged and overheating.

The following are further embodiments and features of the intelligent cooking system and heating control. As one example, suppose that a user chooses a cooking technique of searing. In this example, the system heats the pan up to 425° F. (218° C.) and holds, prompts the user to add oil, and prompts the user again to add the protein (steak, pork, etc.). With the weight input and temperature drops (due to adding of an ingredient), the system estimates the time required, and prompts the user to flip the protein.

As another example, when a user uses a non-stick pan, the system limits the maximum permitted temperature as a safety measure to prevent disintegration of the non-stick coating.

The following are further embodiments of heating control functionality:
  heater stays on when lifting pan during cooking
  heater stays on when tilting pan—support basting
  temperature ramps up without overshoot even at high-speed mode
  temperature control at 1 degree Celsius or Fahrenheit accuracy, incremented from 80-450 F
  consistent temp across cooking surface In some embodiments, temperature control involves monitoring of multiple sensor inputs to deliver temperature accuracy. In some embodiments, heating control includes controlling multiple coils for equal temperature across the cookware. In some embodiments, each of the inductions coils is independently controllable. For example, suppose an inner coil and an outer coil (where the outer coil has a larger diameter and encompasses the inner coil). The inner and outer coils may support the same, or different maximum power ratings. Total provided power can be distributed between the two different coils in various scenarios. For example, if even heating is desired, the total power can be divided evenly between the inner coil and the outer coil. If it is desired for the center of the cookware to be hotter, more power is provided to the inner coil as compared to the outer coil. If small cookware is to be used, then all of the available power can be provided to the inner coil (and none to the outer coil). If it is desired that the outer portions of the cookware are to be hotter (e.g., hotter away from the center of a pan), then more power is distributed to the outer coil as compared to the inner coil.

In some embodiments, heating control is based on a profile of the cookware that is detected as being in use. In some embodiments, a profile of the cookware includes characterization of cookware material and thermal properties, weight of the cookware, etc. Further embodiments of adaptive heating control based on identified or recognized cookware are described below.

Induction heater controller 308 is also configured to perform safety control pertaining to the induction coil 342. As one example, controller 308 only permits the induction coil to be turned on/energized once the cookware is placed on the system to ensure safety.

In this example, power for the resonant circuit is provided from electrical power, such as that converted via AC (alternating current)/DC (direct current) circuit 346 from AC power (e.g., from a wall plug) to DC power. The following are further embodiments of a power supply of an induction cooking system. In some embodiments, the power supply is configured to provide continuous power delivery, cyclic power delivery, etc. In some embodiments, the power supply provides low, consistent power delivery. In some embodiments, the power supply is configured for closed loop control. In some embodiments, the power supply supports power boosting with a battery or other type of energy storage (e.g., capacitors). In various embodiments, the power supply is selected or designed for robustness, efficiency, and silent operation (e.g., with minimal humming). In some embodiments, the power supply includes a detachable power cable (e.g., for plugging into a wall outlet).

The following are embodiments of induction coils of the induction cooking system described herein. In some embodiments, a high-performance induction burner module delivers induction heating and/or electric current to the cookware and/or electric appliance placed on top of the coil.

As one example, the induction coil has a diameter between 260-300 mm. Other coil diameters may be utilized, as appropriate. In some embodiments, the induction cooking system includes a multiple coil configuration, such as two coils with independent control, where, for example, an inner coil is 6-7" 1800 W coil, and an outer coil is 10" 900 W coil. A multi-coil arrangement facilitates consistent temperature across cooking surfaces of different types of cookware (which may vary in size). In some embodiments, the induction coil(s) are high efficiency with minimum eddy current losses. In some embodiments, the coil is selected for strong inductance with minimum lost inductance over height. In some embodiments, alignment of assembly of the coil is performed for equal power density in height and surface area.

The following are further embodiments of the construction and design of components of the induction cooking system described herein.

The following are further embodiments of sensors of an induction cooking device.

Weighing Scale

Figure 4A:
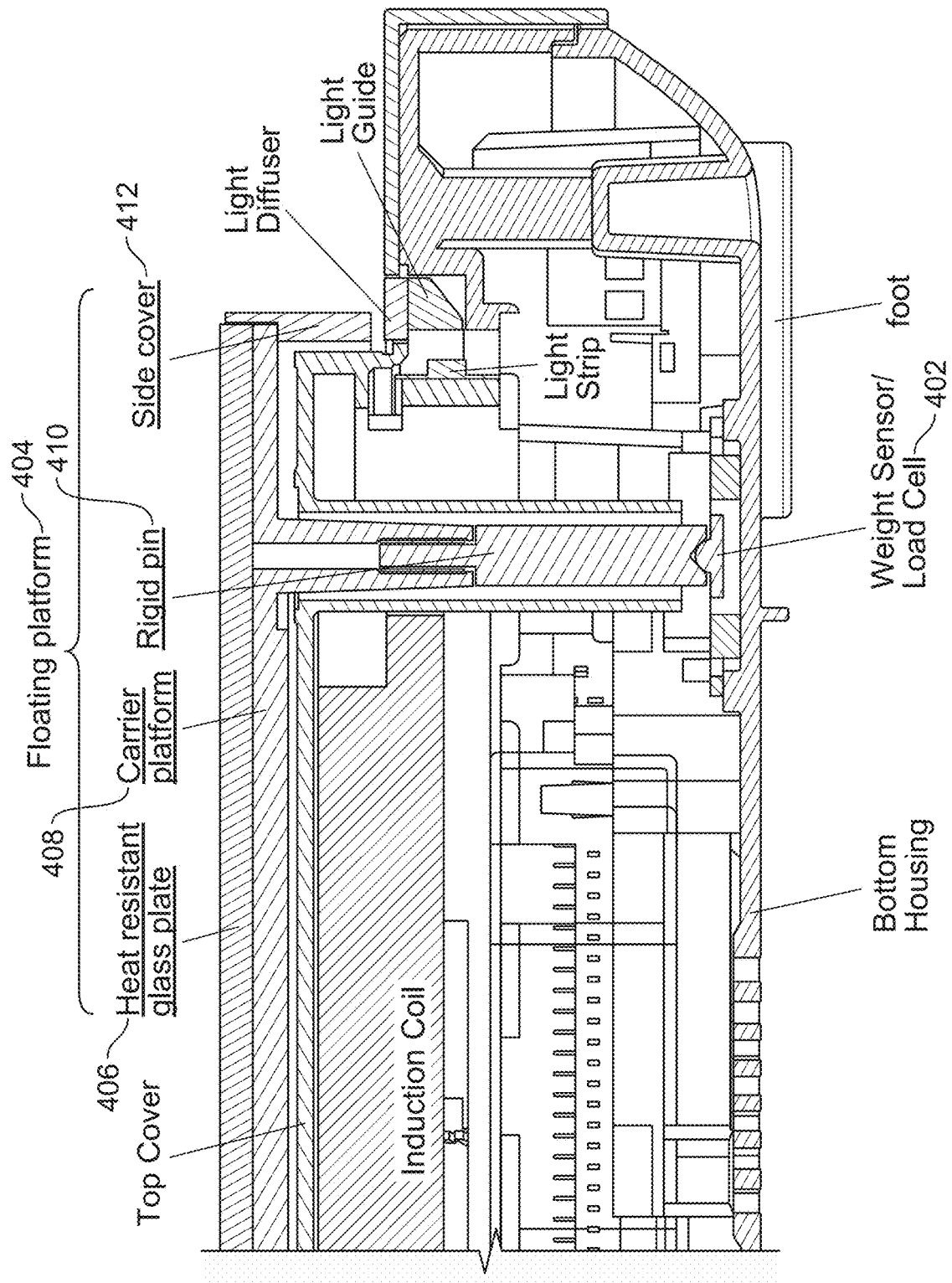
FIG. 4A illustrates an embodiment of a weighing scale.

The following are further embodiments of a weighing scale for an induction cooking device. FIG. 4A illustrates an embodiment of a weighing scale. In this example, embodiments of weighing scale functionality through a floating platform are shown. In the example of FIG. 4A, a portion of an induction cooking device (such as device 100) is shown.

Some existing cooking systems with weighing scales install the weight sensor at the foot of the unit. This results in less consistency due to, for example, the influence of the power cord on the weight of the system.

In the example of FIG. 4A, a floating platform 404 rests directly on the weight sensor 402 (examples of which include load cells, strain gauges, etc.). This isolates the weighing function from the movement of the system, providing more accurate and consistent weight measurements. As shown in this example, floating platform 404 further includes heat resistant glass plate 406 (an example of top plate 102), carrier platform 408, rigid pin 410, and side cover 412. In some embodiments, the side cover is a sliding cover.

Figure 4B:
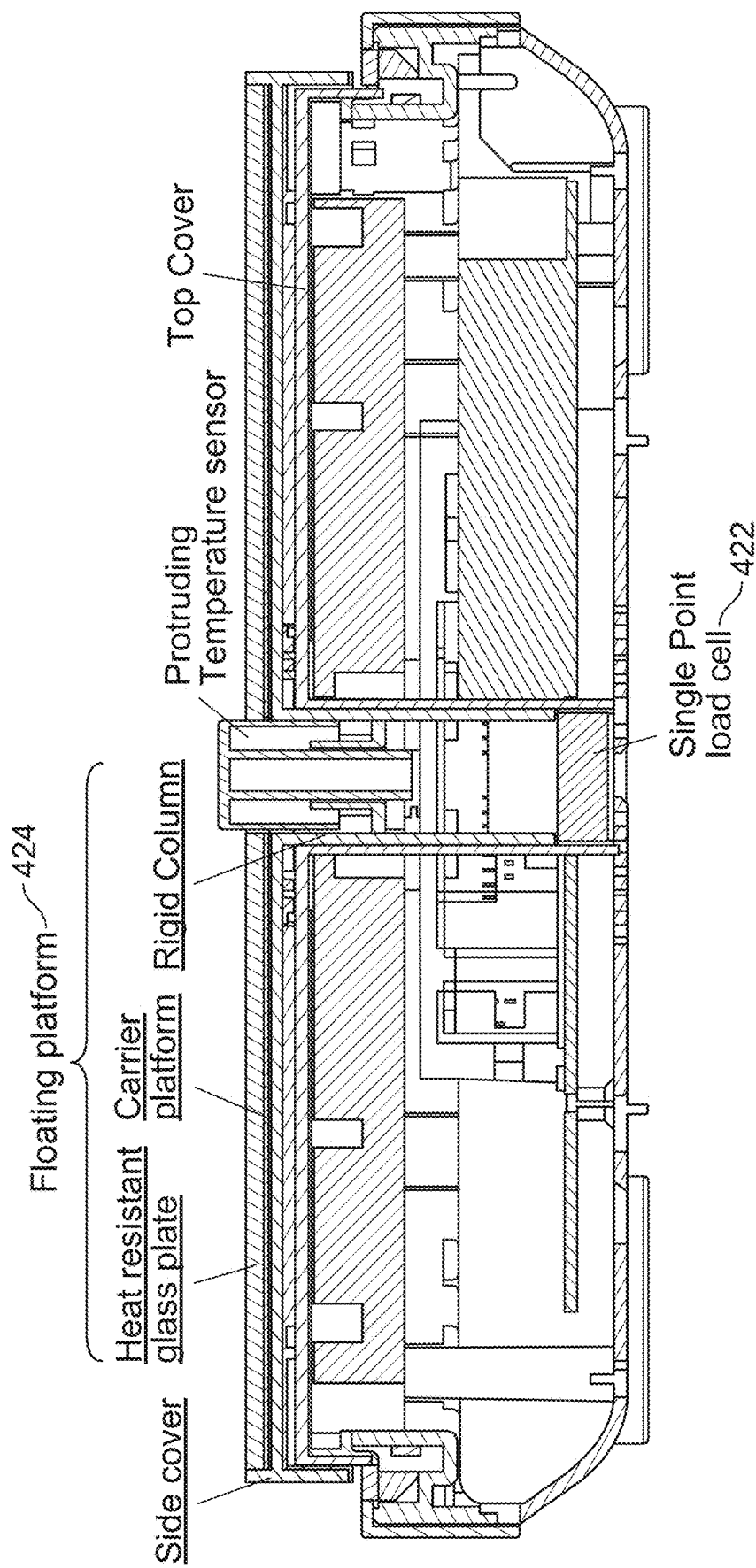
FIG. 4B illustrates an embodiment of a weighing scale.

FIG. 4B illustrates an alternative embodiment of a weighing scale for an induction cooking device. In this example, a cutaway view showing an interior view of the induction cooking system is shown. In this example, rather than having multiple pins and load cells, a single point load cell (422) in the middle of the system is utilized. In this example, the floating platform (424) rests directly on the single point load cell.

The example construction of the induction cooking device shown in FIG. 4B is efficient. For example, the center or middle of the induction coil is typically empty, and the use of a single point load cell positioned as shown in FIG. 4B is space effective. In some embodiments, if multiple pins are used, space in between the induction coil is created to allow pins to pass through.

Temperature Sensor

Figure 5:
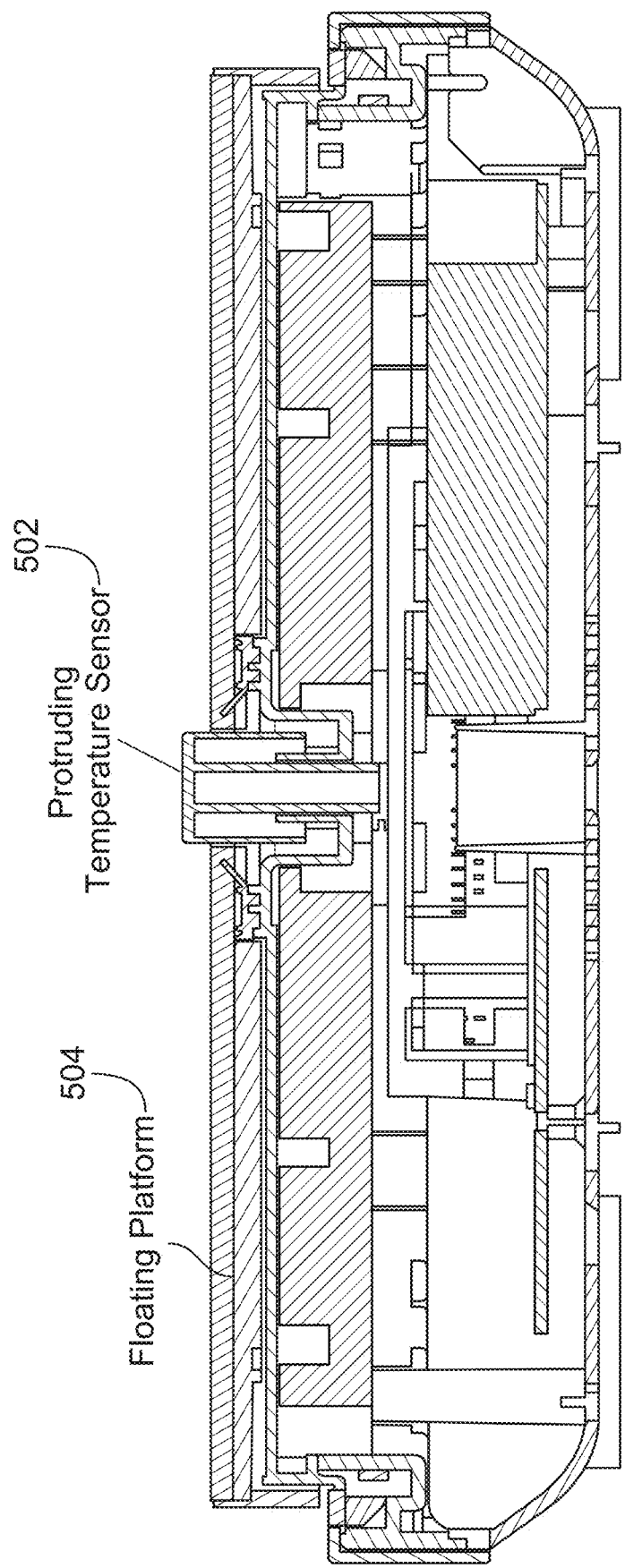
FIG. 5 illustrates an embodiment of a temperature sensor.

The following are further embodiments of a temperature sensor for an induction cooking device. FIG. 5 illustrates an embodiment of a temperature sensor protruding through a moving or floating platform. In this example, protruding temperature sensor 502 is an example of temperature sensor 104.

In the example of FIG. 5 involving a floating platform 504, a spring-loaded mechanism is utilized for the protruding temperature sensor to ensure that the spring force of the temperature sensor does not affect weight measurements.

The following are further embodiments of hardware interfaces of the induction cooking system.

Light Display Function with LED Strip

Figure 6A:
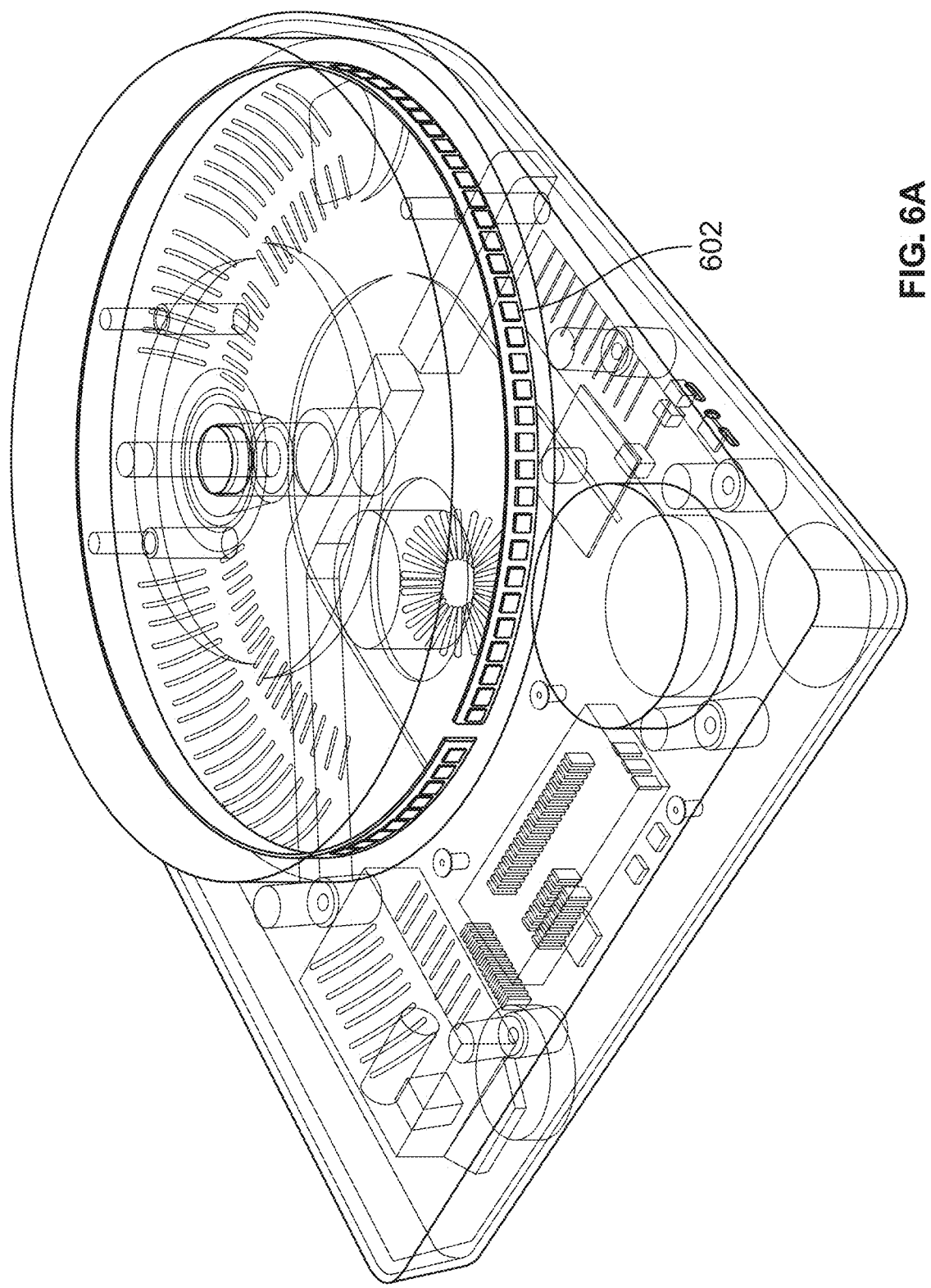
FIG. 6A illustrates an embodiment of a light ring.

The following are further embodiments of a lighting display for an induction cooking device. FIG. 6A illustrates an embodiment of a light ring. In this example, the light display is a flat, flexible LED (light-emitting diode) strip, which is curved to form a circular-shaped light strip. Such a light ring configuration provides a uniform light around the cooking platform.

Figure 6B:
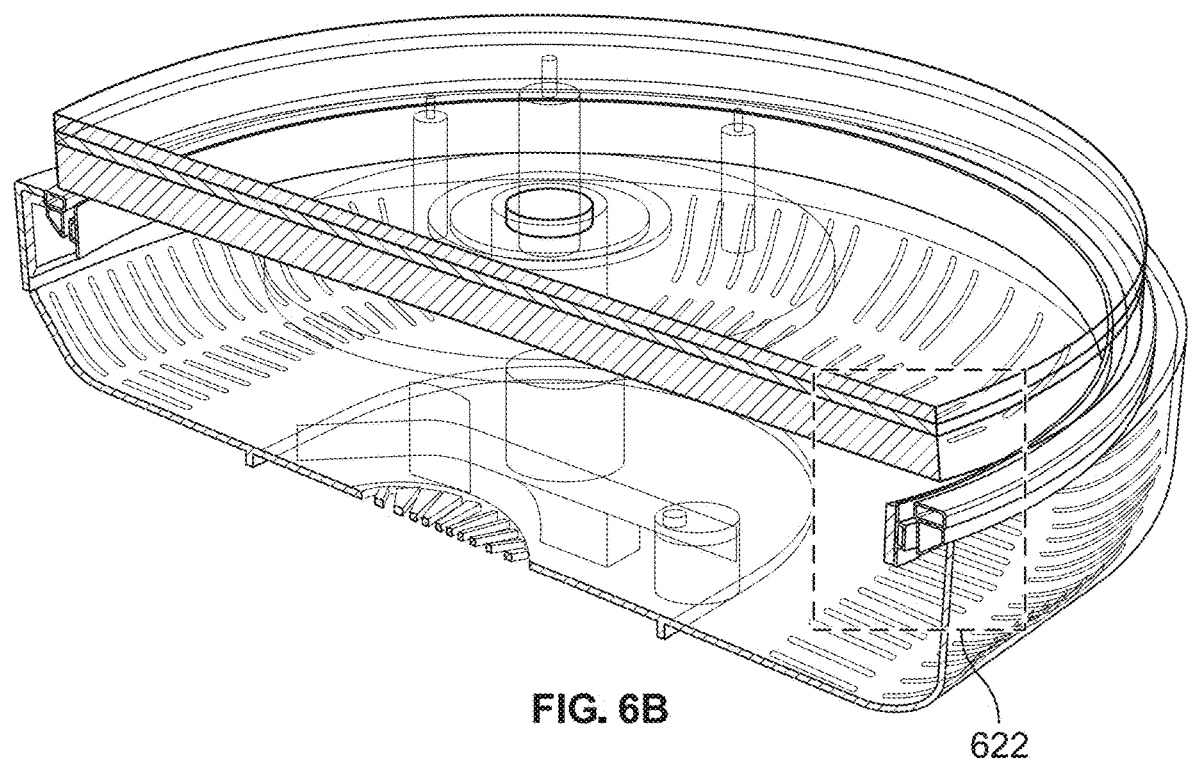
FIG. 6B illustrates a cutaway view of a light ring.
Figure 6C:
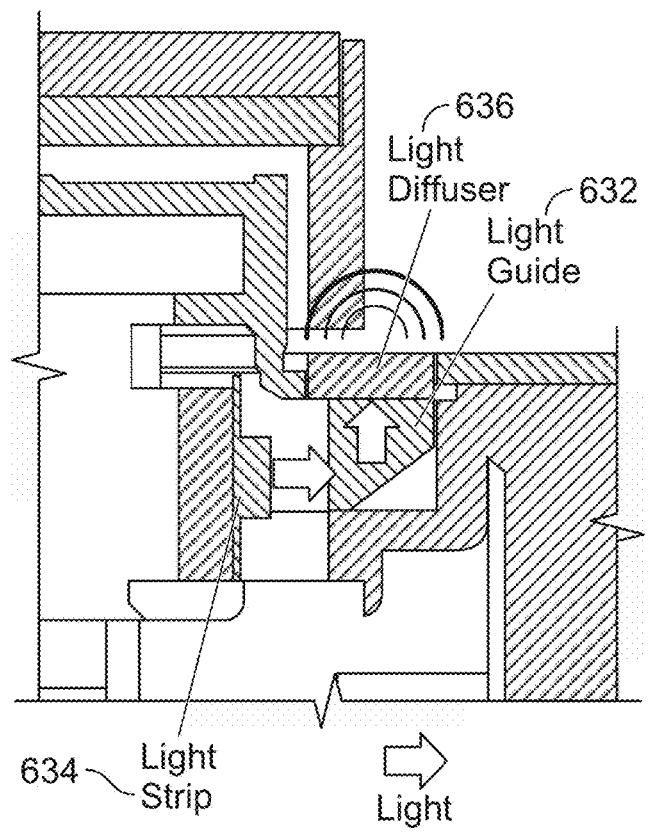
FIG. 6C illustrates a cutaway view of a portion of a light ring.

FIG. 6B illustrates a cutaway view of a light ring for an induction cooking system. In this example, an enlarged view of portion 622 is shown in FIG. 6C. In the example of FIG. 6C, an angular light guide 632 redirects light (from light strip 634) 90 degrees upward. The light may be redirected at any other angle, as appropriate. In some embodiments, the light diffuser rim 636 diffuses the light to create a homogeneous light display effect.

Dial Control Knob

The following are further embodiments of a dial for an induction cooking device. Embodiments of the physical design of the dial, as well as embodiments of the user interface provided by the dial, are described below.

FIG. 7A illustrates an embodiment of a knob/dial user interface element. In this example, a knob/dial 702 with detachable ring 704 is shown (where the ring is shown to be detached at 704). In some embodiments, dial 702 is an example of dial 106. In some embodiments, dial 702 is a high tactile quality knob. In some embodiments, the knob includes a display. In some embodiments, the display is a touch screen. In some embodiments, the display is easily serviceable (e.g., to clean). In some embodiments, the knob includes an integrated touch screen. In some embodiments, a removable ring is used for cleanability.

The following are further examples of a dial specification. The dial may be constructed to other specifications, as appropriate. As one example, the dial has a 2.1" touchscreen, where the display is 480×480 resolution (circle) with a glass lens. The screen of the dial may be in other dimensions and resolutions, with different shapes and different lens materials. While a touchscreen is shown for illustrative purposes, in other embodiments, the screen need not be a touchscreen. As another example, the dial has a 2.9" outer diameter (other diameters may be utilized, as appropriate).

In some embodiments, the knob provides a smooth, high-quality feel. As one example, the outer bezel of the dial is made of polished stainless steel. The outer bezel may be made of other materials, as appropriate. In some embodiments, the knob has infinite ROM (range of motion). In some embodiments, the knob has haptic feedback for push, as well as rotary detents. In some embodiments, the knob is press-able as a button. In some embodiments, the dial includes a microphone/speaker for voice control and voice feedback. In various embodiments, the dial includes sensors, such as light, proximity, temperature and humidity, etc. In some embodiments, the dial has integrated or built-in connectivity (e.g., Wi-Fi, Bluetooth, etc.). In some embodiments, the dial is waterproof (e.g., IP54 waterproof rating).

In some embodiments, the rotating dial, in conjunction with the design of the induction cooking device, facilitates both left and right-hand use. FIG. 7B illustrates embodiments of a cooking system in left and right-hand configurations.

In some embodiments, and as shown in the example of FIG. 7B, the display on the smart dial is rotated 90 degrees for left-handed (722) or right-handed use (724). The rotation of the user interface of the dial may be initiated in various ways. As one example, a physical button or element is used to toggle the orientation of the screen via software. As another example, an on-screen selection element in the touch screen display is usable to select the orientation of the screen via a software setting.

In some embodiments, along with use of the intelligent cooking device in left- and right-hand orientations, the induction cooking system also includes multi-orientation cable management. In some embodiments, the burner includes a built-in cord storage winder at the bottom of the burner.

Figure 7C:
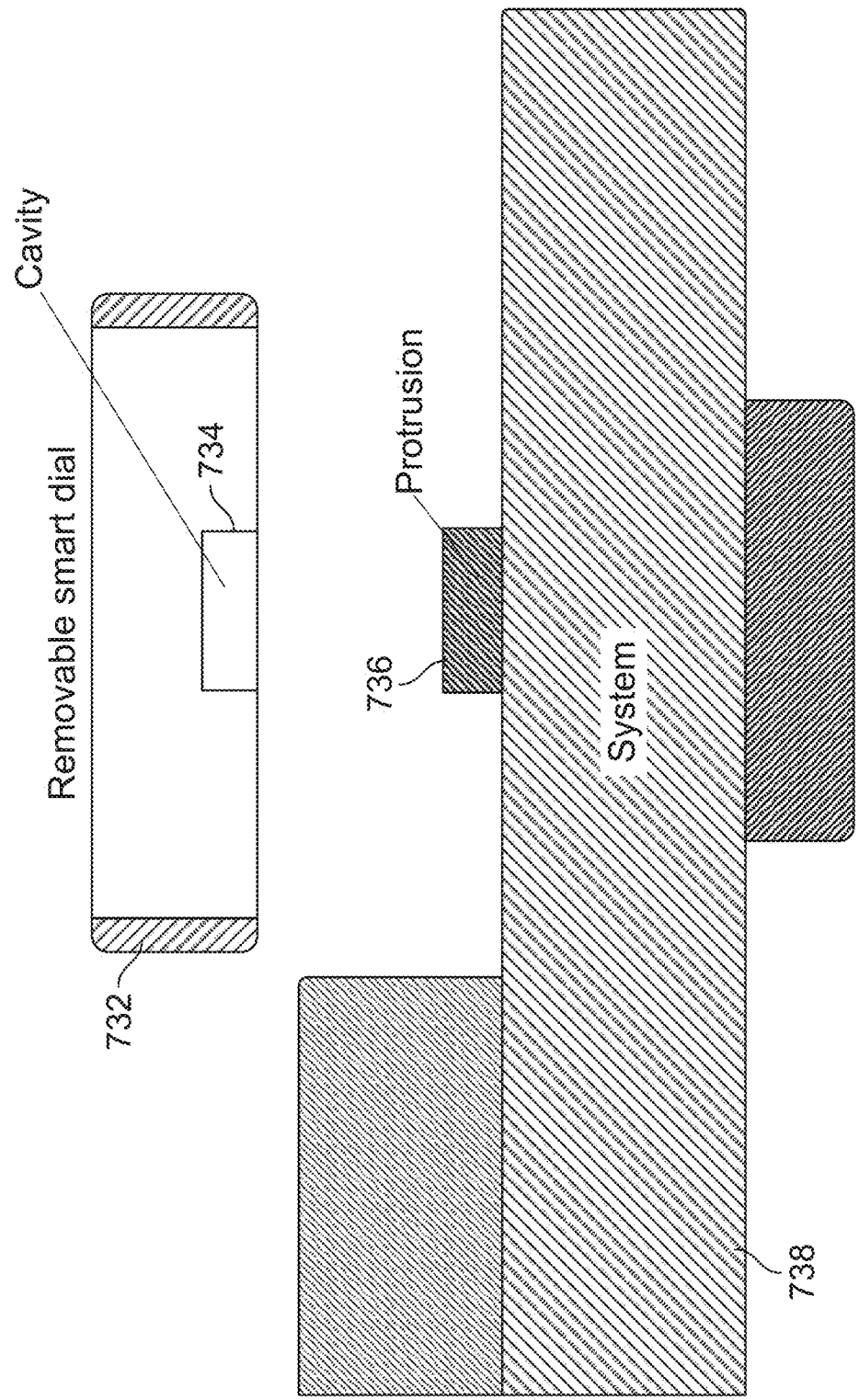
FIG. 7C illustrates an embodiment of a removable dial.

In another embodiment, the smart dial is removable. FIG. 7C illustrates an embodiment of a removable dial. A removable dial is shown at 732. In this example, the removable dial connects to the base induction cooking system via a connector. For example, the removable smart dial includes a cavity 734 that connects to protrusion 736 in the base system 738. In some embodiments, the removable dial connects to the system with a specific-shaped connector. In some embodiments, the shape of the cavity and protrusion limits allowed orientations, such as only allowing connection of the smart dial in two specific orientations, as shown in the example of FIG. 7B.

Figure 7E:
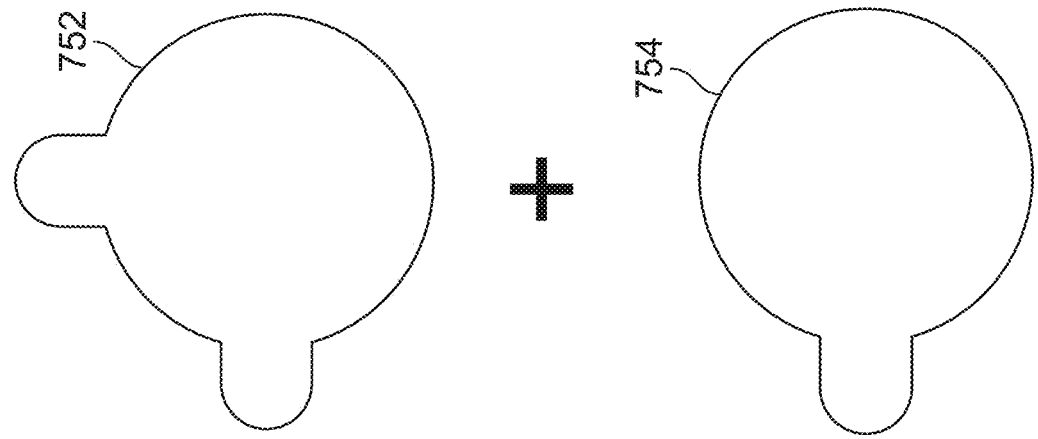
FIGS. 7D and 7E illustrate examples of connection shapes for a removable smart dial.
Figure 7D:
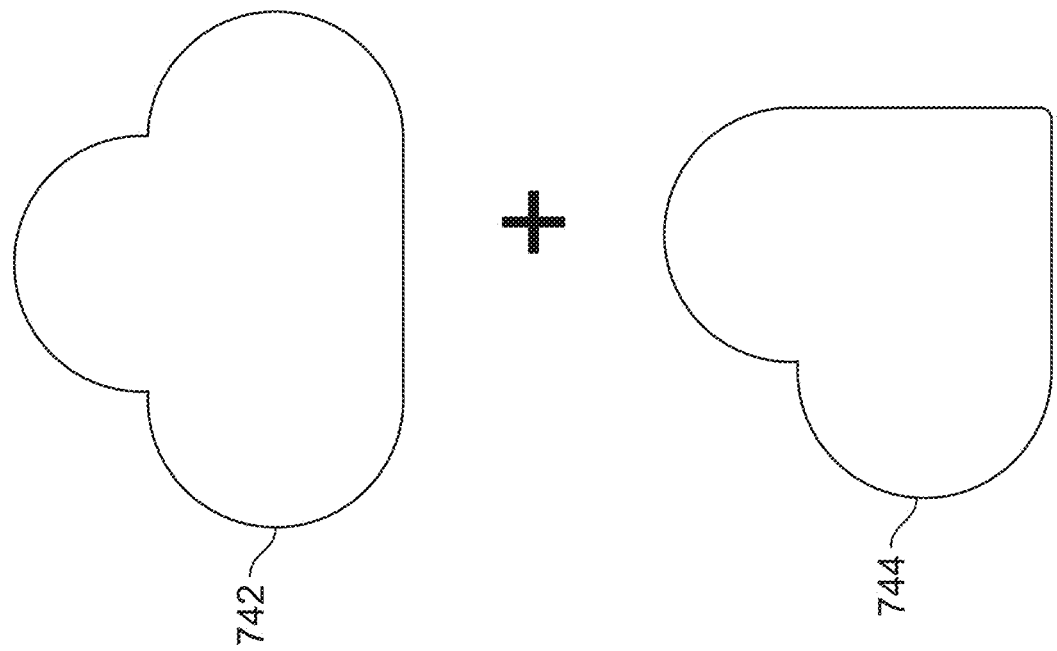

FIGS. 7D and 7E illustrate examples of connection shapes for a removable smart dial of an induction cooking system. In the following examples, pairs of dial cavities and system protrusions are shown that allow for two orientations. In the example of FIG. 7D, smart dial cavity 742 pairs with base system protrusion 744. In the example of FIG. 7E, smart dial cavity 752 pairs with base protrusion 754.

Example Intelligent Dial User Interface

Figure 8A:
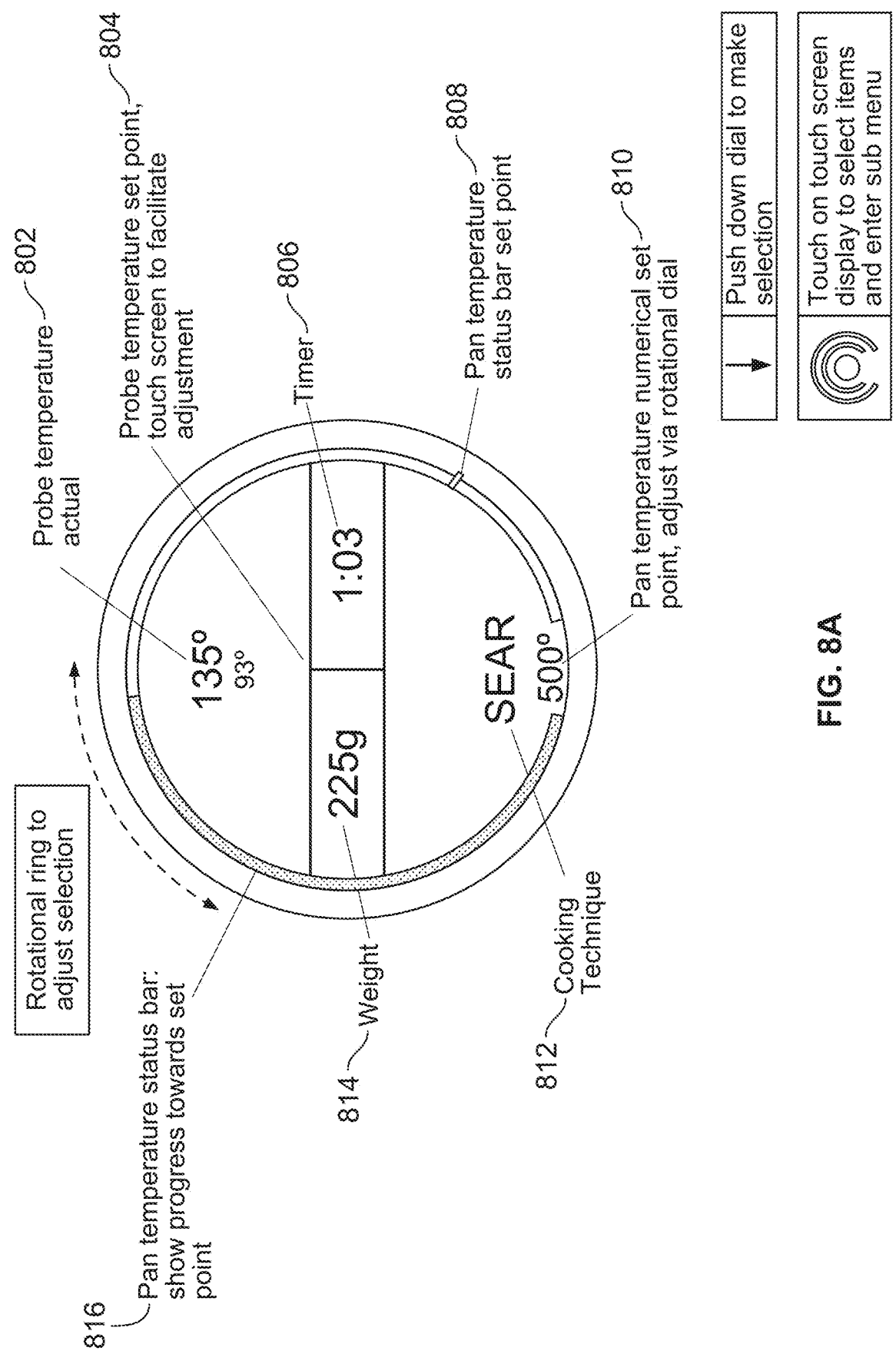
FIG. 8A illustrates an embodiment of a smart dial display.

FIG. 8A illustrates an embodiment of a smart dial display. In some embodiments, the interface of FIG. 8A is provided via the display of a smart dial such as smart dial 106 of FIG. 1. In one example implementation, the user interfaces shown are supported by a web UI react framework.

In the example of FIG. 8A, a smart dial primary display is shown. Various types of information are shown in the user interface. Examples of information presented include probe temperature 802. In some embodiments, a set point of the probe temperature can be adjusted, as shown at 804. Timer information is shown at 806. A pan temperature status bar set point is shown at 808. A cookware (pan in this example) temperature set point is shown at 810, which can be adjusted via the rotational dial. A cookware (pan in this example) temperature status bar is presented at 816, which in some embodiments displays progress towards a set point.

The cooking technique being utilized (which is used to control the parameters of the induction cooking system) is presented at 812. In some embodiments, a user can enter a technique selection sub-menu by interacting with region 812 of the display (e.g., via touch input, rotational dial/push down selection, etc.). In some embodiments, techniques are associated with automated cooking modes, where the performing of a technique is implemented in an automated or semi-automated manner. For example, in response to selection of a cooking technique, the system automatically loads device settings and guided technique user interfaces for the selected technique. As used herein, a (cooking) technique refers to a technique, way, or process in which food or ingredients or foodstuffs are prepared or cooked. Examples of cooking techniques include frying, rice-cooking, caramelization, etc. As used herein, a cooking technique also refers to relevant sub-technique end-state selection such as a degree of doneness or end-state for a cooking technique, such as soft-ball or hard crack for caramelization, or medium-rare or medium for a fry chop. In some embodiments, allowable or selectable end states are technique dependent, cookware-type dependent, or both.

The weight of the cookware (plus contents in the cookware) is shown at 814. In some embodiments, the user can enter a weighing scale selection menu by interacting with region 814 of the display. The user can also perform taring by interacting with region 814 of the display (e.g., shorter touch for taring function, longer held touch for entering weighing scale selection sub-menu).

The user can interact with the smart dial in a variety of ways. For example, the user can rotate the rotational ring to adjust selection. As another example, the user can push down on the dial to make a selection. As another example, the user can touch the touch screen display to select items and enter a sub-menu.

Figure 8B:
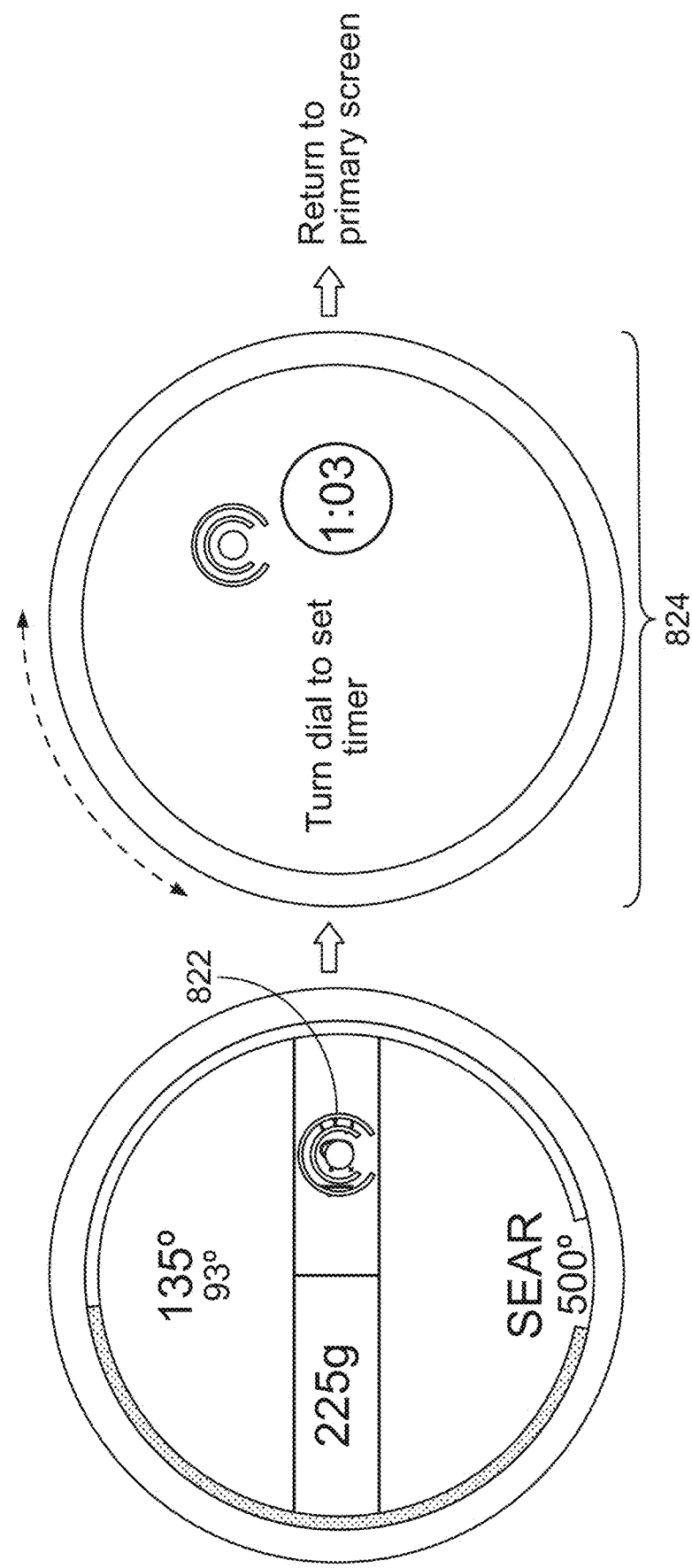
FIG. 8B illustrates an embodiment of a timer function.

FIG. 8B illustrates an embodiment of a timer function. In this example, a user touches the touch screen at 822 to enter a timer setting menu, as shown at 824. When at the timer setting menu, the user can physically rotate the ring of the dial and push down on the dial or use the touch interface to scroll and make a selection of an amount of time for the timer. The user can then return to the primary screen.

As one example, the timer can be set at 30 sec increments (or any other increment as appropriate), and the countdown by the second. In some embodiments, once the countdown is completed, the system notifies the user with the combination of sound, light, and/or screen information.

In other embodiments, the timer functionality is set via voice commands. In various embodiments, further customization may be added to the timer setting menu, such as determining system settings after completion of timer countdown.

Figure 8C:
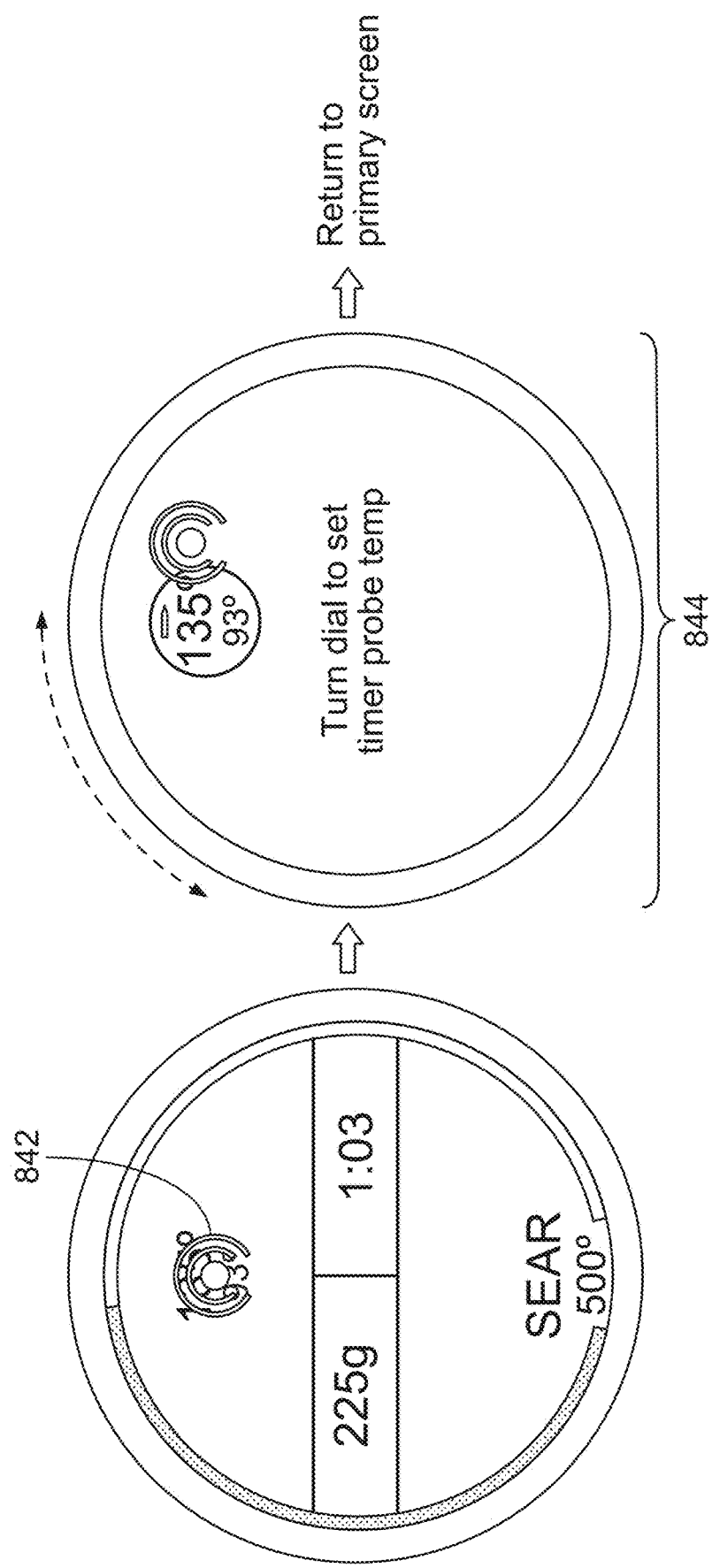
FIG. 8C illustrates an embodiment of a probe temperature function.

FIG. 8C illustrates an embodiment of a probe temperature function. In this example, the user interacts with the primary display at 842 (e.g., via touch screen input) to enter the probe temperature setting sub-menu. The display then updates to the probe temperature setting menu 844. In this example, the user can rotate the ring of the dial to scroll through options presented in the interface. The user can make a selection by pushing down on the dial or touching the touchscreen interface. After setting the probe temperature function, the user can then return to the primary screen.

In some embodiments, the probe temperature display appears when a detachable probe is plugged into the base system, such as through a USB-C port, as described above. In some embodiments, the probe temperature can be set via voice commands as well. In various embodiments, further customization may be added to the probe setting menu, such as for adjusting settings of circulator functionality.

In some embodiments, the induction cooking system described herein is a base system that can be used with multiple types of cookware. The system then adapts its settings and parameters (e.g., UI, heating control, etc.) based on the type of detected cookware. The following are embodiments of recognizing cookware and adapting components of the cookware based on the recognized cookware.

Cookware Detection and Recognition

In some embodiments, the induction cooking system adapts to the type of cookware being utilized. This includes providing contextual user interfaces, heating control, etc. that are adapted to the characteristics of the cookware being utilized. In some embodiments, the adaptation is based on identification or recognition of the type of cookware being utilized. The following are embodiments of cookware detection and recognition.

In some embodiments, cookware recognition is facilitated by including tags embedded within cookware used in conjunction with the induction cooking system described herein. In some embodiments, the cookware has minimal electronics to ensure robustness, long product lifetime over daily home use, etc. In some embodiments, the system recognizes which cookware is placed on the burner with wireless tags (e.g., RFID/NFC). In some embodiments, the tag includes an identifier of the cookware (e.g., identifier of a type of the cookware). In some embodiments, the tag includes additional information pertaining to the cookware, such as its weight or other characteristics. In some embodiments, the induction cooking system includes a tag reader or scanner, such as an RFID or NFC tag reader.

The following are embodiments of a cookware tag for cookware recognition. In this example, an RFID implementation is described for illustrative purposes. As one example, the tag is a high temperature RFID tag. As one example, the tag is installed or placed in a portion of the cookware such as a handle. In some embodiments, the tag is robust and durable against dishwashers, drops, daily uses, heat, etc.

In some embodiments, the induction coil of the induction cooking system is used as a digital antenna for reading and detecting the RFID tag. For example, the induction coil is configured to detect the location of the RFID tag. If the location of the RFID tag is known (e.g., in the handle), then the system can also identify the position and orientation of the cookware. In some embodiments, the use of the coil as an antenna for reading/detecting cookware prevents false detection of other nearby cookware. In other embodiments, an external RFID chip and reader are used to connect to the system controller (e.g., controller 304).

In some embodiments, third party cookware can be integrated with the system. One example of registering $3^{rd}$ party cookware with the induction cooking system includes executing a series of semi-automated cookware characterization (e.g., of heating behavior, weight, etc.), and assigning a cookware ID (identifier) attached to a separate wireless tag (e.g., NFC tag, RFID tag, etc.). In some embodiments, the tag is programmed with a cookware profile based on the cookware characterization. In other embodiments, a data store including a list of cookware identifiers and corresponding information is updated to register the new cookware identifier, including creating a record for the cookware identifier that also includes the characterization of the cookware. In some embodiments, lookups of the table are performed to retrieve cookware profile information pertaining to the cookware identifier. In some embodiments, the table includes information pertaining to both first party cookware (developed, for example, in conjunction with the cookware system), as well as third-party cookware. Further details regarding cookware characterization are described below. In some embodiments, third party cookware registration is supported by use of a mobile device.

In some embodiments, the system recognizes the type of cookware being utilized based on other standards such as NFC (generic, KI standard, etc.). As one example, after a third-party cookware item has been characterized, the cookware is registered by assignment of NFC tokens that are attached to the cookware. In some embodiments, read/write access to the NFC token/tag is provided to the cookware system.

In addition to identification via RFID and NFC, cookware detection can also be performed in other ways in various embodiments. For example, cookware can be detected without needing additional tags in the cookware, and instead determining a signature or fingerprint of the cookware for identification. In various embodiments, a signature of the cookware is generated based on one or more of the weight of the cookware, heating profile, inductance, electric current frequency, acoustics, etc. In some embodiments, a unique signature or identifier of the pan is generated based on the corresponding pattern of sensor signatures. The table of cookware types and corresponding profiles is updated to include cookware that is identified based on sensor signatures, as well as corresponding profile information. In some embodiments, at cooking time, lookups are performed on the cookware records table by querying the cookware profile table using a detected sensor signature. The record matching to the queried-for sensor signature is accessed, and corresponding cookware profile information is obtained from the accessed record for use in adapting the parameters of the system.

As described above, multiple modalities of cookware/accessories detection can be combined to perform detection (e.g., using both weight and temperature profile to determine what type of cookware object is present). As one example, impedance and operating frequency measurements can also be used to identify or recognize the cookware being utilized or that is in the presence of the induction coil. In some embodiments, presence or absence of a cookware object on the induction coil is based on detection threshold frequencies.

Based on cookware recognition, a cooking context is established—the type of cookware being utilized. Operation of the induction cooking system is adapted based on the cookware context, further examples of which are described below. For example, based on the recognition of a type of cookware object (e.g., detecting presence of a type of cookware object), information pertaining to the cookware object is used to adjust various components of the cooking system, such as the graphical user interface (GUI), control-loop coefficients for use in a temperature control loop, etc.

Cookware Profiles

As described, in some embodiments, each type of known cookware is registered, including having a record in a data structure for the type of cookware and corresponding cookware profile information. For example, the type of cookware is assigned an identifier, and is registered with the cooking system or an entity (e.g., remote cloud server) that is accessible to the cooking system. New types of cookware can be registered over time.

In some embodiments, each type of cookware is associated with a cookware profile. In some embodiments, the cookware profiles are locally stored in a memory of the system, in a tag of the cookware, or are otherwise accessible by the system (e.g., obtained by querying a data store of a remote server).

In various embodiments, the cookware profile includes information about the cookware itself, parameters for use by the induction cooking system parameters, etc. In some embodiments, the system settings are customized for the specific cookware.

For example, consider cooking techniques. Suppose that there are numerous different types of cooking techniques that are available for selection. In some embodiments, the cookware profile includes the subset of allowable cooking techniques that can be used with the cookware. In some embodiments, the allowable cooking techniques are used to drive available menu options presented in a contextual user interface. In some embodiments, each technique is associated with a secondary set of options. For example, suppose a multi-cooker. One of the techniques included in the profile is cooking rice. In some embodiments, the profile for the technique includes sub-menu options, such as the type of rice to be made (e.g., sushi rice, porridge, white rice, brown rice, etc.). Another example of sub-menu options includes a specification of desired end-state (e.g., rare, medium-rare, medium-well, etc.). In some embodiments, the allowed (and presented/selectable options for) ingredient end-states are specific to the cookware, to specific techniques, or both (e.g., specific technique when using a specific type of cookware). In this example, the profile for the cookware includes an indication of allowable UI and menu options.

The cookware profile also includes operational temperature settings, such as temperature pre-sets, temperature ranges, speed control, etc. As another example, the cookware profile also includes closed loop temperature control parameters, such as factors for PID control of the induction coil. PID control parameters to be used under different conditions or points in time when cooking can also be specified. In some embodiments, components of the cooking system, such as the user interface, heater controller, are adjusted or adapted according to the profile of the cookware.

In some embodiments, a cookware profile includes information pertaining to characteristics of the cookware object. Examples of such characteristics maintained in the profile or record for the cookware include thermal properties, acoustic properties, weight, thermal mass, physical dimensions (e.g., surface area of bottom of pan, volume in a container, etc.), material properties, etc. As will be described in further detail below, various types of events or states related to cooking are detected from onboard sensor measurements. In some embodiments, what particular patterns of sensor measurement values are detected as signaling an event are based on recognizing the cookware being used, and having profile information of the cookware. As one example, a cooking technique may involve multiple steps, where the conditions for completing a step or transitioning to a next step in the technique are based on detection of certain events. Whether the events have occurred is detected based on accessed characteristics of the cookware. One example type of event or state information that is monitored for by the system is the state or condition of ingredients being cooked. In some embodiments, the state of ingredients is based not only sensor measurements (e.g., specific values for temperature, pressure, mass, moisture, doneness, crispness, etc.), but also the properties of the cookware being used (e.g., its thermal mass, weight, etc.).

Cookware Characterization and Calibration

The following are further embodiments of cookware characterization and calibration. The characteristics of the cookware are determined and stored in a profile of the cookware, for use by the induction cooking system.

Cookware that can be characterized include bundled or compatible or dedicated first-party cookware integrated with the cooking system, where first party cookware is constructed to have certain properties or characteristics, such as compatible material properties, characterization, and calibration matching the induction coil. This facilitates predictable heating behavior (temperature change rate, weight, heating pattern and heat evenness) of cookware with burner power output. In some embodiments, third-party cookware is characterized to determine its thermal properties, acoustic properties, etc., with a profile generated for the third-party cookware.

The following are embodiments of characterizing cookware. The characterization can be performed in a laboratory setting. In other embodiments, the induction cooking system includes a characterization mode for characterizing the cookware in situ.

In some embodiments, characterizing cookware includes running a series of steps to characterize various properties of the cookware object in various different states (e.g., with water inside, empty, etc.). For example, the cookware is heated to obtain control loop parameters (e.g., K-factors and Q factors for PID control of the induction coil). In some embodiments, characterizing the cookware includes weighing the cookware when empty to obtain the weight of the cookware. As another example, the induction coil can be used to transmit various signals to the cookware to obtain resonance of the cookware object. For example, impedance and operating frequency measurements are used to determine characteristics of the cookware such as material properties and thermal properties. As another example, characterization of a cookware object or cooking vessel includes using one or more impedance reflectance spectra, acoustic spectra, and/or weight is used to detect and correlate to thermodynamic response of the cookware. In some embodiments, impedance and operating frequency measurements, as well as induction frequency and/or acoustic frequency can then also be used as a spectral cookware fingerprint to identify or recognize the cookware being utilized or that is in the presence of the induction coil.

As described above, in some embodiments, the cookware is associated with a unique identifier. A profile corresponding to the cookware identifier is generated that includes the determined characteristics of the cookware. The cookware profile is then stored, such as locally at the cooking system, in a remote storage, and a local user device (e.g., their mobile device), etc.

As described above, based on the recognition of the type of cookware being utilized, as well as the various sensor measurements collected, the induction cooking system is configured to adapt and optimize the cooking experience to the type of cookware by accessing characteristic profile information corresponding to the cookware. For example, various types of actions and functionality may be provided upon recognition of the type of cookware object being utilized and accessing information pertaining to the characteristics of the detected cookware object. Various examples and embodiments of intelligent optimization and adaptation of cooking processes based on cookware identification and detection are described below.

Figure 9:
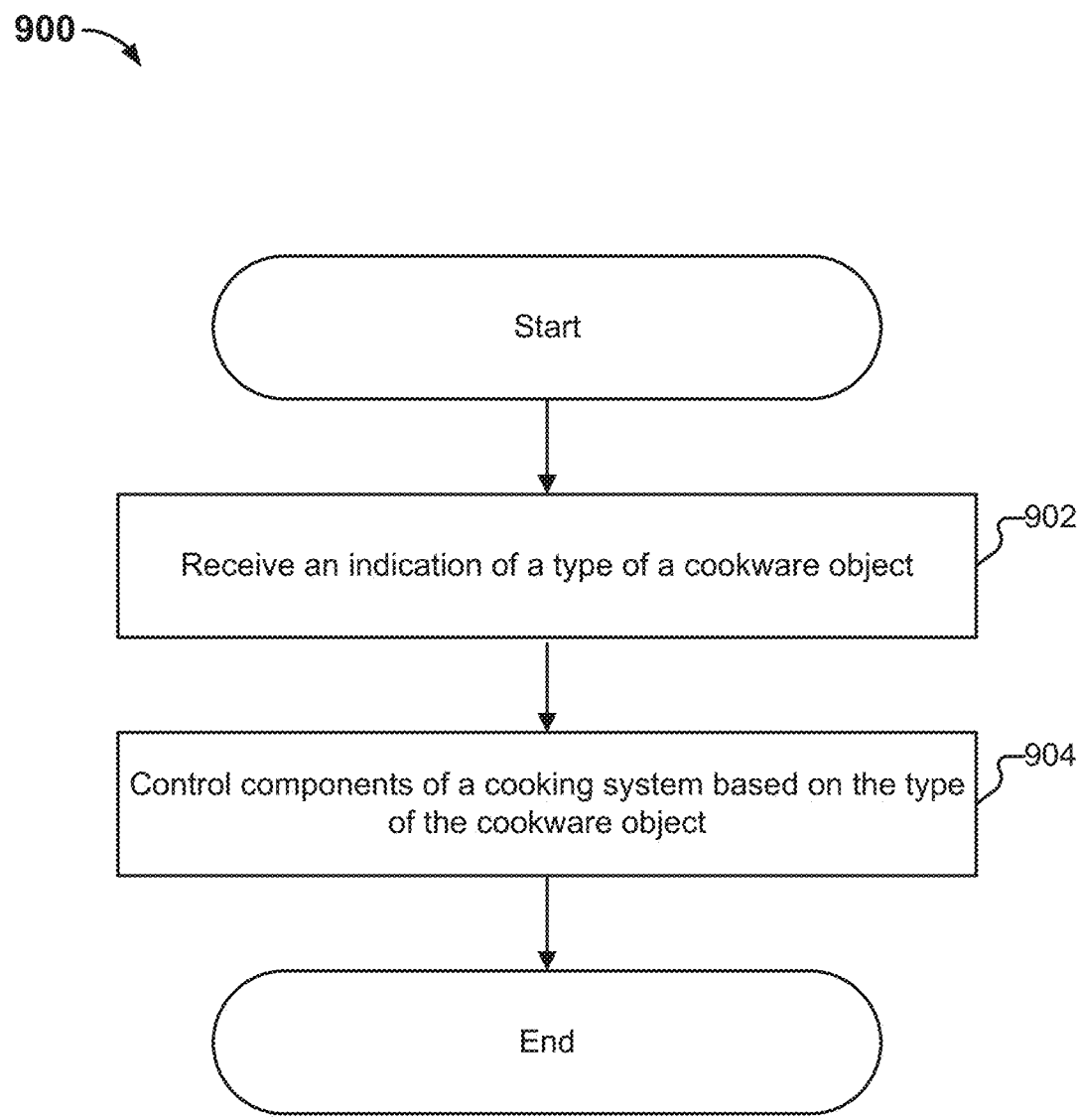
FIG. 9 is a flow diagram illustrating an embodiment of a process for cooking system parameter adaptation based on recognized cookware.

FIG. 9 is a flow diagram illustrating an embodiment of a process for cooking system parameter adaptation based on recognized cookware. In some embodiments, process 900 is executed by system controller 304. The process begins at 902, when an indication of a type of a cookware object is received. For example, the presence of a type of a cookware object is detected and recognized. At 904, one or more components of a cooking system are controlled based on the recognized type of the cookware object. For example, a cookware profile pertaining to the detected type of cookware object is received. At least two different types of cookware are associated with different cookware profiles.

As described above, components of the system are adapted by recognizing the cookware being used (e.g., based on tags, sensor signature, etc.). In some embodiments, system parameters and settings are determined by performing a lookup of the profile based on an identifier of the cookware that is determined based on the recognition of the cookware (e.g., identifier extracted from tags, spectral fingerprint determined based on stimulating of cookware with sensors, etc.). A record corresponding to the recognized identifier is accessed, and a cookware profile information corresponding to the identifier is retrieved from the record.

As described above, in some embodiments, each type of cookware is associated with a unique identifier (e.g., signature, tag identifier, etc.). Each cookware that is registered has a profile. In some embodiments, the identifier of the cookware is used to perform a lookup of the corresponding profile. For example, if the cookware has an NFC or RFID tag, an identifier in the tag is read and used to perform a lookup for the corresponding profile. As another example, a fingerprint of the cookware (e.g., spectral fingerprint) is generated for the present cookware, and the corresponding profile (if available) is determined by performing a lookup of a cookware fingerprint database. A profile is accessed if there is one matching the fingerprint. As one example, the spectral fingerprint is based on the thermal response of the cookware to inductive energy input. New cookware profiles can be added over time as part of registering new cookware (and characterizing the cookware).

Information in the corresponding profile is accessed and used to drive or configure various aspects of the cooking system. Different types of cookware are associated with different profiles. The cookware information included in the profile includes cookware characteristics, such as thermal properties, inductive response characteristics, weight characteristics, etc. In some embodiments, the profile includes the type of the cookware (e.g., frying pan, egg cooker, multi-cooker, etc.). In some embodiments, the type of the cookware is embedded or encoded in the identifier of the cookware. In some embodiments, the cookware profile information includes temperature control parameters. As another example, the cookware profile information includes UI control settings, such as allowable UI options.

The system is configured by loading information from the profile when setting system parameters. For example, the system parameters are adjusted according to predetermined data profile information. That is, the cookware is recognized. The corresponding profile is obtained or accessed. The system behaves according to the obtained cookware profile. For example, components of the cooking system are adapted based on, or otherwise operate according to, the context of the detected type of cookware object. For example, the context of the cookware object, as well as cooking state information, are used to adjust the user interface as well as control algorithms.

Examples of cooking system adaptation based on recognition of cookware being utilized include dynamic contextual user interfaces and cooking automation. While embodiments involving an induction cooking device are described herein for illustrative purposes, the techniques described herein may be variously adapted to accommodate contextual UI, thermal control, and cooking automation of any other type of heating device (e.g., radiant heating device), as appropriate.

The following are further embodiments of cooking system adaptation based on detected cookware.

Auto-Taring Based on Recognized Cookware

FIG. 10 illustrates an embodiment of a weighing scale function of an induction cooking system. In the example of FIG. 10, the user interacts with region 1002 of the display of the dial (e.g., via touch screen, or rotation of ring with selection via push down of the dial). In response, the display transitions to the user interface shown at 1004.

At 1004, the user can use the physical rotational ring to scroll through the selection menu and make a selection by either pushing down on the dial or using the touch interface. In some embodiments, the tare function can be activated via voice command.

In some embodiments, based on the recognized cookware (or measurement container) being utilized, the cooking system retrieves weight information for the detected cookware (e.g., based on weight information stored in the profile corresponding to the cookware). In some embodiments, the system uses the pre-stored weight of the device to automatically tare the weight scale. For example, if a known frying pan is placed on the system and detected, the weighing scale tares automatically. This allows the mass or weight of an ingredient in the cookware to be automatically determined. The cooking system also supports manual taring.

As shown in this example, for a given type of cookware, the weighing sub-system of the induction cooktop utilized pre-stored weight information of the cookware, containers, etc. (e.g., as stored in a cookware profile). Such weight information of identified cookware can be used in conjunction with information regarding ingredients (which can be determined via the taring described above).

As another example, suppose that the cookware object being used is detected to be a measurement container. In response to recognizing that the cookware object being used is a container for measurement, the system automatically enters an auto-taring mode, including providing a user interface for controlling the auto-taring mode.

In the above example, by recognizing the cookware that is present (e.g., using NFC, RFID, spectral fingerprints, etc.), the system can perform automatic taring (and remove the need for the user to perform multiple steps to tare) to determine the weight of any ingredients in the measurement container or cookware. This is facilitated by using the techniques described herein to identify the measurement container/cookware and use the pre-loaded or pre-stored weight for the cookware/container holding an ingredient.

The following are further examples of various weight information maintained or monitored by the system or are included in a cookware's profile, which include, without limitation:
- weight of cookware/container
- weight of parts of cookware/container, such as the weight of the lid of a pot
- weight of ingredients that are already present in the cookware/container
- weight of ingredients that are added to cookware/container during step-by-step cooking guidance (examples of which are described in further detail below).

The tracking of such weight information of cookware, ingredients, etc. facilitates various types of functionalities that are beneficial for a user, such as, without limitation:
- when the cookware or container that already contains ingredients is placed on the weighing scale, the system calculates the weight of the ingredients by subtracting the weight of the cookware/container (automatic taring, as described above)
- the system tares automatically as step-by-step cooking guidance progresses
- the system is able to infer or derive or otherwise determine, at any point in time of a cooking session, changes in weight (e.g., during sauce reduction of a cooking session).

As shown in this example, the context of the cookware is not only utilized during heating/cooking stages, but also during preparation phases of a cooking session. The context of the cookware can also be used to facilitate maintenance phases as well.

Contextual UI and Technique Monitoring and Guidance Based on Identified Cookware In some embodiments, the intelligent induction cooking system described herein provides an all-in-one heating system for a variety of cooking needs. In various embodiments, this is facilitated via a universal interface that is adaptable and universally applicable to the context of the cookware being used.

For example, the induction cooking base system recognizes the type of cookware object in use via identifiers such as NFC (Near Field Communication)/RFID (Radio Frequency Identification) tags, spectral fingerprints, etc. and provides a custom user interface for the pan or cookware via the user interface on the base system. This is in contrast to existing induction cooktops which typically only detect presence, not type. This is also in contrast to standards such as the Ki standard, which keeps the interface on the device, where each cooking appliance is associated with its own interface and its own specific functions. In contrast, the user interface of the base cooking device is a centralized, singular interface that is universally adaptable or responsive to the cookware that has been recognized to be in use for cooking.

As one example, controller 304, via UI controller 306, adapts the user interface presented to a user based on the recognized type of cookware. One example of providing a contextual user interface is providing specific prompts to a user (e.g., via a contextual UI), where available prompts are dependent on the type of cookware being used. For example, the available techniques for users to provide input of type of cooking method or technique to be performed. As another example, the user provides an input of a desired end result or ingredient end-state (e.g., doneness of steak, crispiness of pancake, doneness of eggs, etc.). In some embodiments, a selection of desired ingredient end-state is made from a set of available options for ingredient end-state. In some embodiments, what ingredient end-states are available for selection is based on cookware type, technique type, or both.

As described herein, by recognizing the type of cookware that is to be used/in use, and thus knowing the properties of the specific cookware being used, a contextual user interface is provided that is customized towards that specific type of cookware.

As one example, the menus and sub-menus presented in the user interface are controlled based on the type of recognized cookware. Available options in the menus are determined based on the type of recognized cookware. Allowed inputs that the user is permitted to provide are based on the type of recognized cookware. Responses to user selections are also determined based on the recognized type of cookware. For example, if a pancake pan is detected, then the technique menu only includes the subset of cooking techniques (out of the superset of all of the techniques that the cooking system can perform and/or provide automated guidance on) that are available for use with a pancake pan. As another example, available options for selecting the desired doneness or end-state of ingredients are constrained by the cookware. For example, if an egg cooker is recognized as being in use, then the menu that is displayed is limited to doneness options for eggs. Different types of cookware can be associated with different menu options for selecting doneness (e.g., menu options for selecting level of crispiness when using a pancake pan, menu options for selecting level of doneness of steak when a frying pan is used, etc.). In some embodiments, the available menu and sub-menu operations and structures are maintained in the cookware profile. By automatically adapting the menu options of the user interface based on the recognized cookware, the system can guide the user through a much more streamlined interface as compared to other existing systems.

Another aspect of the contextual user interface described herein includes cooking technique guidance, monitoring, and control via the user interface. In existing systems, users typically reference an external resource such as a cookbook to determine how to perform certain techniques. In contrast, in embodiments of the techniques described herein, the parameters for various cooking techniques are built into the cooking system itself. In some embodiments, the cooking techniques are implemented in the system as cooking programs or routines. This includes having the parameters for different cooking techniques integrated into the cooking system, such as for simmering, sauteing, etc. By integrating the system parameters along with the onboard and connectable sensor measurements, a contextual user interface that is adapted both to the type of cookware, as well as the cooking technique being utilized is presented.

This includes detecting certain types of phases of a cooking technique. The phases or state of the cooking technique are determined based on the detection, from monitoring of onboard sensor measurements, of various cooking insights, such as detection of user interventions/actions, detection of foodstuffs state, weight measurements, temperature measurements, cookware temperature, probe temperature, etc. The detection of cooking phases allows the system to provide technique guidance (e.g., when a current phase of a cooking technique is completed, when to move on to the next phase of the cooking technique, etc.). In some embodiments, the contextual user interfaces provided, as described above, are also determined based on the detection of phases of cooking techniques. For example, given a weight and a recipe, the system is programmed to expect a certain type of cooking content (e.g., protein). Based on this, when a certain amount of weight has been added, the system can provide guidance on how to adjust certain functions via the user interface (e.g., how to use a browning percentage function). In this way, the cooking user interfaces are both dynamic and contextual.

In some embodiments, the triggers for determining cooking insights are not only dependent on the onboard sensor measurements, but also the characteristics of the cookware that is in use. That is, the user interface provides various information about a technique being performed. The manner in which the user interface updates to provide updated information is based on detection of monitored cooking state information. The manner in which cooking state information is detected is dependent on both the sensor measurements, as well as the characteristics of the cookware being used. In this way, the technique guidance that is provided via the user interfaces is also adapted to the context of the cookware being utilized. Further, presented information such as prompts are also tailored to the context of the cookware recognized as being in use. Further examples and embodiments of determining cooking insights based on recognized cookware are described below.

Recognizing cookware and having a contextual interface that is adaptive to the context of the recognized cookware improves the quality of the cooking experience. For example, the integrated system is programmed with various types of cooking techniques. This includes information on technique guidance to provide instructions via the contextual user interface for the user to follow. For example, a cooking technique may involve flipping at a certain phase of the cooking process. In some embodiments, the cooking system is configured to provide notifications of user actions to be performed as the cooking progresses.

As described above, the information that is provided, and the available inputs that are presented via the contextual user interface are dynamically determined based on the monitoring of the phases of the cooking technique being performed. In the below examples, technique guidance is provided via the user interface, where the information provided via the user interface is used to facilitate technique guidance to guide the interaction of the user with the detected cookware. In this way, the cooking system provides an interface to manage various different types of cookware. This removes the need for individual cookware objects to have their own respective interfaces. Technique guidance is one example of complex functionality that is provided via the user interface. Other examples of functionality supported by the universal interface include using a singular interface to drive multiple different types of cookware objects.

The following are embodiments of adaptive cooking user interfaces based on identified or recognized cookware.

Figure 11A:
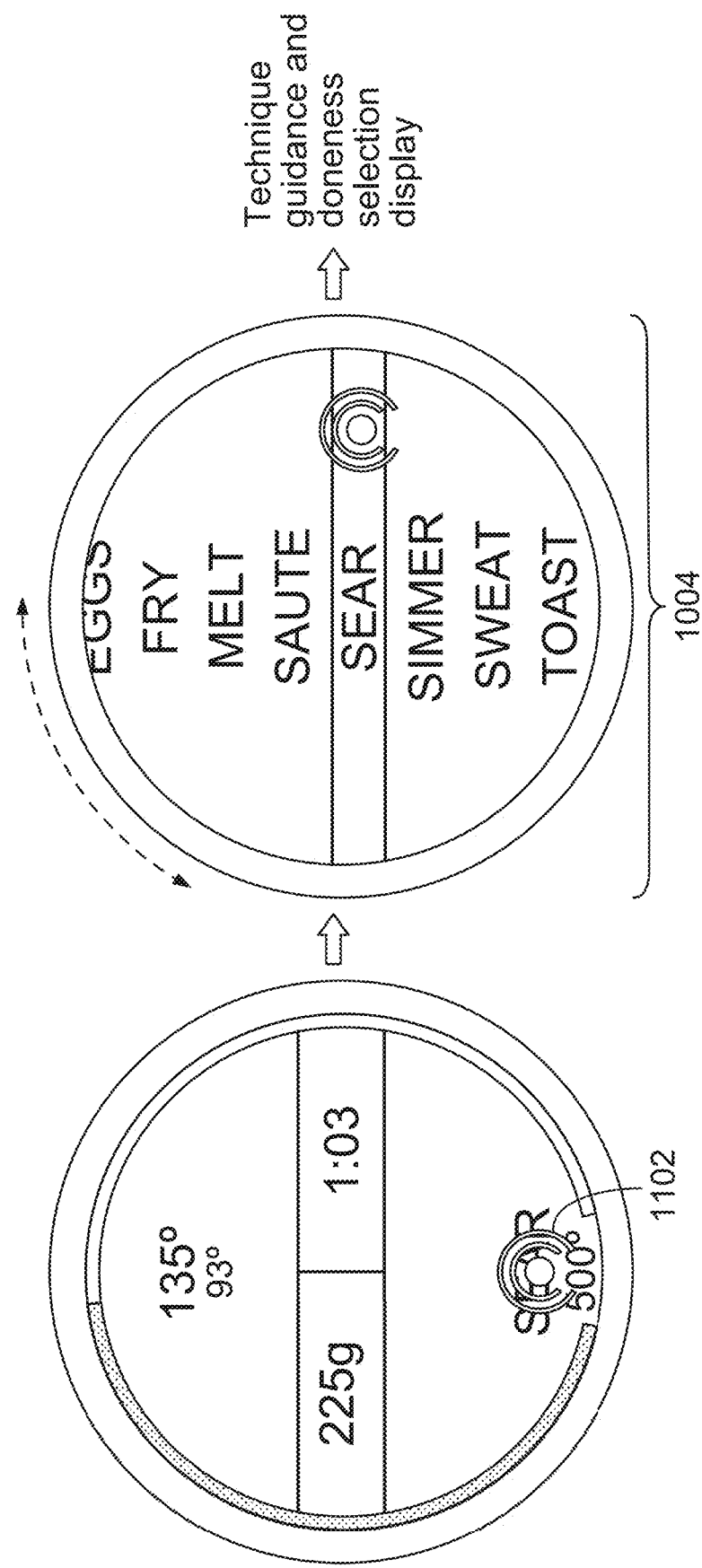
FIG. 11A illustrates an embodiment of cooking technique selection.

FIG. 11A illustrates an embodiment of cooking technique selection. In this example, the user interacts with region 1102 of the display of the dial (e.g., via a touch screen interface). A technique selection menu that includes available cooking techniques is displayed in response, as shown at 1104. As shown in this example, the technique selection menu is contextual, and is dependent on the type of cookware that is placed on the system (and detected/identified). For example, at 1104, available techniques for a detected frying pan are shown. The user can then interact with the contextual user interface that presents information that is adapted to the detected type of cookware, such as by scrolling through cooking technique options by rotating the ring dial or scrolling via the touchscreen, making a selection of a cooking technique by touching a selected option or pushing down the dial, etc. After a cooking technique is selected, the UI updates to provide guidance on how to execute the selected technique, as well as provide options for the user to specify the doneness they desire.

The following are examples of contextual user interfaces for technique guidance and doneness selection that are adapted to different identified cookware.

Figure 11B:
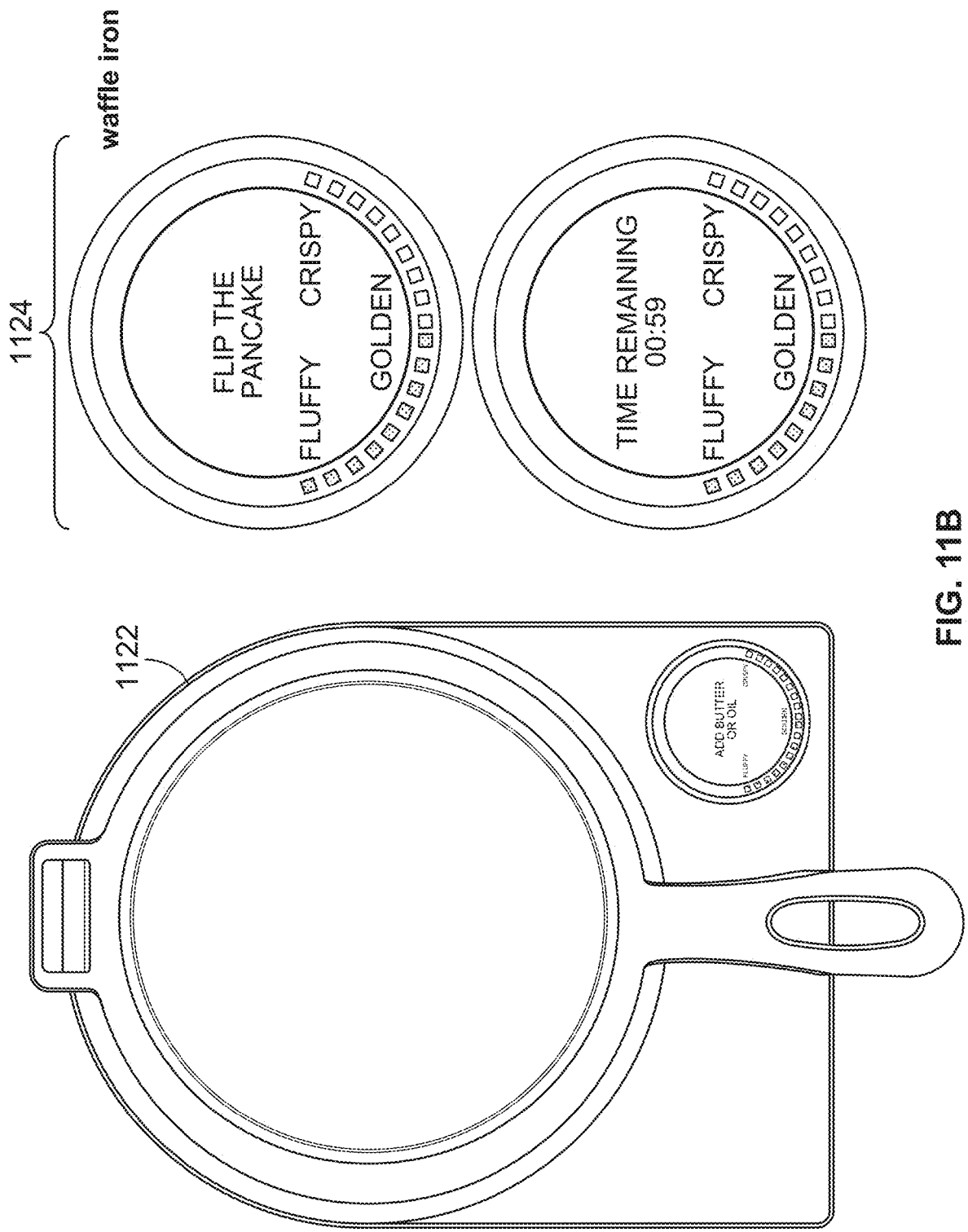
FIG. 11B illustrates an embodiment of contextual technique guidance and doneness selection user interfaces adapted for a waffle iron.

FIG. 11B illustrates an embodiment of contextual technique guidance and doneness selection user interfaces adapted for a waffle iron. In this example, the induction cooking device automatically detects that cookware of type waffle iron has been placed on the induction cooking device.

In this example, a waffle iron is shown at 1122. The system adapts provided user interfaces based on recognition of the waffle iron. An example of such a user interface based on cookware context is shown at 1124. In this example, technique guidance specific to the detected type of cookware is shown, where the user interface provides instructions to "flip the pancake". Such technique guidance would not be provided in the context of other types of cookware being detected, such as a rice cooker.

In the example cookware contextual user interface of 1124, doneness selection options relevant to the detected waffle iron are also provided, such as the level of doneness for pancakes being made, such as fluffy, golden, or crispy. The menu options or information for doneness are specific to the context of the waffle iron being recognized as in use.

Figure 11C:
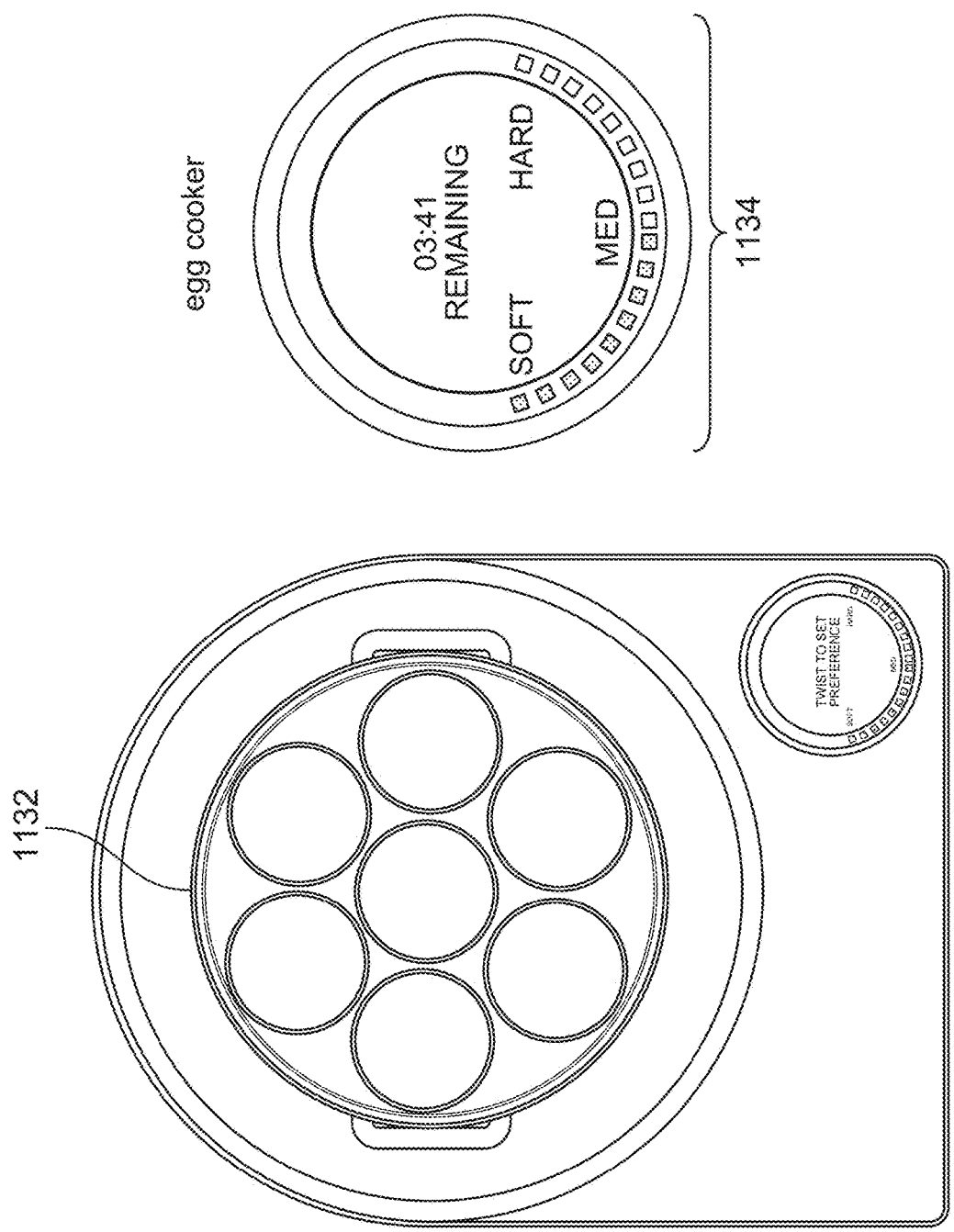
FIG. 11C illustrates an embodiment of contextual technique guidance and doneness selection user interfaces adapted for an egg cooker.

FIG. 11C illustrates an embodiment of contextual technique guidance and doneness selection user interfaces adapted for an egg cooker. In this example, the induction cooking device automatically detects that cookware of type egg cooker has been placed on the induction cooking device.

In this example, an egg cooker is shown at 1132. The system adapts provided user interfaces based on detection of an egg cooker. An example of such a user interface based on cookware context is the doneness selection menu 1134. Via the interface of 1134, a user can select a desired level of doneness for eggs being cooked (e.g., soft, to medium, to hard). As shown in this example, the options for doneness selection for the egg cooker are different from the selectable doneness options provided for the waffle iron (as shown at 1124 of FIG. 11B).

Other contextual user interfaces can be presented where what content or information is presented is automatically adapted to the type of identified cookware. One example is a pan maintenance guidance user interface that is presented at the end of a cooking session.

Figure 11D:
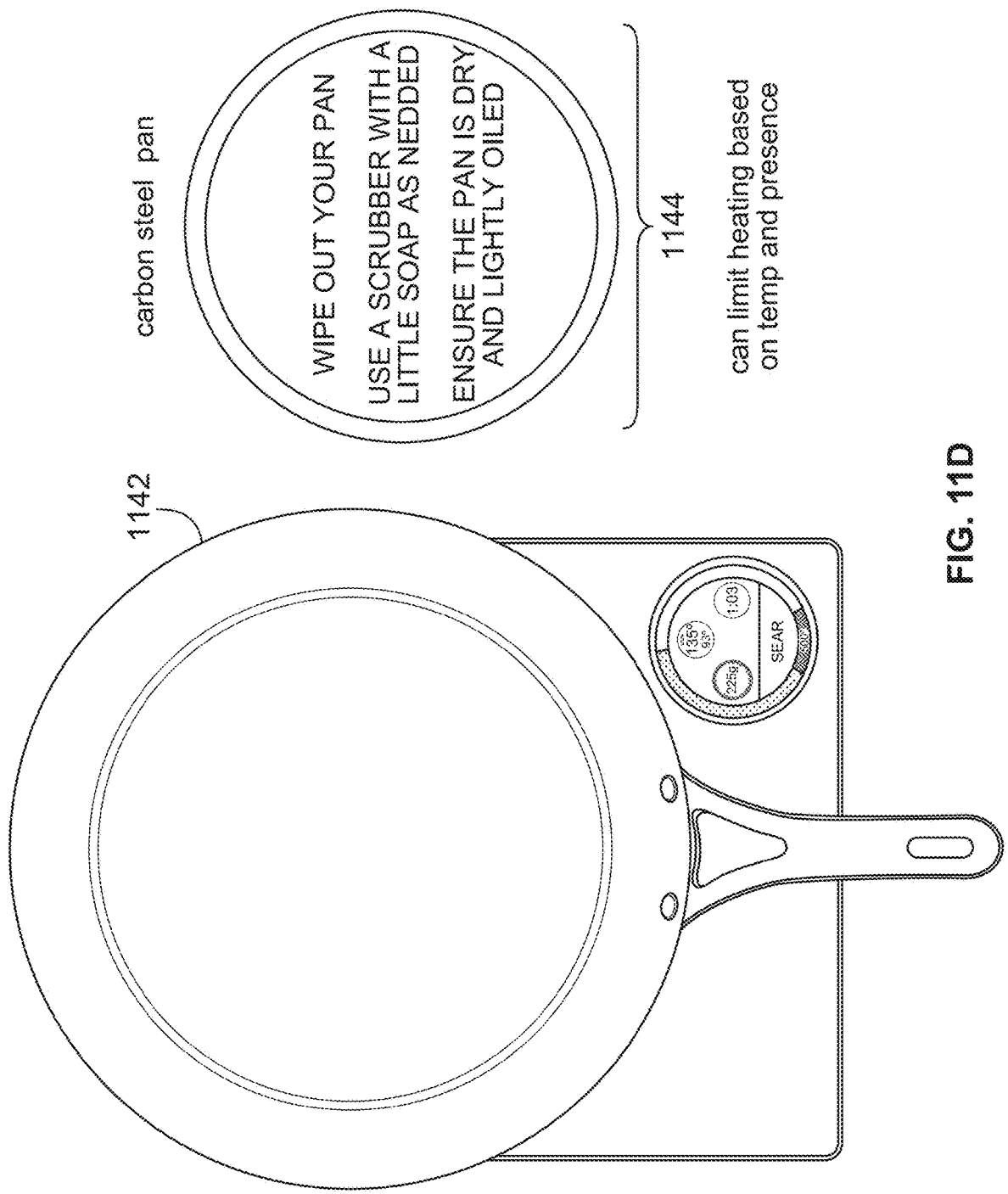
FIG. 11D illustrates an embodiment of a contextual user interface for pan maintenance guidance adapted for a carbon steel pan.

FIG. 11D illustrates an embodiment of a contextual user interface for pan maintenance guidance adapted for a carbon steel pan. In this example, the induction cooking device automatically detects that cookware of type carbon steel pan has been placed on the induction cooking device.

In this example, at the end of a cooking session, the induction cooking device is configured to present a maintenance notification 1144 that is adapted specifically for the recognized carbon steel pan. For example, the maintenance instructions shown for the carbon steel pan include to "wipe out your pan," "use a scrubber with a little soap as needed," and to "ensure the pan is dry and lightly oiled. Different maintenance instructions are presented for different types of cookware that are recognized to be in use.

In some embodiments, in addition to the UI, other parameters of the system can be adapted to the type of cookware and for a desired cookware action. For example, with respect to cookware maintenance, the cooking system provides a cookware maintenance mode, which adapts heating control for maintaining detected types of cookware. As one example, this includes limiting heating based on temperature (as measured by sensors), and presence. For example, if maintenance of a detected carbon steel pan is to be performed, then the system limits its heating (e.g., by adjusting the power delivered to the coils, based on temperature and presence).

As shown in the above examples, by performing automated user interface configuration based on recognized cookware type, embodiments of the cooking system described herein, much more streamlined interfaces can be provided to a user, as compared to existing systems. In addition to cookware, the cooking system described herein is configured to automatically provide contextual, centralized user interfaces adaptive for controlling and/or presenting information for various other types of devices as well, such as pressure sensors, moisture sensors, fans within a pressure cooker for moisture regulation, circulators (e.g., plugged into the USB-C port of the cooking device, or that are battery operated and wirelessly communicate with the cooking system), etc.

In various embodiments, information and user input options presented via the contextual user interface are provided by a high pixel density touchscreen such as dial 106 that facilitates the providing of complex graphics to convey a sophisticated amount of information that is configurable and adaptable to operate across a broad spectrum of different types of cookware or devices. In this way, the user interface is a singular, universal interface that can control, during a cooking session, a multitude of cookware being utilized in conjunction with and/or connected to the cooking system. For example, after the user is done using one type of cookware and removes it from the cooking device, the user can then place another type of cookware on the cooking device. The presence of the newly added cookware is detected, and its type automatically recognized. The user interface automatically updates or adapts in response to the recognized cookware. In this way, a singular user interface device is used to control the entire cooking environment, without the user needing to interact with multiple different interfaces or have to manual determine what to select from the space of all possible options.

While in the above examples, the dial is shown to be connectable and integrated with an induction cooktop, the dial and the contextual user interface can be used in conjunction with other types of heating or cooking devices, as appropriate. For example, a similar type of dial with a contextual user interface can be used with an oven, or all-in-one system that includes microwave, steam, air frying, baking, convention, grilling, etc. Such a dial and interface can also be used with a built-in, multi-zone cooking system. For example, each induction burner can be associated with its own smart dial. In some embodiments, the built-in cooking system has multiple types of heating elements (e.g., induction, radiant heat, etc.). As another example, the dial can be connected to other cooking appliances, such as multi-function cookers. In this way, a unified user interface can be used to provide a universal interface for any cookware or cooking device used in conjunction with the intelligent induction cooking system described herein.

Another example cooking appliance that the dial can also be configured to be a user interface for is a multi-cooker. When in use with the induction cooking system (e.g., placed on the top plate of the induction cooking system), various components of the multi-cooker are controllable by the induction cooking system. The following are further embodiments of a multi-cooker.

Embodiments of the cordless cooker described herein replace various types of cookware, such as pots, high-end rice cookers, slow cookers, Dutch ovens, etc. In some embodiments, the multifunction cookware is also portable, allowing transport from the base "burner" system to a dining table.

In some embodiments, the multi-cooker is an all-in-one cordless multi-cooker with a built-in heater that receives wireless power transfer from the induction burner (e.g., by utilizing the KI standard), where control is centralized with the dial (such that there is no cluttered UI on the multi-cooker).

In some embodiments, the multifunction cookware includes an insulated body with heating (via the induction coil). The multifunction cookware also incorporates various sensors for cooking performance and safety. In some embodiments, the multifunction cookware includes a sous vide mode with data transfer (e.g., via NFC). Example functions of the multifunction cookware include pressure cooker, rice cooker, and soup cooking.

The following are examples of construction of multifunction cookware. As one example, the multifunction cookware is 6 quarts within a stainless-steel inner surface (or any other volume/material selection as applicable). An electric connection (e.g., pin or wireless) is made with the induction coil/burner (e.g., via dimple/pin or induction coil wireless power and signal/data transfer). In some embodiments, the multifunction cookware is insulated (e.g., vacuum or via plastic shell).

In some embodiments, the multifunction cookware is associated with different types of smart lids. One example type of intelligent lid is a pressure smart lid with sensors (e.g., temperature and pressure sensors), pressure release valve, and integrated stirrer. Another example of an intelligent lid for multi-function cookware is a transparent non-pressure smart lid, with sensors and integrated stirrer. The following are further embodiments of an intelligent lid for multi-function cookware.

Figure 12:
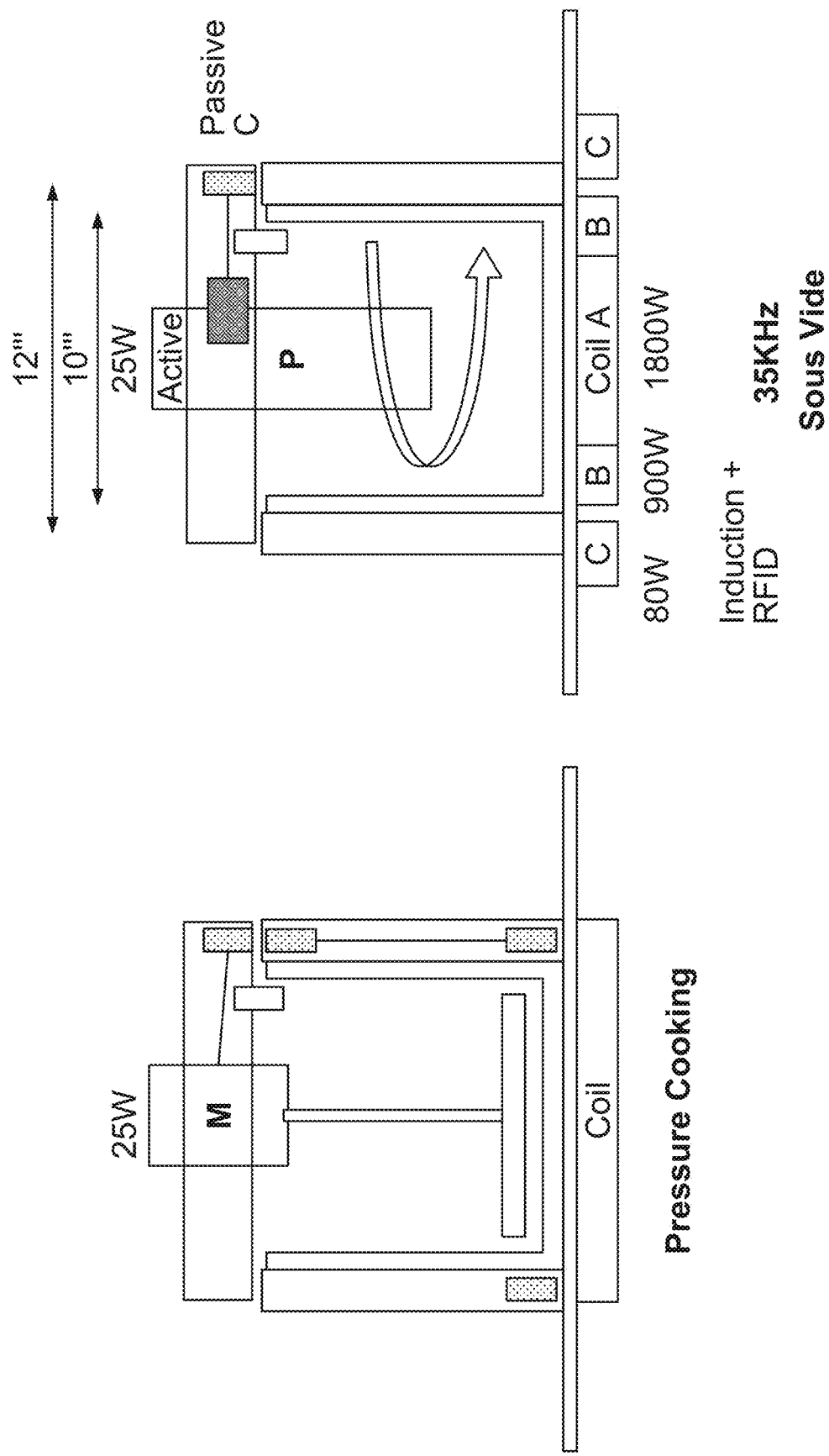
FIG. 12 illustrates an embodiment of a multi-function cooker with a smart lid.

FIG. 12 illustrates an embodiment of a multi-function cooker with a smart lid. In some embodiments, the multi-function cookware with smart lid shown in FIG. 12 is an embodiment of the multi-cooker with smart lid 212 shown in the example of FIG. 2. In some embodiments, the intelligent lid or cover communicates with the induction burner via a protocol such as NFC. For example, sensor signals are transferred between the multi-function cookware and the base induction system via NFC. Power is transferred from the induction burner to the smart lid, such as via wireless induction power transfer, or via physical electrical cable (e.g., USB connection, via which data transfer can also be provided). In some embodiments, the smart lid includes integrated sensors for control and safety. As another example, the smart lid includes an integrated motorized actuator (e.g., for stirring). In some embodiments, the motor obtains power via the induction coil or a wired power connection. In some embodiments, in addition to driving a mixer/stirrer, the motor also drives a fan of the multifunction cookware. As yet another example, the smart lid includes an integrated motorized venting (e.g., for pressure and moisture control). In some embodiments, the smart lid includes built in pressure transducers and thermal sensors. Other example sensors incorporated in the multifunction cookware include moisture and humidity sensors.

The following are further embodiments of control of a multifunction cookware. As one example, multi-cooker control is used to facilitate a pressure-cooking mode, to, for example, detect overheating of food which will result in low, or no pressure built up in the pressure cooker mode. In some embodiments, multi-cooker control is based on the aforementioned sensors, which as one example are located on the upper area of the pot (side wall, lid, etc.), either with a wired connection or wireless connection.

The following is another example of multi-function cookware control. In some embodiments, the multi-function cookware can be controlled based on onboard sensors of the base system, without requiring additional sensors incorporated in the multi-function cookware. For example, temperature sensors of the base system take measurements at the bottom of the pot, either through direct contact (e.g., protruding temperature contact) and/or via the heating top plate glass, to detect different heating rate and/or stabilized temperature after certain predetermined periods of time. Further information such as the weight and weight change of the pot, power input/output measurement, etc. can also be provided as input to the control algorithm for controlling components of a multi-function cookware.

The following is another example of heating control involving a multi-cooker. In some embodiments, the lid includes various sensors that the system controller receives measurement data from. As one example, measurement of temperature inside the cookware is performed with a sensor in the lid. In some embodiments, measurement of humidity is performed inside the cookware with a sensor in the lid. As described above, sensor measurements may be used by the system as feedback to control various components of the system. As one example, the system includes an actuator to circulate or stir the liquid inside the cookware, controlled by the system based on sensor feedback.

Figure 13:
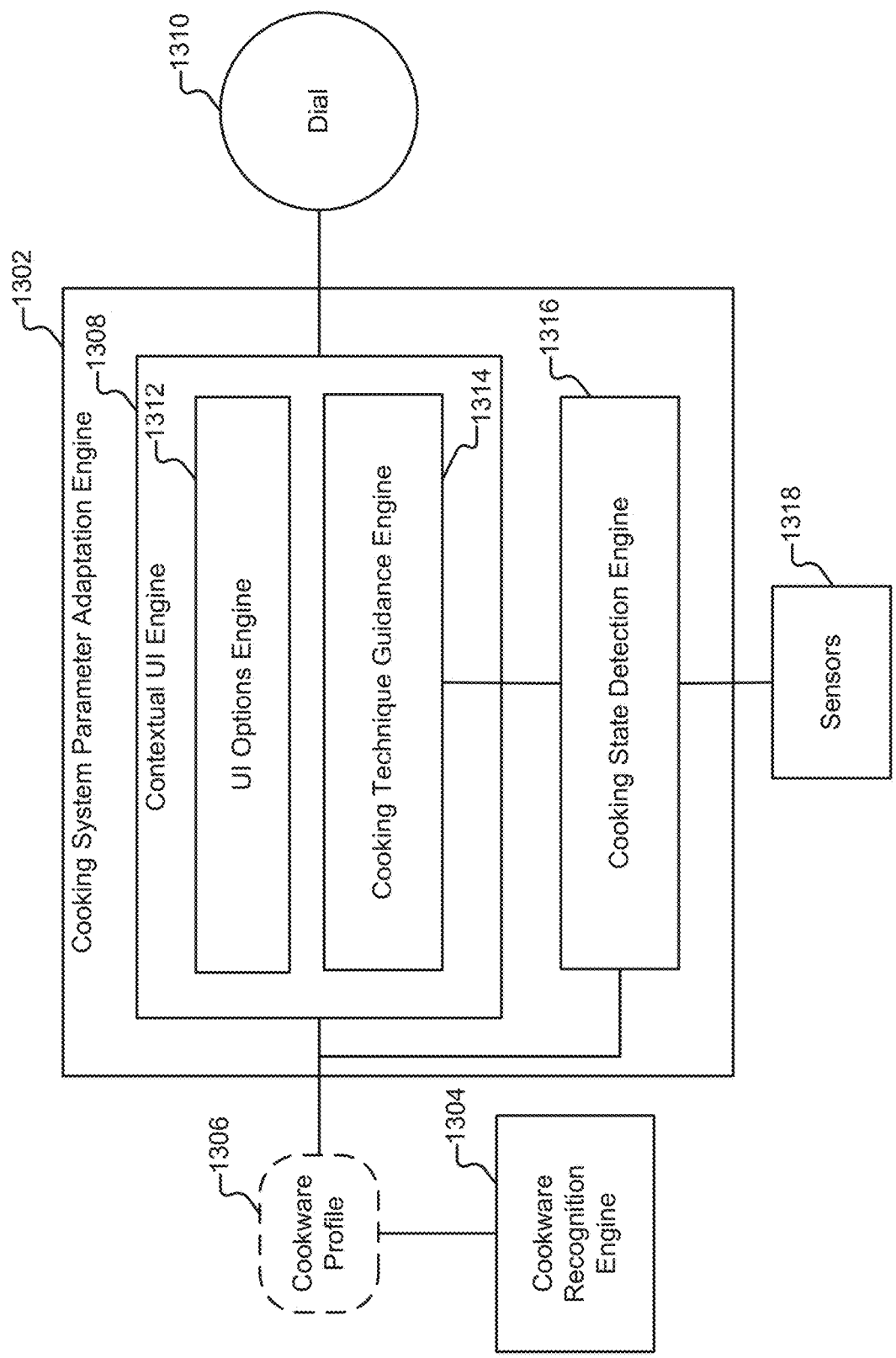
FIG. 13 illustrates an embodiment of a system for cooking system adaptation based on recognized cookware.

FIG. 13 illustrates an embodiment of a system for cooking system adaptation based on recognized cookware. In some embodiments, system 1302 is an alternative view of system 300 of FIG. 3. In this example, cookware recognition engine 1304 is configured to recognize a type of cookware that is being used with the cooking system. Examples of cookware recognition include detecting using NFC, RFID, etc. As another example, cookware recognition is performed using Wi-Fi, where a cookware object that has a transmitter is configured to communicate with the cooking system over Wi-Fi to identify itself to the cooking system. Cookware can also be identified by characterizing or determining a signature of the cookware via sensors (e.g., a spectral signature determined by probing the cookware using the induction coil, microphone, speakers, weight sensors, temperature sensors, etc.). Users can also input, via the contextual user interface, the type of cookware that they are using, notifying the system of the type of cookware that is in use. For example, the user can search from a set of registered cookware and make a selection of the cookware they are using. The user can also indicate the type of cookware they are using via voice inputs.

In some embodiments, a cookware profile 1306 corresponding to the recognized cookware is accessed. For example, the cookware profile is accessed by accessing a record corresponding to the recognized cookware. Different types of cookware are associated with corresponding cookware profiles. In some embodiments, the cookware profiles include various system parameters that are used by the cooking system to adapt its operation. One example of such cookware information includes user interface configuration parameters, such as menu options, prompt options, etc. In various embodiments, the cookware profiles are stored locally to a memory of the cooking system, retrieved from a cloud entity, and/or read from the cookware being utilized.

In some embodiments, the characteristics of the cookware are inferred from other contextual information. For example, it may be the case that the cookware object is not directly identifiable or detectable by the system. In some embodiments, other information is used as context to at least infer some of the properties of cookware being used. For example, the type of cooking technique being performed, or the recipe being implemented can be used to infer properties of the cookware being utilized. As one example, suppose that a user has indicated that they are cooking a Moroccan tajine. In some embodiments, the system performs a lookup of a record corresponding to the selected technique and determines the type of cookware that is typically used to create such a dish. In this example, a profile for cookware used in conjunction with the technique indicates that ceramic-type material is commonly used to create tajine. Based on the profile of cookware used to make tajine, the system determines that the cookware is likely to be ceramic, and the system adapts its components accordingly, such as being gentler with respect to heating power to prevent cracking.

The cookware recognition and profiles containing cookware-specific parameters are used by cooking system parameter adaptation engine 1302 to recognize, out of all the possible different types of cookware that exist (pots, pans, appliances, etc.), what type of cookware is actually being used, and in response determine how to optimally control the operation of the cooking system, including configuring the system to facilitate interaction with various different types of cookware from a singular interface. For example, regardless of what type of cookware the user puts on the cooking device, the cooking device provides a user interface that is adapted and specific to the recognized type of cookware to manage the cooking experience. In this way, cookware such as appliances such as a rice cooker or instant cookers need not have their own dedicated display on the appliance itself.

In this example, contextual UI engine 1308 is configured to control the user interface that is displayed on dial 1310 (an example of dial 106). In this example, the user interface that is provided is adapted to the cooking context, which includes the type of cookware object being used. The cooking context for adapting the UI also includes what cooking technique is being performed. In some embodiments, the contextual UI engine provides available inputs and determined outputs based on the cookware profile 1306 of the recognized cookware.

In this example, UI options engine 1312 is configured to determine the content for menus to be displayed, UI options for selection, the response of the user interface to various inputs, etc. based on the detected cookware object. As one example, suppose that the presence of a specific type of frying pan, known to the system, is detected. On the display/contextual user interface, a technique selection menu is only populated with those techniques that can be performed using the frying pan. For example, pressure cooking techniques are not displayed. Instead, only cooking techniques such as searing, toasting, etc. that can be performed USING the frying pan are presented via the display. For example, suppose that there are overall 150 available techniques in all. The cooking system selects a subset of techniques that is available for selection for the frying pan.

In this example, cooking technique guidance engine 1314 is configured to provide guidance on cooking techniques being performed using the recognized cookware object and the cooking system. For example, suppose that a user has made a selection of a cooking technique from the subset of cooking techniques that are available for the detected type of cookware object.

In some embodiments, as the user performs a cooking technique, the technique guidance engine is configured to update the user interface based on the state or phase of the cooking technique being performed. In various embodiments, and without limitation, cooking state includes the state of the cookware, the state of the ingredients in the cookware, the state or phase of a cooking process (e.g., cooking technique), user actions or interventions that have been performed, etc. In some embodiments, the state of the technique, as well as detection of events that occurred during the technique are determined by cooking state detection engine 1316.

Cooking state detection engine 1316 is configured to monitor the state or phase of a cooking session over time. In some embodiments, determining the state or phase of the cooking session includes determining insights/applications from sensor measurements/data (e.g., collected from onboard and/or collected sensors 1318).

In some embodiments, the manner in which sensor data is translated, synthesized, or otherwise mapped into insights is dependent on the context of the type of cookware object being used. For example, for the same sensor readings, different insights may be determined for different types of cookware. In some embodiments, in addition to taking as input sensor readings from sensors 1318, the state detection engine also takes into account the characteristics of the cookware (as obtained from cookware profile 1306) to perform cooking state and event detection.

The state and events detected by engine 1316 are used by guidance engine 1314 to determine how to update the UI to provide relevant information to the user about the progress of their cooking. For example, the contextual UI is an event-driven interface. In some embodiments, the insights include detection of various events, where the events are used as triggers for updating the user interface. How events are detected, as well as what events are used as triggers for driving the user interface can be cookware specific. The integration of sensors and synthesis of cooking state information provides accurate feedback to both the user (via the user interface), as well as cooking control. Further examples of insights are described in conjunction with the example of FIGS. 15A-C.

FIG. 14A illustrates an embodiment of available cooking techniques for a non-stick pan. In this example, the list of available techniques for the pan is shown in a profile for the pan. In addition, for each technique, temperature pre-sets, temperature ranges, and speeds that are specific to the characteristics of the pan are shown. For example, while a different pan may have the same available techniques, the temperature pre-sets and temperature ranges may be different based on the thermal characteristics of the pan. Different pans may have a different set of available techniques.

FIG. 14B illustrates an embodiment of available cooking techniques for a multi-cooker. As compared to the example technique menu that would be configured based on the pan profile information of FIG. 14A, the structure and contents of the menus that would be presented via the universal user interface are different for the multi-cooker. In this example, a profile for the multi-cooker is shown, indicating the available cooking techniques for the multi-cooker. In this example, the profile further specifies sub-menu options for techniques. In this example, under the rice cooking technique, available rice-type options for display are specified. The configuration of the menus for the UI of the cooking device is performed according to the menu parameters of the profile shown in FIG. 14B.

Figure 14C:
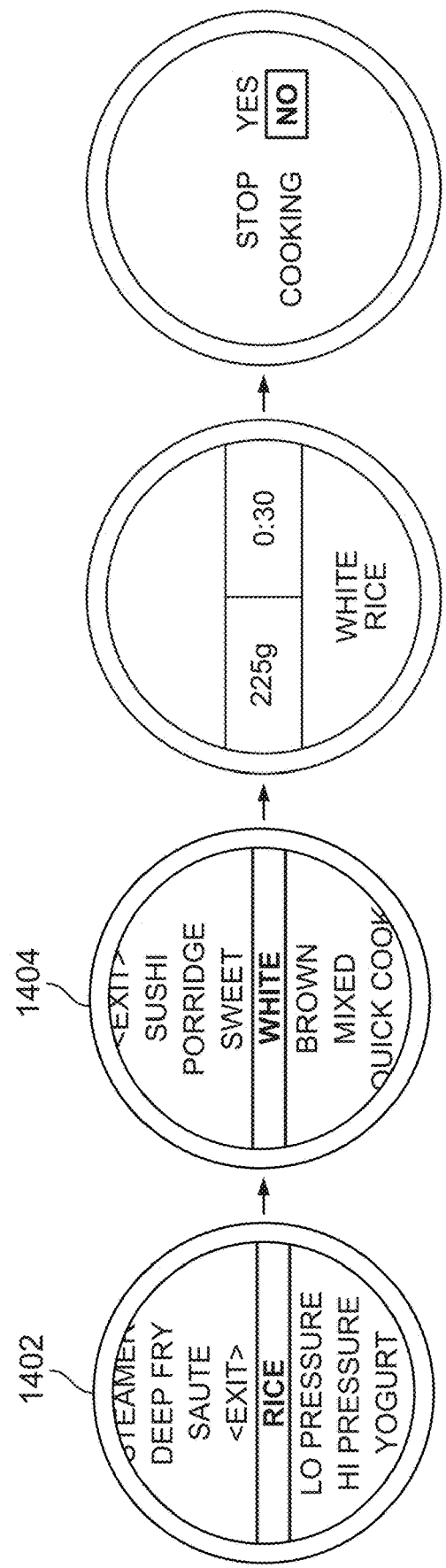
FIG. 14C illustrates an embodiment of a rice cooking menu.

FIG. 14C illustrates an embodiment of a rice cooking menu. In this example, the structure of the menu tree and the options presented in the menus are determined according to the example profile shown in FIG. 14B. For example, the available cooking techniques are shown at 1402, while the rice type sub-menu options are visualized or rendered as shown at 1404, based on the menu configuration information of the multi-cooker's profile, as shown in the example of FIG. 14B.

As described above, in embodiments, the menu configuration information shown in FIGS. 14A and 14B is included in profiles for the non-stick pan and the multi-cooker that are accessible by the induction cooking system. In other embodiments, the system performs a lookup using an identifier of the type of cookware object to determine available techniques. The induction cooking system then uses such profile information to adjust or adapt or configure the technique menus that are presented so that they are linked to the specific cookware being utilized. This includes loading the available techniques, as well as corresponding information pertaining to each technique when using the particular pan, such as temperature pre-set, temperature range, etc.

In some embodiments, if non-registered cookware is being used, a generic or default menu is presented. FIG. 14D illustrates an embodiment of a default cooking technique menu configuration profile for non-registered cookware. For example, a cookware object is determined to be present, but is unable to be recognized. In some embodiments, a cookware object is determined to be non-registered if it cannot be identified by the system (e.g., no NFC or RFID tag, no previously registered cookware that could be found with similar spectral characteristics, etc.). Default menu configuration parameters are then used to drive or control the user interfaces that are presented.

Determining a permitted subset of techniques is one example portion of overall technique guidance that the system can provide based on the context of the detected cookware. In some embodiments, after selection of a technique to be performed, the system further pre-sets the temperature of the cookware (by driving the induction coil) according to the temperature pre-set corresponding to the selected cooking technique, that is specified for the particular type of cookware being utilized.

The cooking system also provides various forms of technique guidance as the user performs cooking. As described above, information used to guide the progression of the technique or cooking routine being performed is also presented via the user interface. In some embodiments, the conditions under which the user interface is updated are not only based on the technique being used, but also the detection of cooking states or events. The detection of insights such as cooking states or events is also based on the context of the recognized cookware. Further embodiments of detecting cooking insights are described below.

Detecting Cooking Insights

As described above, by knowing properties of the cookware (based on having recognized the type of cookware object that is detected to be in the presence of the induction cooking system), the system can infer various state or event information pertaining to a cooking technique being performed. For example, measurements are collected from various sensors over time (e.g., the course of a cooking session). Cooking insights and applications are determined from the sensor measurements. In some embodiments, the contextual user interface described herein is driven based on detection of certain events or states during cooking. For example, what information or prompts are presented via the UI and when, as well as what selectable options are available and when, are determined based on the detection of cooking events and states. In some embodiments, the detection of cooking events and states is a function of interpretation of one or more sensor readings. In some embodiments, what cooking insights are determined from the raw sensor measurements is customized to the specific cookware that has been recognized.

FIG. 15A illustrates an embodiment of insights determined from input sensor data. Such insights are used to drive a contextual user interface to provide relevant information pertaining to the state or phase of a cooking session. As shown in this example, various types of measurement data are recorded and collected through various onboard sensors, such as temperature, weight, acoustics, induction, etc. Various different applications or insights are determined from the raw sensor data/measurements. In some embodiments, the derivation of the applications/insights from the raw sensor data is customized to a specific type of cookware. As shown in this example, raw sensor measurements from various sensors, such as acoustic sensors (which can include transducers, microphones in contact with the cookware, microphones that are air-coupled with the cookware, etc.), weight sensors, temperature sensors, etc. are synthesized together to determine various fingerprints or signatures or patterns of sensor measurements indicating certain cooking states or events. Contextual decisions are then made off the detected cooking states or events based on synthesizing sensor readings.

The intersection of such information is used not only to improve the accuracy and the performance of cooking, but combined with knowledge of what type of cookware object is being utilized, facilitates the determination of insights that are not accessible to existing cooking systems. As one example, integration of the properties/characteristics of the cookware object being used, sensor data from integrated sensors, the technique being performed, etc. facilitates the detection of what is occurring inside cookware, such as what is inside the cookware, the state of the ingredients within the cookware, etc. Further, information and prompts based on such insights are provided via the contextual user interface described herein, facilitating more effective interaction between the cooking system and the user when cooking.

One example of insights includes recognition of cookware as described above. Other examples of insights and events determined from sensor measurements include detecting of user actions. Examples of detected user actions include user actions performed with the cookware and/or with respect to the contents of the cookware, such as flipping, stirring, basting, adding ingredients, removing ingredients, etc. Other detected user actions include user interactions with the user interface, such as setting parameters of the cooking, including setting temperatures, selecting techniques, entering cooking modes such as warming modes, etc. Another example type of insight or event detected or determined by the cooking system from sensor measurements includes content or ingredient condition, such as percentage browning, sauce reduction amount, phase of boiling, thermal mass, position of ingredient in the cookware, etc.

Another example type of insight or event detected from sensor measurements includes environmental conditions, such as altitude. For example, the center temperature contact (temperature contact probe 104 that is in contact with the cookware) is used to determine cookware temperature, cooking stage, etc. The center temperature contact can also be used to determine altitude. For example, suppose that water is being boiled. The altitude is determined by measuring the temperature at which the water boils (water boils at different temperatures at different altitudes with different atmospheric pressures). The temperature at which the water boils is determined by monitoring the gradient of the temperature (measured over time or periodically by the center temperature contact), and observing where the temperature flattens (which is indicative that the water is now boiling). The monitored gradient of the temperature is used to determine what temperature the water boiled at, which is in turn used to infer the altitude at which cooking is being performed.

As another example, suppose that rice cooking is a cooking technique that is being performed. By detecting that a pressure pot or cooker is being utilized, the system is adapted to control temperature not only based on temperature measurements, but also pressure. Without the context of knowing the type of cookware being utilized, it would be difficult for the system to determine that pressure information can be utilized to determine such insights.

Further, other types of insights are unlocked or facilitated based on recognizing the type of cookware object being utilized. For example, by recognizing the type of cookware being used, the cooking system determines what applicable events to monitor for. Different types of cookware may be associated with different types of insights that can be monitored. In some embodiments, the available types of events that the system is configurable to monitor for, given the type of cookware, is included in the profile of the cookware.

As one example, by detecting that a pressure cooker is being utilized, the system can listen to acoustic sensors to determine sound signatures corresponding to certain cooking events or phases relevant to pressure cooking. This includes monitoring for acoustic signatures corresponding to the sound of steam escaping. The sound of steam escaping in the context of a pressure cooker indicates to the system that pressure is building. Further, other phases or events, such as boiling of water, or rolling boiling can be detected. Such cooking context about the state of cooking can be used to provide useful information to the user about the state of their cooking. Such cooking state information can also be used as context for cooking control algorithms, as will be described in further detail below.

As another example of cooking insights based on the context of the cookware object, suppose that a frying pan is recognized to be in use. The characteristic behavior of the pan (e.g., thermal behavior, acoustic behavior, temperature behavior, etc.) is used to implement browning level control detection. For example, by knowing that the current context is that browning is to be performed with a particular type of frying pan (context is a combination of selected technique and cookware type), the cooking system is adapted to monitor for signals in the raw sensor data that correspond to various levels of browning of the ingredient (e.g., percentage browning). In response to detection of a level of browning, the system performs various actions, such as heating control. As another example, the system provides prompts or selectable input options via the UI that are related to the context of browning with the frying pan. For example, the UI is driven to provide a notification that the content being browned (such as an onion) is at a certain browning level (e.g., 50% browning). The UI can also be driven to provide an option to the user to stop browning, or to continue browning. In this example, the user can select, via the UI, to stop browning, or to continue browning. If continuing browning, the user is also provided the option to select a browning level to stop at (e.g., 80%). The system is also configured to control heating to stop cooking when the browning level reaches the user-selected set point. As shown in this example, the cooking state (which is determined based on the context of the cookware being utilized) is used as context for both the user interface and heating control (further embodiments of which will be described below).

As yet another example, by accessing profile information pertaining to a recognized type of cookware and its properties, cooking state information pertaining to sauce reduction using a specific saucepan can be determined. For example, the weight of the cookware and sauce at the start of reduction is measured using the weight sensors of the cooking system. The weight of the cookware is accessed from the profile. The weight of the sauce at the beginning of the reduction is determined by subtracting the weight of the cookware. Over time, the combined weight of the cookware and sauce is monitored. By subtracting out the accessed weight of the cookware, the change in weight of the sauce is monitored over time. In this way, the amount of sauce that has been reduced is accurately monitored. Various UI information can be provided based on the monitored sauce reduction, such as when the sauce reduction level reaches a threshold percentage (based on weight measurements). For example, when sauce reduction reaches 50%, a notification can be pushed to the UI indicating that 50% reduction of the content (sauce) has been reached. In this example, the type of notification that was provided is based on the sauce reduction technique having been selected. The option to select sauce reduction as a technique was made available based on recognition of a saucepan. Further, the notification is based on the detecting a condition of foodstuffs (percentage reduction of sauce). The condition of the foodstuffs was also determined based on recognizing the cookware (so that the weight of the saucepan can be determined and subtracted from the monitored weight on the top plate over time to obtain the sauce weight).

The recording of time-varying weight measurements is also used by the system to track the number of ingredients or items that are being placed in cookware. For example, the change in weight is recorded over time. Step changes in weight that increase measured weight indicate the addition of ingredients into the cookware. Step changes corresponding to reduction in measured weight indicate the removal of ingredients from a cookware object. In other embodiments, removal of ingredients is determined by changes in the sound or acoustics that the food is making.

In some embodiments, each time a step increase in weight change is detected, a count of ingredient objects in the cookware is incremented. Each time a step decrease in weight is detected, the count of ingredient objects in the cookware is decremented. By accessing information about the weight of the cookware, weight changes due to user actions can be determined, which can in turn be used to infer other events (e.g., addition or removal of ingredients).

Other examples of user actions that are determined based on measured weight or mass changes and accessed information of the weight characteristics of the cookware include detecting of stirring, basting, flipping, etc. For example, each of the aforementioned user actions is associated with a corresponding pattern or signature of weight change or fluctuation over time. As one example, when stirring, a pan is pushed. From a weight sensor perspective, the cookware appears transiently heavier at one moment, and then less heavy at a next moment. As another example, when flipping, the measured mass decreases then increases again. Flipping can also be detected based on a change in acoustic signature over time. As another example, flipping is detected based on a signature of temperature changes. For example, when an ingredient is flipped over, the colder side of the ingredient is now in contact with the cookware surface. This will result in a temperature drop in the cookware. The drop in measured temperature of the cookware is used to detect the flipping of the ingredient. In various embodiments, signals from multiple sensors are combined to determine whether a user action has occurred. For example, flipping is detected based on detecting a particular signature of weight changes combined with detecting of drop in temperature within a window of time. That is, the triggering of detection of a certain type of event during cooking can be based on a variety of sensor readings over time.

In some embodiments, detection of user actions is used to further control power delivery to the induction coils. For example, existing induction burners shut off the power when the cookware is not detected. Shutting power off too quickly and abruptly could confuse the user when the user moves or tilts the cookware for certain cooking routines, such as basting or stir frying, and is not intending to stop heating. In some embodiments, when it is detected that the user is performing an action with the cookware that would at least partially remove the cookware from the induction cooking system (e.g., basting, deduced based on detecting a pattern of weight change over a window of time corresponding to basting with the cookware being identified), the induction coil continues to be driven, even if a pan is lifted at an angle.

Other types of information pertaining to the condition of ingredients or foodstuffs being cooked can also be deduced based on accessing information pertaining to the characteristics of the cookware. For example, the thermal mass of what is on the induction cooking system (cookware plus the ingredient) is measured. From the cookware profile, the thermal mass of the cookware is determined. Information pertaining to the content in the cookware is deduced based on the overall measured thermal mass and the accessed thermal mass of the cookware itself, along with temperature measurements.

As another example, the position of the ingredient within the cookware object is detectable. In some embodiments, the cooking system also includes a temperature sensor below the plate that is away from the center temperature probe. For example, one or more temperature sensors are located at the circumference of the top plate. The temperature measurements from both the center probe and the outer probes are combined to determine a cookware temperature distribution. In this way, the system determines the distribution of heat across the bottom surface of the cookware. The distribution of heat is influenced by the position of the ingredients within the cookware. The position of the ingredient is then determined based on the measured distribution of heat, as well as characteristics of the cookware, such as its size, its temperature evenness, etc. For example, given a certain amount of heat (based on the amount of power put into the induction coil), an expected thermal distribution for the cookware without any ingredients is obtained (e.g., included in profile based on characterization of thermal distribution of empty cookware). Differences between the measured thermal distribution of what is on the plate and the expected thermal distribution of the cookware (without any ingredients) are used to deduce the position of the ingredients within the cookware. Updates to the UI can be provided based on the ingredient position. For example, if the ingredient is not in the center of the pan, the UI is updated to include a notification that the ingredient is off-center. A suggestion can also be provided to move the ingredient to the center so that it will be more evenly heated. In this example, the system accesses and integrates a variety of information to deduce information about the ingredients in the cookware, such as the amount of energy being supplied to the induction coil, the measured thermal mass, measured thermal distribution of the cookware, as well as the expected distribution of heat in the cookware (which is known based on recognition of the identity of the cookware being used).

As yet another example, the doneness of content (foodstuffs or ingredients) being cooked is another example of cooking state information that is monitored, and which can be used to trigger updates to the user interface. For example, based on the context of a pancake pan being detected, the system adapts its monitoring logic to monitor for certain events that are relevant to the pancake pan, such as detecting whether the pancakes in the pan have reached a desired level of doneness. For example, the patterns of sensor measurement values corresponding to different levels of doneness are maintained in the profile for the cookware. The system loads the events to be monitored from the profile. The corresponding sensor measurement signatures corresponding to the different types of events to be monitored are also obtained from the cookware profile. In some embodiments, the available doneness levels that a user can select from are also determined based on the context of the pancake pan being utilized.

Detection of ingredient state can be used to drive the contextual user interface. For example, suppose the user is using the cooking system to facilitate automating a pancake making recipe. After a certain level of doneness, the user interface is to prompt the user to flip the pancake. Using embodiments of the techniques described herein, the pancake doneness is monitored. When the pancake doneness is detected to be at a certain level (according to the recipe being automated), the system progresses to a next step of the recipe and commands the user interface to issue a prompt to the user to flip the pancake. After the system detects that flipping has occurred (by identifying a corresponding pattern of weight change, as described above), the system moves to a next step of a programmatic recipe transcription.

Another example of state information that the system monitors for is the addition of ingredients and their types. For example, as described above, the addition of ingredients is determined based on changes in measured weight on the plate of the induction cooking system. Sensor information can be used to differentiate between the types of content that have been added. For example, different types of content, when heated, would result in certain measured thermal and acoustic signatures. Such thermal signatures are monitored for to determine whether the events corresponding to the thermal signatures have occurred. By performing signal processing on the various sensors, the addition of different types of ingredients can be detected by the system and used to provide feedback to the system with respect to the cooking process.

Another example of cooking state monitoring includes monitoring for burning of ingredients based on sensor measurements (e.g., identifying pattern of sensor measurement values that corresponds to a signature of burning ingredients). Another example of cooking state monitoring includes safety monitoring and monitoring for unsafe conditions. As one example, suppose it is determined that a multi-cooker is being utilized with the cooking system. The cooking system is configured to monitor for certain sensor signals that together are indicative of unsafe usage of the multi-cooker (e.g., specific conditions, such as pressure-related conditions that are specific to the multi-cooker).

Other types of checks are facilitated via the context aware cooking state and event monitoring. For example, in the example of the multi-cooker, suppose that the rice cooking technique has been selected and is being performed. The system is configured with logic that monitors the onboard sensor measurements and synthesizes various sensor signals to determine whether specific types of events relevant to rice cooking using a multi-cooker have occurred (where the types of events to be monitored are determined based on the context of the recognized cookware and/or the technique being used). In some embodiments, different types of events are associated with different sensor signatures. A sensor signature is determined as a function of one or more sensor readings, which may be aggregated over time. In some embodiments, the manner in which sensor readings are combined to determine the presence of a specific type of cooking event or state is customized for a specific type of cookware. As one example, the system is configured with an acoustic signature of rice cooking when using the multi-cooker. If there is a deviation in the measured acoustics from the rice cooking acoustic signature, the UI is updated to provide a notification to the user indicating that there is a potential issue with rice cooking. A recommendation to check cooking settings is also provided. In this way, the system also performs validation and checking of the cooking session based on recognition of the type of cookware being used.

The following is another example of safety monitoring. One example type of potentially unsafe event that the system monitors for is whether an empty cookware is being heated. As described above, by accessing the weight of the cookware (e.g., from the profile for the cookware), the system determines whether there are any ingredients in the cookware. If the heating has been on for a threshold amount of time (by monitoring how long the induction coil has been active, etc.), the temperature of the cookware is running away (based on temperature measurements over a window of time), and the measured weight on top of the plate is close to the weight of the cookware (indicating that there is little to no content in the cookware), then this is indicative of an empty cookware being heated. In response to detection of such an unsafe condition, the UI is driven or controlled to provide an alert or notification of the detected unsafe condition. In some embodiments, the system also controls power to the induction coil to turn the coil off.

The following is another example of safety monitoring. Many people use stainless steel trays. However, such trays may not be for cooking. In some embodiments, in response to detecting such a type of cookware that should not be heated (e.g., based on spectral analysis using the induction coil), the system prohibits the induction coil from turning on, thereby preventing the tray from being inadvertently heated up.

As shown in the example of FIG. 15A, another sensor usable by the system is an external temperature probe, which can be connected with the cooking system either wirelessly (e.g., over Bluetooth) or with a wired connection (e.g., USB-C connection). The probe may be powered via a wired connection, battery powered, etc. The external probe can be used to provide a direct temperature measurement of the internal temperature of an ingredient. Such information is usable to provide fine-grain control over cooking processes such as sous-vide.

As shown in the example of FIG. 15A, various acoustic sensors (such as microphones in contact with the cookware, air-gapped, etc.) can be used to detect acoustic signatures of what is occurring during the cooking session.

As shown in the example of FIG. 15A, sensor data associated with the induction coil can also be utilized to determine various insights of cooking state. One example of such insights derived from induction-related sensor measurements includes the amount of heat/energy supplied from power level measurements. Further, material properties, cookware recognition, cookware thermal properties, cooking state (e.g., boiling or other time-varying change from evaporation or food cooking) are determined from impedance measurements. Material properties, cookware recognition, and cookware thermal properties can also be derived from operating frequency measurements.

As shown in the above examples, the cooking system listens to various sensor measurements to determine a cooking state context, and reacts to various cooking event information by driving the user interface to provide relevant context to what is occurring during a cooking session. Further, the processing of raw sensor data in the context of the cookware being utilized facilitates the identification of relevant signals that are used as feedback throughout the system, such as the user interface and induction control. The integration of the cookware profile information, onboard sensor measurements, user interface, and control algorithms facilitates various complex functionality.

Another example of information and measurements that the system utilizes to determine insights is measurements or interaction data of the dial interface itself. For example, insights such as user intent are determined by the system from user inputs and interactions with the centralized user interface. For example, via the integrated user interface, the system determines what levels the user has set, whether they have adjusted any setting levels, etc. What cooking technique the user has selected is also determined by the system, which, as described above, is used as context for the system in determining how to control heating parameters of the system, for determining what types of events or state to monitor for, etc. For example, if the user selects the "toasting" cooking technique via the user interface, then the system is adapted to monitor for events pertaining to toasting (rather than, say, monitoring sensor data for water boiling, which is unlikely when toasting). By inferring user intent from detected user inputs via the user interface, the characteristics of the cookware being used, and the various other measurements described above, the system achieves greater accuracy and insight into the cooking environment, facilitating various adaptations that the cooking system can make to improve the cooking experience.

FIG. 15B illustrates examples of cooking insights derived from user interface measurements. As described above, the dial or user interface is another example of a sensor, which in this case, senses settings provided by the user. Various insights can be determined from user interactions, as shown in the example of FIG. 15B.

The following is another example of deriving user intent. As shown in the example profile information of FIGS. 14A and 14B, for a given type of cookware and cooking technique, operational temperature settings such as temperature pre-sets and temperature ranges are specified. Suppose that the user is selecting the toasting cooking technique. The system, based on the profile information shown in the example of FIG. 14A, sets the temperature to the pre-set temperature of 284 degrees Fahrenheit. Now suppose that the user adjusts the temperature via the user interface to be higher or lower. The system monitors the desired user input to determine whether it is within the allowed temperature range given the context of the type of cookware being used and the technique being performed (according to the temperature range information for the technique using the pan, as specified in the pan's profile). If so, then the user adjustment is permitted, and the heating control is adjusted according to the user input. If the user adjustment is out of bounds, then the system reacts in response, such as by limiting the amount of adjustment to be within the temperature range, notifying the user via the UI that the adjustment is beyond the (suggested) temperature range for this technique with this cookware, etc.

In some embodiments, the user can enter a manual mode of cooking. In some embodiments, when in manual mode, the system provides the user with default, cookware-agnostic options or settings for manual control, such as "low," "medium," or "high," where each setting is associated with a temperature range. For example, the options are determined based on the profile information shown in FIG. 14D.

In some embodiments, the cooking system is used in conjunction with an external device, such as a mobile device (e.g., smartphone, tablet, etc.). In some embodiments, an external camera device is used that can be positioned at a certain distance and/or angle to be able to view the contents of the cookware. As another example, the camera is an external device included in the range hood, above the cooking device.

The external device may be connected to the cooking device via a wired (e.g., USB-C) or wireless connection (e.g., Wi-Fi, Bluetooth, etc.). The external device may include a variety of sensors, such as a microphone, camera, etc. In some embodiments, such as when the external device is a mobile device such as a smartphone, a companion app is installed on the external device for use in conjunction with the cooking device.

FIG. 15C illustrates embodiments of insights and applications determined from measurements/data collected by the external mobile device. For example, camera measurements can be used to determine user actions with respect to ingredients, such as stirring, basting, flipping, adding, removal, etc. Camera measurements can also be used to perform ingredient recognition, ingredient size determination, cooking state detection, etc. Acoustic measurements can be taken using the microphone of the external device and used to also determine events that are occurring during cooking. In some embodiments, usage of the companion app can be used to determine user inputs and intent, as well as other information such as technique selection.

Figure 16:
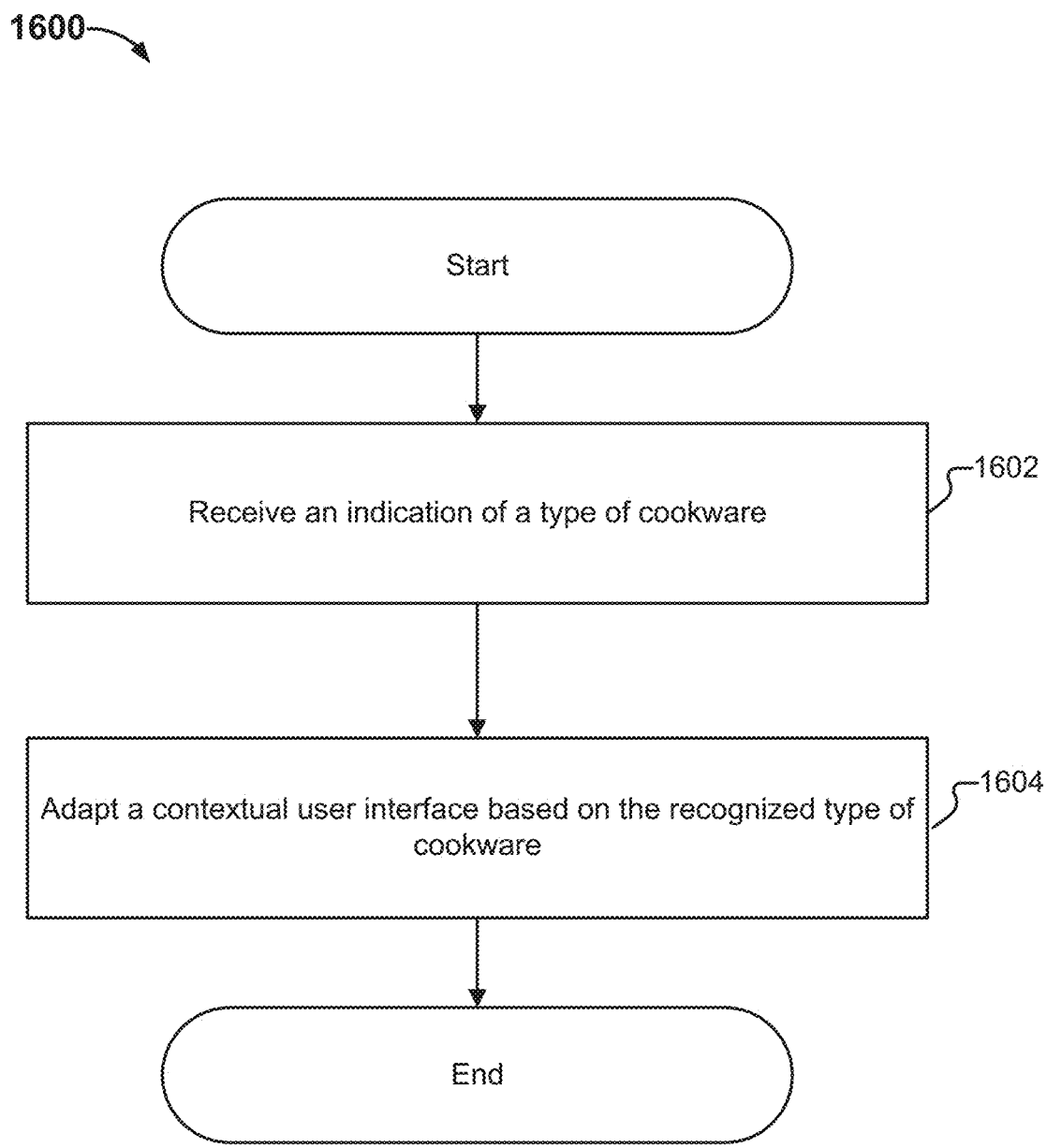
FIG. 16 is a flow diagram illustrating an embodiment of a process for providing a contextual cooking user interface.

FIG. 16 is a flow diagram illustrating an embodiment of a process for providing a contextual cooking user interface. In some embodiments, process 1600 is executed by contextual UI engine 1308. The process begins at 1602, when an indication of a type of cookware is received. For example, a presence of the cookware is detected. In some embodiments, an induction coil is used to detect the presence of cookware. As another example, a change in weight detected by a weight sensor of the system is an indication that cookware is present. The type of the cookware (that is in the presence of the cooking system) is recognized. In some embodiments, the type of cookware is recognized through the use of tags, such as NFC or RFID tags embedded or otherwise coupled to the cookware. The cooking system includes a reader for reading the identifier tags of the cookware. In some embodiments, proximity of such tags indicates their presence. As another example, the cooking system uses sensors to characterize the cookware, where the cookware is identified based on the characterization of the cookware. For example, the cookware may be probed or measured using various sensors or components such as weight sensors, temperature sensors, acoustic sensors, induction coils, etc. A signature or fingerprint for the cookware is determined as an identifier of the cookware.

A profile of the cookware is accessed. For example, the profile is obtained from a tag embedded with the cookware (and used to recognize the cookware). As another example, an identifier is obtained from cookware recognition. A lookup using the cookware identifier is performed to obtain the profile of the cookware. As another example, the sensor signature of the cookware is used to perform a lookup of cookware signatures to identify the particular cookware that is being used with the system. As another example, the sensor signature is used as a key to identify a matching record that includes the corresponding profile for the cookware. In some embodiments, multiple types of cookware are registered with the cooking system or a remote entity with which the cooking system communicates (to obtain or access the profile of the characteristics of the cookware).

At 1604, a contextual user interface is adapted based on the type of cookware. For example, a contextual user interface of the cooking device that the recognized type of cookware is being used in conjunction with is adapted based on the recognized type of the cookware. As one example, the user interface of the cooking system is adapted based on user interface configuration parameters associated with the recognized cookware (e.g., included in the cookware profile). User interface configuration parameters include menu configuration parameters specific to the cookware. Menu configuration parameters include the structure of menus (which may include sub-menus), available options in the menus, etc. Another example of user interface configuration parameters includes guidance parameters that determine what information is presented during recipe or technique guidance, as well as the conditions under which the user interface updates.

In some embodiments, the contextual user interface is presented on a display that is separate from the cookware. In some embodiments, the display is integrated with the cooking system. In some embodiments, the display is a centralized display that provides appropriate information according to the type of cookware that has been recognized. One example of adapting the contextual user interface based on the type of cookware includes determining permitted cooking techniques available when using the type of cookware. In some embodiments, only those cooking techniques determined to be permitted for the type of cookware are presented as selectable options in a technique selection menu in the contextual user interface. In some embodiments, the available cooking techniques for selection are limited to those that are designated as permitted for the cookware.

As described above, in some embodiments, the context-aware user interface configuration is performed by accessing profile information pertaining to the cookware. For example, each different type of registered cookware is associated with a profile. The system behaves according to the cookware profile corresponding to the cookware. In some embodiments, the contextual user interface is driven based on the detection of certain events, such as the occurrence of detected user actions, cooking operations, or user inputs. For example, the detection of certain events triggers the presentation of certain information, as well as the available input options in the contextual user interface. In some embodiments, the parameters for determining when events are detected are dependent on, or otherwise based on, profile information pertaining to the recognized cookware.

In some embodiments, the contextual UI is updated based on detection of trigger events. In some embodiments, the trigger events used to update the contextual UI are based on the type of cookware that has been recognized. In some embodiments, the parameters (e.g., patterns of measurement values) for detecting a trigger event are based on the type of cookware that has been recognized. In some embodiments, what information is presented in updating the UI in response to an event trigger (e.g., prompts to provide) is based on the type of cookware that has been recognized. For example, the user interface is updated according to the detection of state or events associated with cooking being performed. The cookware-specific profile information described herein (e.g., thermal characteristics, weight characteristics, induction coil response characteristics, etc.) facilitates more accurate control of a cooking routine, such as by utilizing cookware profile information to detect a phase of the cooking routine that a user is currently in, deducing information about the ingredients or content being cooked (e.g., by subtracting out contributions of the cookware from sensor measurements to determine properties of the content being cooked), detecting user actions or interventions (e.g., flipping, basting, stirring, etc.).

In some embodiments, the contextual user interface is adapted to present customized programs or customized cooking techniques that are linked to a specific type of recognized cookware.

Another example of a contextual user interface that can be provided based on determination of cookware type is maintenance guidance interfaces. For example, for different detected types of cookware with different material properties, different maintenance information can be provided. For example, if a carbon steel pan is detected, the contextual user interface is configured to present maintenance guidance relevant to the carbon steel pan, such as providing instructions on how to season the carbon steel pan.

Other examples of functionality performed according to the profile of the recognized cookware include auto-taring (e.g., based on weight information included in the cookware profile) to determine the weight of ingredients.

As described above, the contextual user interface can also be adjusted to provide options for manual mode control. As described above, the universal interface controls, based on detecting a presence and type of cookware, what type of inputs the user can provide (e.g., available options that a user can select from), and what types of information are provided as output by the interface.

Temperature Control Based on Identified Cookware

In addition to providing a contextual user interface, as described above, where the context is provided by the specific cookware that is recognized as being utilized, the heating element of the induction cooking system is also controlled according to the type of cookware being utilized. For example, the system adapts how it interacts with the cookware to achieve various results, such as certain temperatures. The manner in which the system adapts its interaction with the cookware is based on the detected type of the cookware. For example, to achieve a certain temperature, the system will have to adapt differently (e.g., via different ways in controlling the induction coil) for different types of cookware.

In some embodiments, the cookware profile for a certain cookware includes thermal properties of that cookware. In some embodiments, the system utilizes such thermal characteristic information specific to a cookware to determine how to control the system (e.g., its induction coils) to control how the cookware is heated. This allows fine grain temperature control, improving performance. As will be described in further detail below, in some embodiments, such heating element control includes precise controlling of power to effect accurate control of the temperature of the cookware, based on recognizing the cookware itself.

Existing induction burners do not have the ability to understand what cookware (e.g., pan) they are working with, and what the characteristics of the cookware are. Because of this lack of understanding of the cookware, existing induction burners make estimations as to how the performance of the induction burner is to be driven to heat up or control the temperature of the cookware. For example, existing systems may drive their induction coil in the same broad way to account for any type of cookware that might be used.

Making such estimations results in various cooking issues, such as largely overshooting any desired temperature targets. This is due to the high variability in the construction of different types of cookware, and even in different instances of the same cookware, such as due to differences in quality of whether or not they are fully laminated or delaminated. This variation in cookware creates a large error band that induction burners attempt to deal with.

In the context of induction heating, as heat is generated in the cookware, using different cookware on the same induction burner will produce different levels of heating behavior (e.g., temperature increase) for the same input power. Existing induction burners are unable to determine how to control the power to achieve a desired temperature, as they are not able to determine the temperature impact on the cookware given the amount of power provided. That is, there is a disconnect between the power used to drive the induction coil, and its impact on temperature of the cookware and its contents.

This results in errors between the actual resulting temperature and the desired temperature, such as the actual temperature of the cookware greatly exceeding or overshooting the desired cookware temperature (e.g., 20%). Other existing types of heating systems, such as radiant heating systems (e.g., gas stoves), are also difficult to control in an accurate manner to achieve or maintain a desired temperature in a consistent manner across the diversity of cookware that may be utilized. Such temperature control issues are further exacerbated by induction stoves, where there is no physical expression of temperature (e.g., as in the color of the flame of a gas stove, or the heat in the air surrounding the pan), as heat is generated within the cookware when using an induction stove, and there is no visual indicator of how hot the cookware is.

Using the closed-loop heating control techniques described herein, issues with existing induction burners, such as temperature overshoot and ripple when holding temperature, are addressed. For example, in induction cooking, power applied to the induction coil is converted in the cookware into heat through eddy currents that are generated. The amount of heat that was converted from the applied power is related to the temperature that the cookware is at. By having access to the characteristics of the cookware, control loop parameters such as PID coefficients can be accurately set so that the cookware can be heated to the desired set point as quickly as possible (e.g., as high a rate as possible), without overshoot.

Cookware recognition allows the burner to deliver power in a manner that is customized to the cookware, where different power-heating profiles are applied for different cookware. Further, for the same cookware, different control loop parameters are used under different conditions, such as different types of desired temperature control or adjustment. The crossover points at which the system updates its parameters are also customized to the type of cookware being utilized. In this way, even when the user switches cookware, consistent and accurate temperature control is provided.

As one example, by having knowledge of the specific cookware being used and accessing its characteristics, the induction coil can be driven to reach a desired temperature without overshoot. Further, the desired temperature (e.g., temperature setpoint) can be reached quickly and efficiently (which is desirable in the context of cooking) without overshoot. Further, by accessing information regarding the characteristics of the cookware being used, the heating controller is capable of high temperature accuracy, such as providing sub-degree temperature precision, such as when holding the cookware at a specified temperature. In some embodiments, such accurate temperature control is facilitated by a closed-loop heating controller that takes into account characteristics of the cookware being utilized, as well as feedback from various onboard sensors of the cooking system. For example, by having access to characteristics of the cookware, and also having sensor measurements that indicate what is occurring with the cookware, the closed-loop heating control techniques described herein control power to the induction coil in a manner that provides accurate temperature control, and also allows cookware to be quickly heated up to a desired temperature without the temperature of the cookware overshooting that desired temperature. For example, using knowledge of (or otherwise determining, such as in a calibration tuning phase, further details of which are described below) the thermal properties of the cookware, improved temperature performance can be achieved, one example of which is reducing overshoot, which is an issue with existing systems that do not have knowledge of the properties of the specific cookware being used, and thus have a more general operating window to accommodate the uncertainty in the cookware object being used. In contrast, the cooking system described herein can provide targeted, bespoke temperature control based on detection of the cookware (and its thermal properties).

Further, as described above, the cooking system is integrated with various onboard sensors. Such sensors include those relating to the induction coil, and are usable to provide measurements such as actual power level, impedance, and operating frequency. By also having access and knowledge of the properties of the cookware, the closed-loop system described herein has improved accuracy in the amount of power that is being supplied, the efficiency of the conversion of the power (by knowing heat measurements via integrated temperature sensors, the thermal properties of the cookware, etc.), etc.

As described above, compared to existing cooking devices, embodiments of the closed-loop temperature control techniques based on cookware recognition described herein provide improvements to heating control, such that high temperatures can be quickly reached with little overshoot, and temperatures can be maintained with high precision and little variation.

While embodiments involving induction coils as the heating element being controlled are described herein for illustrative purposes, embodiments of the closed-loop temperature control techniques described herein may be variously adapted to accommodate any other type of heating element (e.g., radiant heating such as gas stoves), as appropriate.

Figure 17A:
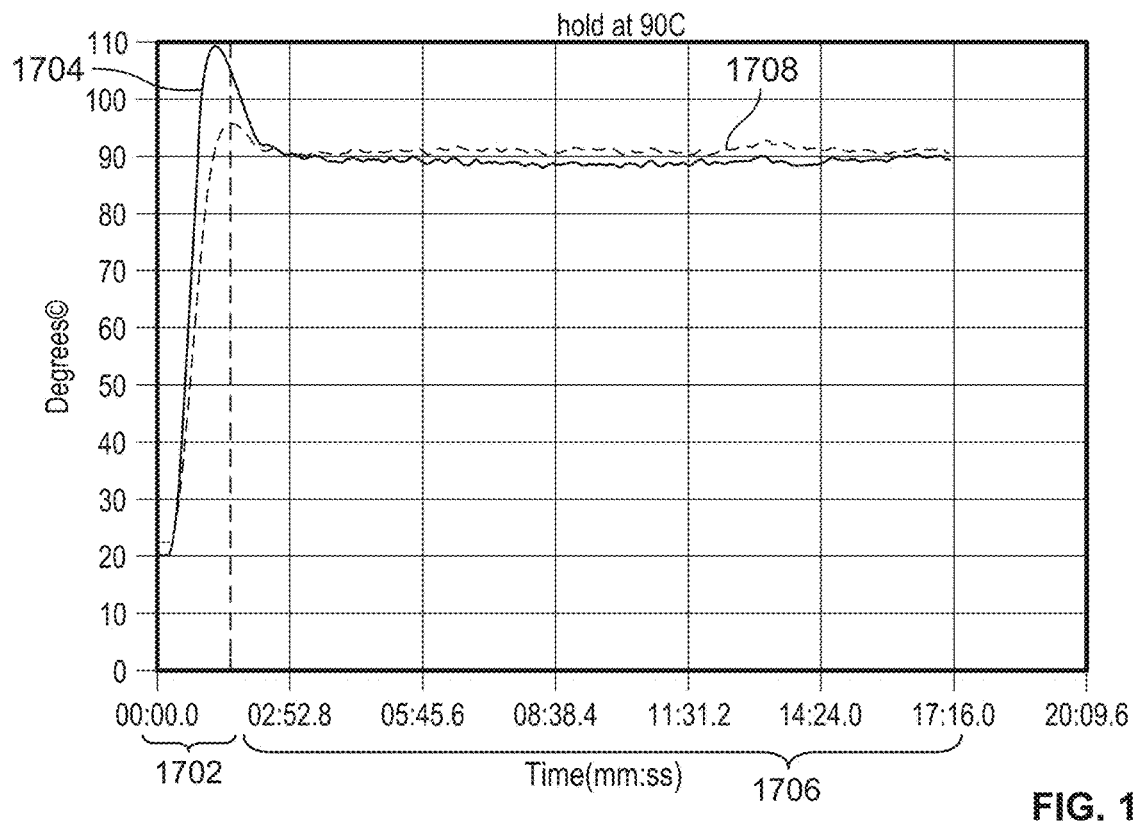
FIGS. 17A and 17B illustrate embodiments of cookware temperature behavior.
Figure 17B:
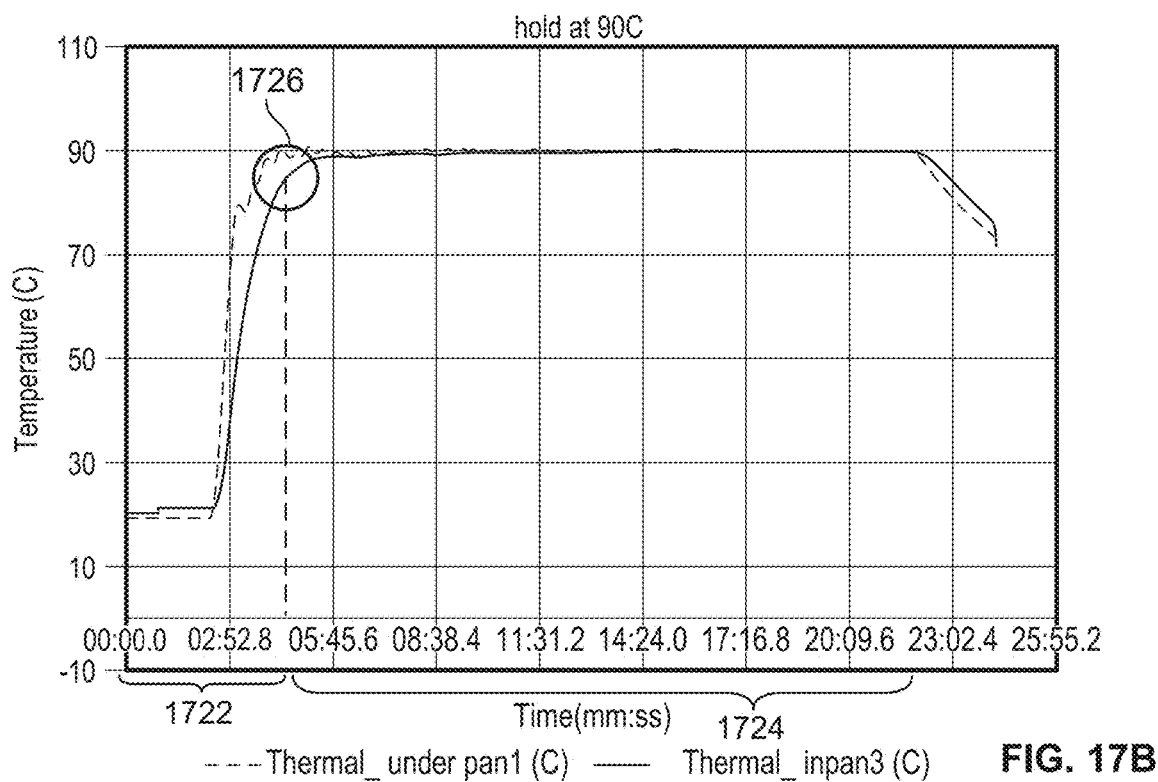

FIGS. 17A and 17B illustrate embodiments of cookware temperature behavior. In the examples shown in FIGS. 17A and 17B, heating of the same pan using two different induction cooking systems is shown. In this example, two induction cooking systems are used to perform pre-heating of a pan from cold up to a set point temperature, and then holding of the temperature of the pan. In this example, temperature control improvements provided via the closed-loop heating control techniques described herein are shown at FIG. 17B, relative to an existing system as shown in FIG. 17A.

FIG. 17A illustrates an example of cookware temperature behavior when preheating and holding temperature. In this example, heating control using a single fixed set of control parameters that is not optimized for the cookware is shown. In this example, when preheating the pan up to the desired temperature of 90 degrees Celsius during preheating phase 1702, the existing system exhibits overshoot, as shown at 1704. Further, when attempting to hold temperature at 1706, the actual cookware temperature exhibits variation and ripple as shown at 1708, where the actual cookware temperature fluctuates about the desired 90 degrees C. set point. The inaccurate temperature control results in pre-heating overshoot, as well as temperature holding variation in both the bottom of the pan (which is closest to the induction coil), and the surface of the pan (on which ingredients are cooked). There will be a delay between the temperature of the surface and the bottom of the pan due to intervening material thickness.

FIG. 17B illustrates an example of cookware temperature behavior when preheating and holding temperature using cookware recognition. In contrast to the example of FIG. 17A, using the closed-loop control techniques described herein, improved pre-heating is provided. For example, during pre-heating phase 1722, no overshoot is exhibited. Further, during the pre-heating phase, the cookware temperature is brought up to the set point temperature quickly (and faster as compared to the example of FIG. 17A) while still having little to no overshoot, where the ability to quickly bring cookware temperature is a desirable property in the context of cooking. For example, while pre-heating without overshoot could be achieved by slowly heating up the cookware, such slow heating can be less desirable when cooking.

Continuing with the example of FIG. 17B, as shown, when using the closed-loop control techniques described herein, during temperature holding phase 1724, the 90 degree C. temperature is maintained with greater precision and less variation as compared to as shown at 1708 of FIG. 17A.

As shown in the example of FIG. 17B, using the temperature control techniques described herein, not only is there no overshooting in the preheating phase, but after the temperature is reached, there is little ripple or wiggle in the cookware temperature. This is an improvement to existing systems such as that shown at FIG. 17A.

In some embodiments, the closed-loop control techniques described herein utilize closed-loop control parameters that are specific to, or otherwise correspond to, the type of cookware that is being used. For example, a PID controller is used to control the power delivered to the induction coil. Different PID control parameters are used for different types of cookware. Further, a single type of cookware may have multiple associated sets of control parameters. In some embodiments, the different sets of control parameters are used for controlling the induction coil for different phases of heating or for different operating conditions or functions (e.g., pre-heating quickly, holding temperature accurately, etc.). In some embodiments, transition points are determined for switching between one set of PID parameters and another set of PID parameters, or for otherwise updating PID parameters. In some embodiments, the crossover points for updating or changing PID parameters are cookware dependent.

As described above, the improved temperature control provided by the techniques described herein is facilitated by using different control parameters for different contexts and conditions. For example, different sets of control parameters are used for different types of cookware, different types of functions or actions to be performed, or both (e.g., combined condition of performing a specific action using a specific type of cookware).

For example, rather than having a single or fixed set of control parameters according to which the temperature control operates that is applied for all conditions (e.g., for both pre-heating and holding temperature), the system detects the occurrence of certain conditions, and then adapts its control parameters (which control how the system drives the induction coil given a computed difference between a set point temperature and a measured, actual temperature) to the detected conditions.

Referring again to the example of FIG. 17B, the system divides the heating shown into two different types of actions. For example, the first portion 1722 of the heating is segmented as a pre-heating phase, in which a pan is to be brought up from an initial cold state to a desired set point temperature. A second portion of heating is shown at 1724, which is a holding phase. Here, after the pan has been brought up to the set point (pre-heating is complete), the control system is operated to maintain or hold the temperature of the cookware at the set-point.

Using multiple sets of control loop parameters to provide temperature control for different types of actions or contexts or desired modes of heating (pre-heating and holding in this example) facilitates driving of the induction coil (applying power to the induction coil) in a manner that is optimal for the given cooking context. The use of multiple control loop parameters for different conditions provides an improvement over using a single, generic set of control parameters that is applied regardless of what is occurring. For example, suppose a set of control parameters that is optimized for boiling of water. If this set of control parameters were also used for pre-heating, this could result in overshooting of cookware temperature, as shown at 1704 of FIG. 17A. Further, if this same set of control parameters (that is tuned for boiling water) were also used for holding of temperature, this could result in ripple and greater variation about the set point, as shown at 1704 of FIG. 17A.

As shown in the example of FIG. 17B, when pre-heating, the control loop is adapted to use a set of coefficients that is optimal for pre-heating, which includes control loop parameter values that build cookware temperature up to the temperature set point as quickly as possible, while reducing the possibility of overshoot. When it is detected that the system should go into a holding mode, the control loop is adapted to use a different set of control loop coefficients that is optimal for keeping the measured temperature within a narrow band about the desired set-point. In some embodiments, scheduling is performed to determine cross-over points at which the control loop switches from using one set of coefficients to another set of coefficients, or to otherwise update the temperature control loop coefficients that are being used. In some embodiments, the cross-over points are cookware-specific. As one example, in FIG. 17B, the crossover point 1726 for switching from pre-heating control coefficients to holding control coefficients is determined based on the specific cookware being utilized, which aids in reducing undesirable effects, such as overshooting. In some embodiments, and as will be described in further detail below, the transition from control loop parameters for quickly closing the delta to the setpoint temperature, to control loop parameters for maintaining a desired temperature is based on the delta, or how far off, the actual temperature is from the desired temperature.

Further details regarding condition-dependent control loop parameter determination, and cross-over point determination are described in further detail below. Using the techniques for temperature control with adaptive control loop parameters, heating element control is optimized based on the cooking context, such as recognition of the cookware being used, and the current desired heating mode.

The adaptive temperature control techniques described herein are an improvement over existing systems. For example, by integrating control of the heating element with information about the cookware, as well as feedback from integrated sensors that is processed in the context of the known cookware, a closed loop control system is provided that facilitates improved accuracy and control in the cooking process as compared to existing types of cooking systems.

For example, existing induction cooking systems are open loop, and do not integrate information about what is happening to the cookware (in which the heat is being generated) or the ingredients being cooked. This makes it challenging to control existing cooking systems to achieve desired cooking results.

For example, in existing induction cooking systems, properties of the cookware being utilized are not known, and existing induction systems will apply the same settings to different cookware. However, in induction cooking, there is a greater dependency on the type of cookware being used (as the heat is being generated in the cookware itself). This results in different or unpredictable heating and cooking performance with existing induction cooking systems, as they do not compensate for the different properties of different cookware (which may have differing efficiency in generating heat, where one pan generates heat much more quickly than another pan).

This use of a single, fixed set of control parameters by existing systems, regardless of cookware or the operations being performed, is insufficient for accurate temperature control given the variation that can occur in cooking. As one example, suppose one scenario in which an empty pan is being heated, and another scenario in which a pot of water is being heated. With the empty pan, because it will heat up and cool down quickly, the power to the induction coil should be cut off sooner. In the case of heating a pot of water, because of the water also taking energy from the pot, power would need to be applied to the induction coil in a manner that is different from when heating the empty pan, in order to reach a desired temperature set point quickly. In existing systems, which do not have intelligence as to what is occurring (e.g., what cookware is being used, what ingredients are being heated, etc.), a single, fixed set of control parameters would be used for both scenarios. As one example, the fixed set of control parameters may be tuned for the boiling of water. However, the use of these boiling water-tuned parameters is insufficient or otherwise non-optimal for accurate temperature control of pre-heating of the empty pan.

By dynamically utilizing different sets of PID coefficients that are configured to different types of cookware and cooking conditions, more accurate temperature performance can be achieved compared to existing systems. For example, using the techniques described herein, temperature control loop parameters such as PID coefficients are set based on knowledge of the specific cookware being heated, facilitating the ability to have a much flatter response over time (e.g., without ringing or ripple).

Figure 18:
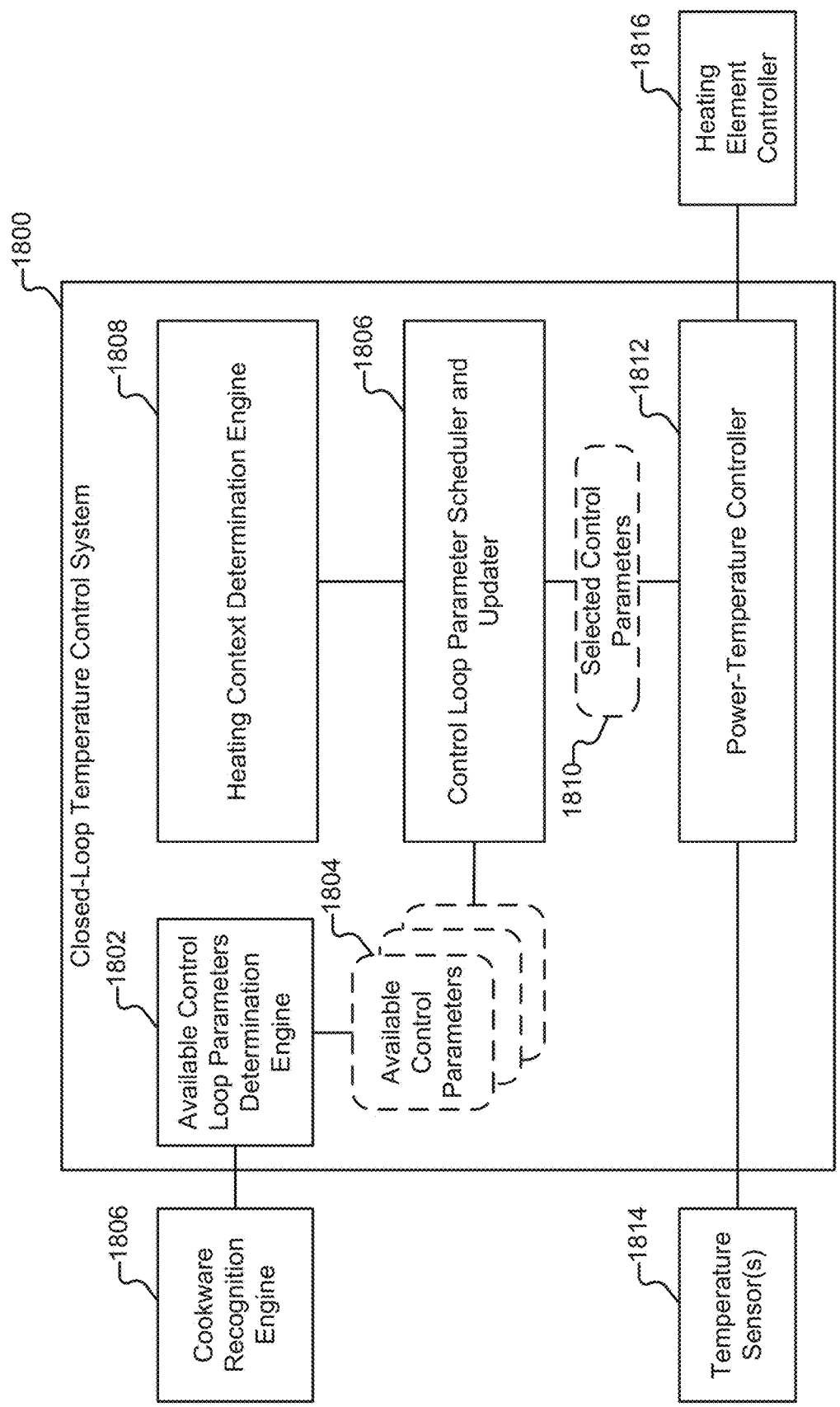
FIG. 18 illustrates an embodiment of an adaptive closed-loop temperature control system.

FIG. 18 illustrates an embodiment of an adaptive closed-loop temperature control system. In some embodiments, closed-loop temperature control is executed by system controller 304.

In some embodiments, available control loop parameters determination engine 1802 is configured to determine available control loop parameters. The available control parameters 1804 include control parameters usable to control a heating element to control the temperature of cookware in various operating contexts and modes.

In some embodiments, the available control loop parameters include control parameters that are specific to recognized cookware that is being used in conjunction with the cooking system. For example cookware recognition engine 1806 is configured to recognize or identify a cookware object that is being utilized (e.g., on the plate of the induction cooking system). Examples and embodiments of recognizing cookware are described above. A cookware profile corresponding to the recognized cookware is accessed. In some embodiments, the cookware profile includes control parameters that are customized or specific to the cookware that are usable in various operating contexts or heating modes. In some embodiments, control loop parameters engine 1802 accesses the cookware-specific closed loop temperature control parameters from the profile corresponding to the recognized cookware, and includes them in available control parameters 1804.

In some embodiments, the available control loop parameters 1804 include cookware control loop parameters that are used for different heating modes, but are applicable to multiple types of cookware.

In some embodiments, the available control loop parameters 1804 further include transition or crossover parameters. In some embodiments, the crossover parameters are used by the temperature control system to determine when to update the control loop parameters that are in use. For example, if the temperature system is switching from pre-heating to holding mode, the point at which the temperature controller switches from using pre-heating control parameters to holding control parameters is determined according to a crossover parameter. In some embodiments, the crossover parameters that are used to facilitate transitioning between temperature control loop parameters are cookware-specific and customized to properties of the cookware.

As one example, the control loop parameters include PID (Proportional-Integral-Derivative) coefficients, as well as scheduling coefficients (for determining when to use some set of PID coefficients).

The following is one example of available control parameters 1804. Suppose a specific type of frying pan is identified or recognized. In some embodiments, a set of holding control parameters specific to the pan is retrieved from a profile of the recognized pan. In some embodiments, the holding control parameters usable to maintain the actual temperature of the pan at a desired target temperature are a nominal set of control parameters that are used by default. In some embodiments, a set of pre-heating control parameters is obtained. The pre-heating control parameters may be cookware-specific and obtained from the cookware profile. In other embodiments, the temperature control system is pre-configured with pre-heating control parameters that are applicable to all cookware. In this example, the control loop parameters determination engine 1802 is also configured to obtain a crossover or transition parameter/threshold from the profile corresponding to the recognized cookware. For example, the crossover threshold is used to determine when to update the parameters of the temperature controller from pre-heating parameters to holding mode parameters. The crossover threshold is customized for the specific type of cookware in this example. The available control parameters 1804 can include various other control parameters for use in other operating contexts, as well as crossover parameters for determining or transitioning between parameters for different operating contexts.

In some embodiments, the available control parameters 1804 are provided to control loop parameter scheduler and updater 1806. Scheduler 1806 is configured to determine the set of control parameters to use in the temperature control loop. In some embodiments, the set of control parameters that is selected is determined based on available control parameters 1804, as well as the heating context (e.g., what type of heating control mode is to be utilized, such as mass-driven, temperature delta-driven, cooking technique-driven, holding, etc.). For example, control-loop parameters are updated as a function of time or operating context.

In this example, heating context determination engine 1808 is configured to determine what type of cookware heating profile or mode that the temperature control system should operate in. As will be described in further detail below, examples of changes in cooking context that would change or trigger how temperature is controlled include changes in mass, selection of a particular technique, and/or a desired delta to be closed. Further examples and embodiments of heating profiles and operating modes are described below.

In some embodiments, if the scheduler 1806 determines that the control loop parameters are to be updated (e.g., based on change in operating mode or desired heating profile), the scheduler updates or changes the control loop parameters to a selected set of control parameters. As will be described in further detail below, the control loop parameters to use are driven based on mass, temperature delta, and/or technique selection. In some embodiments, the control loop parameters that are determined for use are optimized for the cookware being utilized. The updating is performed according to a crossover or transition threshold that is optimized or specific to the recognized cookware. In this way, the temperature control loop can be adjusted by varying the PID coefficients of the control loop over time based on detection of various conditions, where the PID coefficients are also optimized for a specific type of cookware being used.

In some embodiments, the updated control parameters 1810 are provided to power-temperature controller 1812. In one embodiment, the control parameters are PID (Proportional-Integral-Derivative) coefficients, and the power-temperature controller 1812 is a PID controller.

In some embodiments, the selected coefficients are plugged into the PID controller to produce an accurate cookware temperature outcome. For example, the set of coefficients define how the controller 1810 will react or respond (e.g., determine how much power to apply to, or otherwise drive, the induction coil) based on the difference between the set point and the measured temperature (proportional response/gain term), the sum of the difference between the set point and the measured temperature over time (integral response/gain term), and the rate of change of the measured temperature or the difference between the set point and the measured temperature (derivative response/gain term). That is, the power applied or delivered to the induction coil is controlled as a function of the difference between the target temperature (e.g., desired temperature set point), and the actual measured temperature.

For example, based on the selected control parameters in use by PID controller 1812, the measured temperature, and the desired target temperature, the controller determines and sends commands or otherwise actuates a heating element controller 1816 (an example of which is induction coil controller 308) to provide a certain amount of power (and for a certain amount of time) to the induction coil to generate a change in cookware temperature or response. For example, suppose that the desired cookware temperature set point is 90 degrees Celsius, and the current measured cookware temperature is 40 degrees Celsius. The result of the comparison is converted to a continuous output. The continuous output is translated into commands for driving (e.g., delivering power) to the induction coil. In some embodiments, this control loop measurement and command updating process is periodically assessed (e.g., at 50 kHz).

In some embodiments, the measured temperature is determined from temperatures sensors 1814, including center temperature probe 104, under-plate temperature sensors. Further embodiments regarding utilizing multiple channels of temperature measurements from multiple sensors are described below. In some embodiments, the target temperature is determined based on a desired setpoint. The setpoint may be manually set by a user, automatically set when performing a technique or recipe, etc.

Further Embodiments of Control Loop Parameter Scheduling

The following are further examples and embodiments of implementing control loop parameter scheduling, also referred to herein as gain scheduling. In some embodiments, scheduling of what control loop parameters the PID controller operates with includes determining a new, updated set of control loop parameters to use, and when the PID controller parameters should be updated to the new PID coefficients. The ability to dynamically change PID coefficients as a function of time or cooking contexts, as well as the use of PID coefficients that are optimized to each type of cookware, provides improved temperature control.

The PID coefficients in use affect how reactive the PID controller is to differences between a desired target temperature and an actual measured temperature. For example, the PID coefficients are used to determine an adjustment to an amount of power being delivered (e.g., to the induction coil heating element) given the temperature "error" (difference between measured and target temperatures). For the same temperature difference, different sets of PID coefficients would result in different amounts of power being applied to reduce the temperature gap. For example, temperature of the cookware is a function of power applied, mass, and time. That is, the thermal response of the cookware (amount of change in temperature of the cookware) given a certain amount of inductive energy input (which is a function of the power applied to the induction coil) is dependent on the mass of what is being heated (cookware and ingredients), and the amount of time that power has been applied. As another example, for a given mass with a set of thermal properties, higher amounts of applied power will result in larger changes in cookware temperature for the same amount of time that power is applied.

As the temperature of what is being heated can vary continuously (e.g., due to heat loss to the ambient environment), the control loop continuously compares measured temperature against the setpoint temperature to dynamically determine how to adjust power delivery to the induction coil to elicit a thermal response in what is being heated (cookware and ingredients in cookware) to reduce the temperature gap.

In some embodiments, a nominal condition of the temperature control system is when the system is stable, and the cookware temperature, though it may vary or fluctuate, is relatively close to the desired setpoint. In this state, a set of PID coefficients for holding or maintaining actual cookware temperature at a setpoint temperature is utilized.

There may be situations in which other PID coefficients, different from the nominal holding PID coefficients, are more optimal for achieving a desired setpoint temperature in a particular way (e.g., faster, without ringing, etc.). In some embodiments, the scheduler is configured to determine, given a cooking context, what are the optimal PID coefficients to use. After the system stabilizes (e.g., the cookware temperature is stably close to, or within a threshold of, the set point), the temperature controller reverts to the holding PID coefficients.

The following are examples of various conditions under which different PID coefficients (e.g., other than the holding or nominal or default PID coefficients) may be more optimal to use. As one example, in pre-heating, an empty pan is to be heated up from a cold initial temperature to a setpoint. In this scenario, at the beginning of pre-heating, there is a very large temperature delta between cookware temperature and the desired temperature setpoint. Further, it is desirable for this large delta in measured cookware temperature and desired setpoint to be closed as quickly as possible.

In some embodiments, for scenarios in which large temperature deltas are to be closed quickly, rather than using the holding PID coefficients (which are tuned to be more effective when the cookware temperature is much closer around the desired setpoint), a set of coefficients that is biased more towards the proportional ("P") term is used by the scheduler to quickly bring up the temperature of the cookware to the desired setpoint temperature. In some embodiments, the P-coefficient used is also a function of time. As one example, a total gap between a starting temperature and a desired temperature is broken into a fast-slew (P-only) for heating an empty pan. The scheduler then reverts back to the holding PID coefficients when the cookware temperature approaches, or is much closer to, the desired setpoint.

For example, after quickly reaching a desired setpoint (using a proportional driven control for pre-heating), the control loop switches to temperature holding control parameters to precisely maintain or hold the cookware at the desired temperature. For example, the cookware will cool down during the cooking process for a variety of reasons, such as depositing energy into the food, cold food being put in the cookware, water in the cookware boiling off, etc., all of which remove energy from the cookware and decrease its temperature.

As another example, for preheating (to take the cookware from a cold state to a hot state), PID coefficients with high gain (high proportional term) are used to ramp up the temperature as quickly as possible. To prevent overshoot, the condition on when to revert back to the nominal holding parameters is determined to have roll off behavior as the cookware temperature is closer to the desired set point. As another example of pre-heating without overshoot, during the pre-heating phase (in which, for example, an empty cookware is being heated up from a starting temperature to a desired temperature), the pan temperature is to be quickly ramped up to the set point. In some embodiments, for the pre-heating phase, the proportional and derivative terms are more pronounced, where the proportional term drives the speed at which the temperature will ramp, and the derivative term will indicate when to reduce or cut power, so that the pan can "coast" to the desired set point temperature.

As another example, certain types of cooking operations involve ingredients or foodstuffs whose thermal behavior can change or is variable, which impacts how much the temperature of the cookware will change in response to a certain applied amount of power. For example, boiling water or deep frying involve phase changes. To accommodate the phase changes of water or oil, which will change the thermal response of the cookware to inductive energy input, a set of PID coefficients customized for accommodating phase changes is utilized to bring the cookware temperature much closer to the desired setpoint before the temperature control system reverts to the nominal PID settings for holding the desired temperature. As one example, the amount of time in which pre-heating control is performed (e.g., P-only or proportional-biased control) is extended to accommodate the phase changes to allow the measured temperature to reach the desired setpoint before reverting back to the holding parameters.

As another example, PID control is used to maintain a cookware's temperature to a desired setpoint in the face of conditions such as changes in thermal loss. The use of different techniques will result in differing rates of thermal loss and alter how the temperature of the cookware responds to applied power. In some embodiments, the scheduler dynamically updates PID coefficients based on the technique being performed to account for the different rates of thermal loss and the change in cookware thermal response to applied power. This provides more optimal control of applied power in bridging the gap between actual cookware temperature and a desired setpoint temperature under varying conditions resulting from the performing of certain techniques. For example, techniques such as heating butter, toasting nuts, or liquid reduction require a stable temperature set point, at which rapidly changing thermal loss occurs. In some embodiments, the scheduler dynamically updates the PID coefficients in use to account for the rapidly changing thermal loss. As one example, the scheduler dynamically and actively changes the PID coefficients upward and downward until the system stabilizes. As another example, another set of PID coefficients is used for sugar work, which involves a gradual change from evaporation that is dominated with commensurate circulation, to later stages that are dominated by caramelization and poor thermal conductivity in the vessel.

Boiling of water and reducing of sauce are examples of cooking operations that result in large amounts of evaporative loss. In such a case, the temperature of the cookware will fluctuate or vary significantly. Existing systems will have significant ringing, with a pattern of overshooting and undershooting, resulting in, for example, water boiling, stop boiling, boiling again, stop boiling, etc. Using the techniques described herein, in response to detecting that water is to be boiled, or that the sauce reduction technique is to be performed, the PID controller is loaded with parameters tuned for accommodating such evaporative loss.

As another example of technique driven scheduling, the control loop parameters can be updated multiple times over the course of implementing a single technique. For example, suppose cooking rice using a pressure cooker. One set of PID coefficients is used for heating the pot up. A different set of PID coefficients is used when boiling off water in the rice cooker. A final set of PID coefficients is used when finishing cooking of the rest when there is little liquid water is left (and cooking is operating primarily based on steam within the container).

As another example, a change in mass will affect the thermal response of the cookware to applied power. For example, the addition of ingredients such as a large piece of steak will alter the thermal mass of what is being heated, and thus alter how the cookware's temperature responds to applied power. In some embodiments, the scheduler dynamically updates PID coefficients based on detected changes in mass.

As shown above, and as will be described in further detail below, the scheduler is configured to dynamically update and determine closed loop control parameters (PID coefficients) based on total mass, technique selection, and/or temperature delta to be closed. This allows the temperature controller to adapt to transient behavior in the system, where the manner in which the temperature controller adapts (e.g., which coefficients are selected for use) is mass-driven, technique-driven, and/or total-delta driven. In some embodiments, the temperature control system also reverts back to a nominal set of PID coefficients (e.g., holding control parameters) when the system stabilizes or is in steady state, and the cookware temperature is closer to the desired setpoint.

Compared to existing systems, using the control loop techniques described herein, coefficients for temperature control are adaptive and specific to the context of the cookware being utilized and the cooking function to be performed. This allows for the temperature control system to compensate or adapt for different types of cookware, which may have vastly different properties and characteristics.

In some embodiments, the determination of when to use (e.g., schedule the use of) a set of parameters is implemented using a fourth coefficient.

Further Embodiments Regarding Temperature Sensors

In some embodiments, the temperature controller performs temperature control based on a desired setpoint, as well as measured cookware temperature. Measured cookware temperature is determined using one or more temperature sensors, such as a center temperature probe (104) that is in contact with the cookware, under-plate temperature sensors (e.g., around the circumference of the plate on which the cookware rests), etc. Temperature probes may also be used to take measurements of content in the cookware. For example, while in the examples described herein, determining how to apply power to the induction coil to achieve a desired cookware temperature or heating profile is described for illustrative purposes, the control loop can also be configured to control for other types of temperatures, such as the temperature of ingredients.

In some embodiments, the center temperature probe in contact with the cookware is a main driver of the temperature control loop, where the temperature sensors beneath the plate allow for corrections based on cookware material type (e.g., for carbon steel, which has highly local and efficient electro-thermal conversion, versus clad stainless, which is highly inefficient, but thermally very uniform).

In some embodiments, when multiple temperature measurements are utilized, aggregation of the sensor measurements is performed to determine the measured temperature that the PID controller uses in its control loop. In some embodiments, an average is taken of the temperature measurements is used. In other embodiments, a subset of the temperature sensor measurements is used. As another example, when multiple temperature sensor measurements are collected, weights are applied to the temperature sensor measurements, which biases the impact of specific measurements (taken from specific temperature sensors) on how the temperature controller determines how to drive the induction coil. The weighting of certain measurements when determining cookware temperature can be used to take into account how heat is generated in cookware when using induction coils.

In some embodiments, the information indicating what temperature sensor measurements to use, weighting of particular temperature sensor measurements, etc., is passed along with the adjusted PID parameters to the PID controller, which uses the temperature sensor configuration/specification information to determine what is the actual temperature that is compared against the target temperature.

Determining Cookware-Specific Closed Loop Control Parameters

The following are embodiments of determining closed-loop control parameters optimized for a specific type of cookware. In some embodiments, the control loop coefficients are determined during a setup or calibration phase.

In some embodiments, determining closed-loop control parameters (also referred to herein as "auto-tuning") includes determining a temperature or thermal response of a specific type of cookware to electrical input energy to the induction coil. This includes determining, for a certain amount of applied power (e.g., 100 Watts), for a certain duration (e.g., 1 second), the change in temperature of the cookware (e.g., increase by one degree Celsius). As another example, the temperature response is determined by heating the cookware object and determining the frequency at which ringing occurs, its natural oscillation with pure P, etc. In some embodiments, coefficients are determined to also take into account or incorporate the response of the temperature control system, including any associated latencies or phase delays. For example, there may be some delay between commanding a power board to apply power (or cut power) and the requested power change actually occurring, which may result in transient power oscillations. In some embodiments, the coefficients are determined over suitable time constants to take into account ringing in the rest of the control system, not only in the cookware.

In some embodiments, the temperature response of the cookware to the applied amount of power for the specified temperature is used to determine the PID coefficients for the specific type of cookware. For example, the coefficients can be determined using algorithms such as Ziegler-Nichols, Cohen-Coon, or any other appropriate tuning process. In some embodiments, thermal response (temperature response to applied power) of a specific cookware object is determined by acoustically measuring the thermoelastic response of the cookware object.

The following is a further example of determining PID coefficients for a given cookware object (e.g., pan). For each cookware object, there is a critical temperature that is reached, and a periodicity (time response). In some embodiments, the thermal characteristics of a cookware object are used to determine one or more sets of control coefficients.

In some embodiments, the temperature control system is set to a set point. The control system is allowed to become unstable. For example, the P coefficient is adjusted (with no I and no D) until the system transitions from having a stable, slow response to having a self-ringing response. For example, for a given power, a sweep of P coefficient values is performed to identify the P coefficient at which the system becomes unstable (also referred to herein as the unstable P coefficient, or "Punstable"). The self-ringing response results in a period of oscillation. Various types of algorithms can then be used to determine PID coefficients (e.g., classic tuning, Pessen tuning, some overshoot, no overshoot (e.g., Ziegler-Nichols and Cohen-Coon), as described above). Examples of PID coefficients for different types of cookware are shown in conjunction with FIG. 19.

FIG. 19 illustrates examples of control loop parameters customized for different types of cookware. In the example of FIG. 19, for a given type of cookware object, sets of PID coefficients corresponding to different types of tuning are shown. The set of PID coefficients that provides the desired thermal response can then be associated with the cookware for use by the temperature control system. For example, such cookware-specific PID coefficients are recorded to a profile of the cookware.

In some embodiments, within the same type of cookware, different sets of PID parameters are specified for the cookware under different conditions. In the example of FIG. 19, PID coefficients are also shown for each of the different types of cookware with water in them. For example, the empty pot (1902) and the pot with water (1904) have similar P terms, but different I and D terms. In some embodiments, during run time, the appropriate set of PID coefficients is determined by performing a lookup of the information shown in FIG. 19 based on an identifier of cookware type and a condition of interest (e.g., water in the cookware). For each type of cookware, control-loop parameter sets for other types of conditions (and when the use of specific control-loop parameter sets is to be scheduled) can be configured. By having different coefficients for different cookware, a temperature control loop is adaptable to the use of different types of cookware.

In some embodiments, sets of coefficients are generated for specific types of conditions that are also applicable to multiple types of cookware (e.g., cookware that is not recognized by the system). For example, a set of coefficients is generated that operates for boiling of water in any cookware. Another set of coefficients is generated that operates for deep-frying in any cookware. Another set of coefficients is generated for cooking actions such as evaporation or breakdown of caramelization of sugar, for any cookware.

In some embodiments, the control loop parameters are re-determined or readjusted periodically, or in response to certain trigger events. For example, the auto-tuning described herein can be re-performed when it is detected that content (e.g., ingredients) has been added to the cookware object being used. Thus, the coefficients that are utilized by the control loop can include both preconfigured or pre-characterized (e.g., previously determined and included in a cookware profile), as well as dynamically determined control loop parameters. The calibration and determination of PID coefficients can be performed in a laboratory setting, such that the PID coefficients are pre-configured for a given type of cookware prior to receipt by a user. As another example, calibration can be performed by a user, with corresponding instructions provided for how to perform such calibration. This allows for new types of cookware to be registered and characterized with the cooking system.

In some embodiments, the available control-loop parameters optimized for the cookware are stored in a table or other data structure. In some embodiments, the available control-loop parameters are stored in a profile of the cookware. In some embodiments, the PID coefficients are also associated with corresponding scheduling parameters that specify criteria for which certain PID coefficients are to be used to operate the temperature control loop. Further details regarding determining scheduling parameters for using particular PID coefficients are described below.

Determining Scheduling Criteria for Updating Control Loop Parameters

The following are further embodiments of determining scheduling criteria that specify when certain closed loop control parameters are to be used.

As another example, suppose that pre-heating of an empty pan was performed according to a set of temperature delta-driven control loop parameters. At some point, the set point temperature is neared, and the system switches to a set of PID coefficients for holding or maintaining a setpoint temperature. The following is an example of determining criteria for switching to the holding set of PID coefficients.

In this example, after the pan has reached the desired set point, a different set of PID coefficients is accessed and loaded into the temperature controller for holding or maintaining a desired temperature. PID coefficients specific to the pan are utilized. In some embodiments, the switch to the different set of PID coefficients is performed in response to coefficient switchover trigger criteria. One example of a trigger criteria for switching over to another set of PID coefficients is the delta or difference between the measured temperature and the intended temperature. As another example, a threshold is used to determine the crossover point, such as when the measured temperature is a threshold percentage of the intended temperature. As another example, switching between sets of coefficients is performed when the temperature is within a control band range. In this example, when the measured temperature is within a threshold of the setpoint (e.g., threshold percentage of the setpoint), the scheduler switches the PID controller to using PID coefficients for holding or maintaining the temperature of the cookware at the setpoint.

In some embodiments, the crossover point at which delta-driven temperature control is switched off (and holding control is implemented) is determined based on the thermal characteristics of the cookware being used. For example, steel pans typically have significant temperature overshoot, where due to having poor lateral thermal conductivity, it may take time for heat to spread from where the induction coils are to the part of the pan that is measurable by a temperature sensor. In this case (and also for other types of pans such as carbon steel pans), a center contact temperature sensor is measuring in what is typically a colder spot (where there is a potentially large difference or gradient in temperatures across the cookware). Further, pans made of different materials will heat up at different rates. For example, a carbon steel pan may heat at ~ 4-5 degrees C. per second at full power, while a stainless-steel pan may heat at ~3-4 degrees C. per second at full power. In some embodiments, the point at which the PID coefficients are switched over (crossover trigger criteria) is cookware-specific, taking into account that there are potentially large differentials in temperature across the cookware. As one example, heat is generated first in portions of the cookware that are over the induction coils. If the induction coil is a ring shape, then a ring of heat will be observed. That is, a "donut" shape of heat will form. The conversion efficiency relates to the efficiency of converting power provided to the induction coil into heat (as measured by temperature) in the cookware. If the temperature sensor is in the middle of the donut-shape, then a relatively low temperature of the cookware will be measured. Heat will then conduct across the pan from the regions over the induction coils. Cookware with higher thermal conductivity will distribute the heat faster throughout the cookware, as compared to cookware with lower thermal conductivity.

In some embodiments, the crossover trigger criteria (e.g., what threshold percentage of the setpoint temperature should be used as the criteria for switching to holding mode control parameters) is based on characteristics of the cookware, such as the cookware's conversion efficiency (e.g., efficiency of inductive converting of power to heat, or watts per degree change per second, or the slope at which power is converted to heat) and thermal conductivity of the cookware (e.g., ability to distribute heat laterally across cookware).

Swapping of PID coefficients can also be triggered according to other conditions as well. For example, as described above, the use of some coefficients is driven by the total mass being heated. As one example, the temperature controller updates PID coefficients when a change in mass or weight is detected. For example, PID coefficients for controlling temperature in the context of added ingredients (e.g., added protein such as meat) can be used when a change in weight is detected (as an indication of adding ingredients).

Another example criteria for updating control loop parameters is detection of phase change events. For example, different sets of PID coefficients are used based on detection of phase transitions (e.g., due to boiling of water). In some embodiments, the switching of different sets of PID coefficients is triggered based on detection of different phases of water boiling. Phase detection can be detected acoustically. Phase detection can also be detected thermally. For example, the system monitors for patterns of thermal behavior in the sensor data that are indicative of what state of boiling is occurring. For example, thermally, if for the applied same amount of power, a sudden change in the temperature change per unit time is detected, this is indicative of a change in state. For example, when the slope is shallower, then this is indicative that boiling has begun. Once the water has boiled off, this is detected as another change in the rate at which the temperature changes per unit time. This is due to the state change of water, where different states have different specific heats. In some embodiments, different PID coefficients can be swapped in for different phases of water boiling.

With respect to monitoring the change in temperature given applied power, in some embodiments, the system uses such information to differentiate between different types of ingredients or contents within a cookware object. For example, the temperature change profile of oil with respect to applied power is different for oil as compared to water. In some embodiments, the presence of oil is deduced based on detecting a temperature change profile (given applied power) that matches to oil. Appropriate control parameters corresponding to frying oil are then loaded in response to detection of oil as the content in the cookware. In this example, the detected ingredient is a criteria for using a particular set of control loop parameters.

In some embodiments, the crossover point for swapping between PID coefficients is determined based on the rate at which heat is lost. In the case of boiling or sauce reduction, instead of only the pan radiating heat, volumes of fluid are radiated in vapor form away from the cookware surface (heat and steam). The rate of heat loss can also be affected by airflow.

As described above, in some embodiments, the mass of the cookware, the inductance or natural reflectivity of the cookware (how much power is returned), etc. are taken into account when determining control-loop parameters for a given cookware. Observed thermal shocks to end ringing are also taken into account when determining the P, I, and D coefficients. In some embodiments, the locations of scheduling crosspoints are reverse calculated (e.g., by determining the runout).

Further Embodiments of Scheduling Control Loop Parameters

The following are embodiments of implementing control-loop parameter scheduling and updating, switching, swapping, or crossing over between different sets of PID coefficients.

In some embodiments, each set of control-loop parameters is associated with a scheduling parameter. For example, the scheduling parameter is a condition for using the corresponding set of control-loop parameters. Examples of scheduling criteria are described above. In some embodiments, an appropriate set of control-loop parameters is determined by performing a lookup of the table of control-loop parameters, where the lookup is performed by using a query that includes a condition (e.g., technique selection, whether a certain temperature delta is to be closed, addition of mass, etc.). The closed-loop parameters matching to the queried-for condition are returned. The use of such a conditional implementation is computationally efficient.

In other embodiments, a single equation is used, where the terms are aggregated together inline. In some embodiments, another control term is included that indicates the threshold that is used for each cookware object. For example, each triple of PID coefficients is further associated with a corresponding fourth term.

In some embodiments, in addition to having P, I, and D terms, an additional second derivative term is specified. In the example of determining when to transition from delta-driven control (for pre-heating, for example) to holding control, the use of the second derivative term is analogous to setting a certain crossover point (e.g., when the measured temperature is at 80% of the desired set point, as described above). When the delta or error is over a certain threshold, the system operates in primarily "P-mode" (mostly proportional gain for high temperature gain mode for fast, delta-driven pre-heating), while when the delta or error is small, the system operates in a more balanced "PID" mode for holding temperature. As one example, the crossover threshold is implemented as a fourth coefficient along with the triple of PID coefficients for reverting to holding set of parameters.

In this example, in addition to a slope (derivative) dependent term, an integral dependent term, and an absolute (proportional) dependent term, an additional delta dependent term (whether temperature delta or error is within a certain threshold of the intended set point) is included. In this case, the power that is commanded to be applied to the induction coil is now also a function of whether the error is within a threshold deviation of the intended set point.

In some embodiments, the scheduling is implemented as a binary state. For example, based on the measured cookware temperature being within a threshold delta to the intended set point temperature, a different PID profile is used. In other embodiments, gain scheduling is integrated into the PID controller as an additional term in the partial derivative.

In another embodiment, a state machine is used to determine when to update PID coefficients. For example, different states are entered based on different triggering criteria, where when certain scheduling criteria are met, a corresponding state is entered, and a set of coefficients pertaining to the state is utilized.

Figure 20:
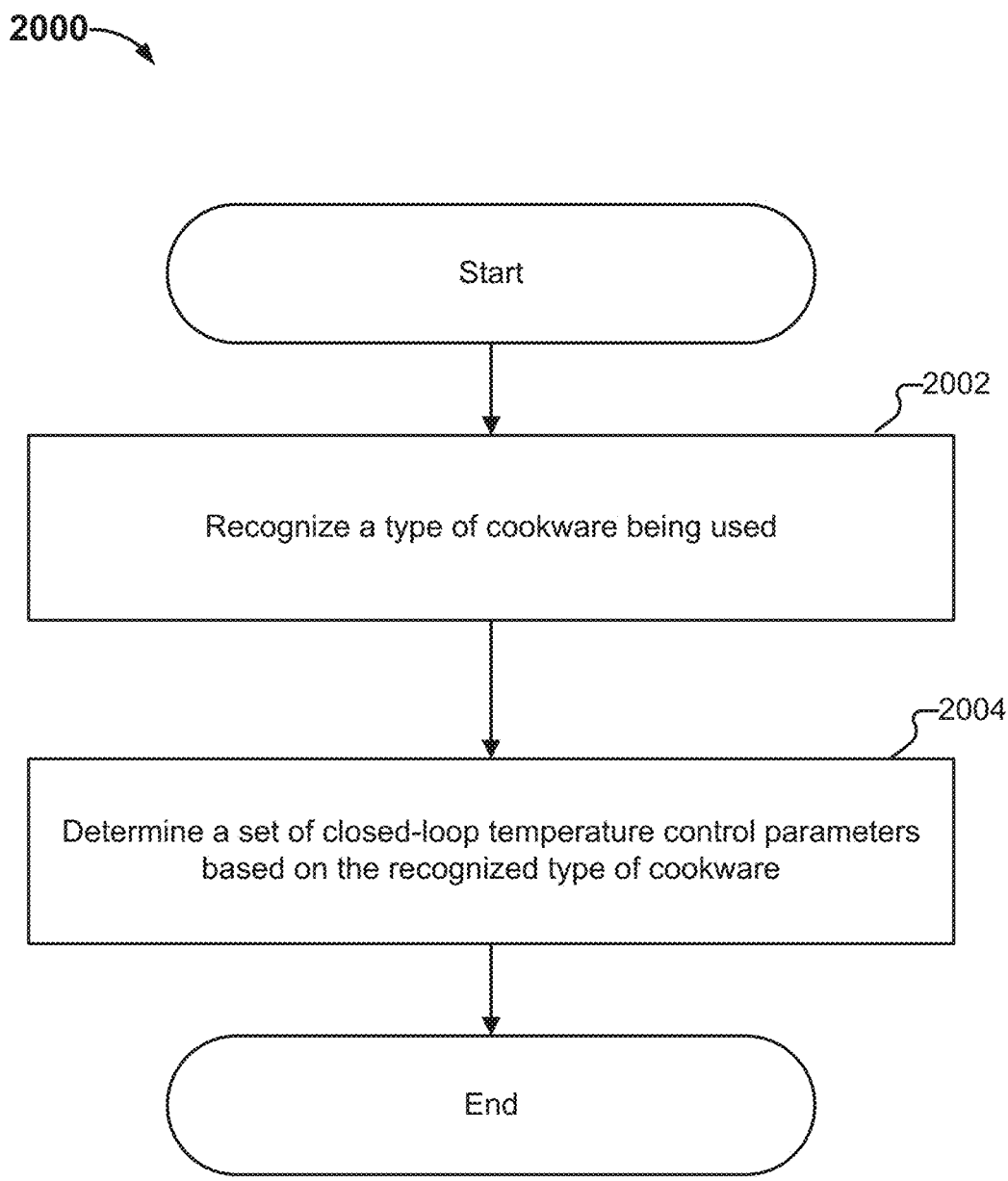
FIG. 20 illustrates an embodiment of a process for temperature control based on cookware recognition.

FIG. 20 illustrates an embodiment of a process for temperature control based on cookware recognition. In some embodiments, process 2000 is executed by closed-loop temperature control system 1800. The process begins at 2002, when a type of cookware being used is recognized. At 2004, a set of closed-loop control parameters for controlling a heating element is determined. The set of closed-loop control parameters is determined based on the recognized type of cookware. As described above, in some embodiments, each type of cookware is associated with a cookware profile. In some embodiments, the cookware profile includes corresponding sets of control loop parameters (PID coefficients) configured or determined or customized for the type of cookware. In some embodiments, when a type of cookware being used is recognized or determined, a lookup is performed of the profile to access the PID coefficients configured for the type of cookware.

For example, upon recognition of the type or identity of the cookware that is present, a profile linked or corresponding to the cookware is accessed (e.g., loaded into the memory of the cooking system device, accessed locally or remotely, etc.). A PID lookup table associated with the profile is queried to determine the PID parameters to be utilized given the cookware being utilized and the cooking function or cooking operation to be implemented using the cookware (e.g., cooking technique to be performed using the cookware). For example, different techniques are associated with different PID parameters or programs, such as different PID parameters for cooking rice versus performing toasting. In some embodiments, different end-states (which may be technique and/or cookware specific) are also associated with different PID coefficients or control points (e.g., for gain scheduling). This is beneficial, for example, at latter stages where there is less browning, or there is browning to blackening of ingredients.

In some embodiments, the closed-loop control parameters are determined based on other cooking contexts, such as total mass, technique selected, and/or temperature delta.

In some embodiments, determining control loop parameters tuned or customized for a cookware object or vessel is based on the mass of the cookware, the inductance or natural reflectivity of the cookware (how much power is returned), etc. Observed thermal shocks to end ringing are also taken into account when determining P, I, and D coefficients. In some embodiments, the locations of scheduling crosspoints (for updating PID coefficients under different contexts) are reverse calculated (e.g., by determining the runout).

In some embodiments, a temperature controller operates according to the closed-loop control parameters. As one example, the temperature controller is a PID controller, and the set of control parameters according to which the controller performs temperature control includes PID coefficients.

In some embodiments, a heating element is controlled according to the output of the temperature controller. For example, in the case of a heating element being an induction coil, the induction coil controller is controlled or actuated according to the output of the temperature controller, which determines, according to the closed loop control parameters optimized for the cookware, how much power should be applied to the induction coil given a difference in measured temperature and setpoint temperature. For example, the cookware-specific PID coefficients are plugged into the temperature controller (PID controller) to determine how to drive the induction coil (how much power to apply and when), to achieve a desired cookware heating or temperature profile.

As one example, the output of the temperature controller is a set of commands for how to drive the induction coil based on the sum of the error (temperature difference) multiplied by the proportional coefficient, accumulated error multiplied by the proportional coefficient, and derivative of the error multiplied by the derivative coefficient. The particular set of coefficients used will impact how the induction coil will be driven given a measured temperature difference.

In some embodiments, each type of cookware is associated with a specific unique identifier. Each cookware is associated with one or more sets of control loop parameters applicable or specific to the cookware. In some embodiments, each cookware is also associated with crossover point values or terms that indicate when to update parameters (e.g., schedule when to use a different set of parameters), and what parameter values should be used. As described above, the scheduling takes into account various conditions to determine how to adjust or tune the PID coefficients according to which the temperature controller (PID control loop) operates. The manner in which the PID coefficients are adjusted or updated is based on the type of cookware that is being utilized. In this way, the temperature controller takes into account both the type of cookware (e.g., its material properties), as well as current environmental state conditions.

As described above, the PID coefficients of the induction coil controller (where K, Q, etc. are examples of closed loop control parameters) are adjusted for the specific cookware. This provides an improved temperature and induction cooking controller. In some embodiments, the PID coefficients for a specific cookware are determined using embodiments of the auto-tuning process described above.

The following are further embodiments of control loop parameter scheduling. In some embodiments, responsive to a detected cooking condition, the set of closed loop control parameters is updated. For example, as described above, various events or conditions can trigger a scheduler to determine an updated set of control parameters to provide to the PID controller. In various embodiments, the determination of what control parameters the PID controller should operate with is based on mass change, technique, and temperature delta. For example, the selection of what type of heating control profile should be implemented (and thus, what parameters should be used to implement the desired heating control profile) is mass driven, technique driven, and/or total delta driven (where the delta is the delta or difference between a setpoint or target temperature and a starting temperature).

In various embodiments, updating or otherwise determining PID coefficients is based on detecting changes in cooking, such as changes in mass, temperature deltas to be closed (e.g., due to changes in the setpoint temperature), technique selection, etc. By using different PID coefficients for different types of cookware, consistent temperature control can be provided for different cookware with different properties.

An example of mass-driven scheduling is when the system detects an increase in mass, which is indicative of the adding of an ingredient to the cookware. As addition of a large mass will impact how much of a temperature change is induced for a given amount of power supplied to the induction coil, an updated set of control parameters is determined to account for the addition of a thermal mass to the cooking system.

Technique-driven scheduling includes scheduling based on detection of a cooking technique that is being performed, or is to be performed. Examples of techniques include boiling water, reducing/evaporating sauce, caramelizing sugar, browning, pressure cooking, etc. As one example, a technique to be performed is determined in response to user selection (e.g., via the contextual user interface described herein) of a particular technique. The set of control parameters is updated based on the selected technique. In some embodiments, technique-driven scheduling includes scheduling based on an indicated or desired sub-technique end state (e.g., desired doneness of pancakes, desired end state hard crack for caramelization, medium doneness for fry chop, etc.).

Delta-driven scheduling includes scheduling or updating of control loop parameters based on a request to reduce a delta in temperature. For example, pre-heating is performed to reduce a large delta between a cookware's current temperature and a desired setpoint temperature. In the case of pre-heating, the manner in which the cookware temperature is to be controlled (primarily by the proportional term) is delta-driven. In some embodiments, delta-driven PID coefficients are tuned for reaching a desired setpoint temperature as quickly as possible, without overshoot. In some embodiments, temperature delta-driven PID coefficients (for heating up an empty pan up to setpoint temperature) are used when the delta between the actual cookware temperature and the target temperature to be reached exceeds a threshold. For example, delta-driven PID coefficients are loaded and used when a change to the target set point temperature is detected. As one example, delta-driven control includes parameters optimized for achieving as high a rate of temperature change as possible, without overshooting. For example, the delta-driven controls are optimized to achieve a large slope (high rate of temperature increase over time) without overshooting or ringing. With delta-driven parameters, the cookware temperature is increased as rapidly as possible, where the desired setpoint temperature is reached without overshooting.

In some embodiments, the amount of time that a particular set of control loop parameters is used is based on the operation being performed. For example, cooking actions that involve phase changes, such as boiling water or deep frying, involve extensions of time in how long a certain set of parameters (e.g., proportional-biased parameters) are used.

In some embodiments, the control loop parameters include control loop parameters optimized or tuned for holding or maintaining a setpoint temperature with high precision and small variation. In some embodiments, the holding control loop parameters are a nominal or default set of control loop parameters. For example, the holding control loop parameters are utilized by default unless scheduling of updating the control parameters is triggered based on detection of scheduling criteria (e.g., mass change, technique selection, and/or temperature delta to be closed). In this example, the control parameters by default are those corresponding to a default hold mode. Entering of a scheduling mode (to switch or update parameters) is triggered in response to detection of a scheduling condition. In some embodiments, when a desired setpoint is reached by the cookware, the system switches to (or reverts back to) a nominal PID setting for holding or maintaining a target temperature for the cookware.

In some embodiments, a condition on which to update control parameters is determined. As one example, the control parameters are updated to revert from the use of mass-driven, delta-driven, and/or technique-driven parameters back to a nominal set of PID coefficients (e.g., for holding or maintaining a target temperature). In some embodiments, the crossover condition is determined for the cookware being used, where different cookware objects are associated with different crossover conditions. One example of a crossover condition is a temperature-based crossover threshold. Other crossover criteria or control parameter selection criteria include detection of events, such as phase transitions, addition of ingredients, changes in temperature setpoint, technique selection, detected rate of heat loss, etc.

As shown in the above examples, compared to a pre-programmed temperature controller with a single, fixed set of control parameters that is broadly applied regardless of cookware being used or what cookware function is being performed, the closed-loop temperature controller described herein is adaptive and able to change its control loop parameters in response to different contexts. In some embodiments, the temperature controller described herein follows a setpoint profile, based on tuned control loop parameters (e.g., PID coefficients). In some embodiments, the temperature controller described herein changes its coefficients based on context to change the amount of power that is applied for a given difference in temperature between a target temperature and measured actual temperature. In this way, the responsiveness of the temperature controller can be dynamically changed based on context. For example, in contrast to existing induction systems that operate using fixed parameters that are generally applied, the control system described herein dynamically updates its PID coefficients based on heating context (e.g., cookware type, delta to be closed, selected technique, change in mass, etc.). Changing the coefficients changes the behavior of the temperature controller by changing the amount of power that is applied for a given difference in temperature between a target temperature and an actual measured temperature. Swapping different PID coefficients to the temperature controller changes how reactive the temperature control system is to differences between target temperature and actual measured temperature.

Embodiments of the closed-loop temperature control algorithm are applicable to other types of heating systems, such as electric stoves, gas stoves, etc. For example, with electric stoves, different PID parameters can be used to change the amount of infrared energy that is emitted for a given difference between target and measured temperatures. For gas, different PID parameters can be used to change the amount or intensity of gas (e.g., by actuating a valve to control the amount of flow) for a given difference between a target temperature and an actual measured temperature. For such radiant heating, electric burners, etc., different sets of PID parameters can be selected and utilized in response to triggering of various conditions, such as phase changes, desired cookware heating profiles, changes in what is in the cookware object, etc.

As another example, the temperature control system described herein can be used in a pizza oven, where the temperature control system changes PID parameters to change how much air is passed to wood (e.g., by controlling actuating of a fan) for a given difference between a target temperature and actual measured temperature. In this pizza-oven example, the PID parameters that are used are customized to the different dishes that are being used in conjunction with the pizza oven.

Embodiments of Emulating a Gas-Like Experience

The following are embodiments of emulating a gas-like cooking experience using embodiments of the induction cooking system described herein. In some embodiments, the induction coil is driven to behave like a gas stove by emulating the thermal heating profile of a fast stove (e.g., by adjusting power rate). As one example, the induction coils (in a multi-induction coil system) can be controlled to deliver heating behavior similar to that of a gas stove, where the outer rim of a cooking pan is gradually hotter than the middle. This is emulated by adjusting the distribution of power (which can be adjusted over time) such that the outer ring is provided more and more power.

In some embodiments, when in an emulation mode to emulate a gas-like experience, the system is configured to provide feedback that is representative of a gas-like experience. In some embodiments, the LED (light-emitting diode) ring is controlled to simulate the intensity/size of fire and correlates to power. In some embodiments, different colors of lighting simulate different intensities of fire (e.g., yellow for medium heat, blue for high heat, etc.). In some embodiments, different numbers of rings being lit up indicate different sizes of fire. In this way, the system provides a visualization of heat to provide a gas/flame cooking experience. In some embodiments, sound (including fan noise) is adjusted to correlate to power. For example, to create an acoustic experience similar to a gas range, the system is made louder at higher heat. In some embodiments, acoustic feedback is provided (e.g., via speakers) based on the level of heat and power level. In this way, feedback is provided to the user about how the system is behaving, in a manner similar to that of a gas stove. In some embodiments, the power control, LED, and sound are coordinated together. In some embodiments, the user interface is adapted when in a gas-stove emulation mode, where heat can be increased and decreased by rotating the knob clockwise or counter-clockwise (to increase or decrease power delivered to the induction coil, similar to increasing or decreasing the amount of gas released for ignition).

Recipe Recording and Playback

The following are embodiments of recipe recording and playback. While embodiments involving an induction cooking device are described herein for illustrative purposes, the techniques described herein may be variously adapted to accommodate recipe recording and playback of cooking on any other type of heating device (e.g., radiant heating device), as appropriate.

In some embodiments, the device is configured to allow a user (e.g., home user, chef, content creator, etc.) to use the device and record a recipe, including recording of the user performing manual cooking using the cooking system described herein. For example, the user cooks with manual control of the induction cooking device. The base platform of the induction cooking system described herein senses and records a log of sensor events that occurred during cooking (e.g., type of cookware, temperature and heating measurements, weight change measurements, time, power input and output, user input, etc.). In some embodiments, the user's cooking is also recorded with an external device, such as a smartphone camera. For example, the external device is configured to capture a companion recording, including an audiovisual recording of the user's manual control of the cooking device, app inputs, captured audio, captured video, etc.

In some embodiments, a recipe program is automatically generated from the log of sensor events. The recipe program is transmitted or transferred to other cooking devices for playback to replicate the recipe, allowing another user to follow the recipe in an automated or semi-automated manner. In some embodiments, the recipe program is augmented with contextual information extracted from the companion audiovisual recording.

In some embodiments, the audiovisual recording is also published or otherwise made accessible to others for viewing. In some embodiments, the audiovisual recording is augmented with information determined from a recipe that is automatically converted from the log of sensor events.

As one example, suppose a home user, such as a grandmother. The grandmother is using the cooking system described herein to make a pan-seared pork chop. The recipe for cooking the pan-seared pork chop may involve numerous steps to be performed at specific times or when a particular event occurs. For example, the grandmother may only flip the pork chop based on having seen a particular event occurring in the pan. While the grandmother could attempt to transcribe her recipe down, such small nuances or details in the recipe, which may nevertheless add up to meaningful differences to the end result, may be difficult to capture when writing the recipe.

Using the cooking recording techniques described herein, the cooking system is configured to automatically record what is occurring over the course of the cooking session. The following are examples and embodiments of recording manual control of cooking using embodiments of the intelligent cooking device described herein.

In this example, the grandmother manually controls the system to cook a pan-searched pork chop. To begin recording, the grandmother enters a recording mode. In some embodiments, the recording of a recipe involves the use of an external device, such as one with audiovisual capture capabilities. As one example, the cooking system is paired with a mobile device, such as a smartphone. In some embodiments, the smartphone communicates with the cooking system, such as via a wired (e.g., USB-C) connection or a wireless connection (e.g., Wi-Fi and/or Bluetooth).

Figure 21:
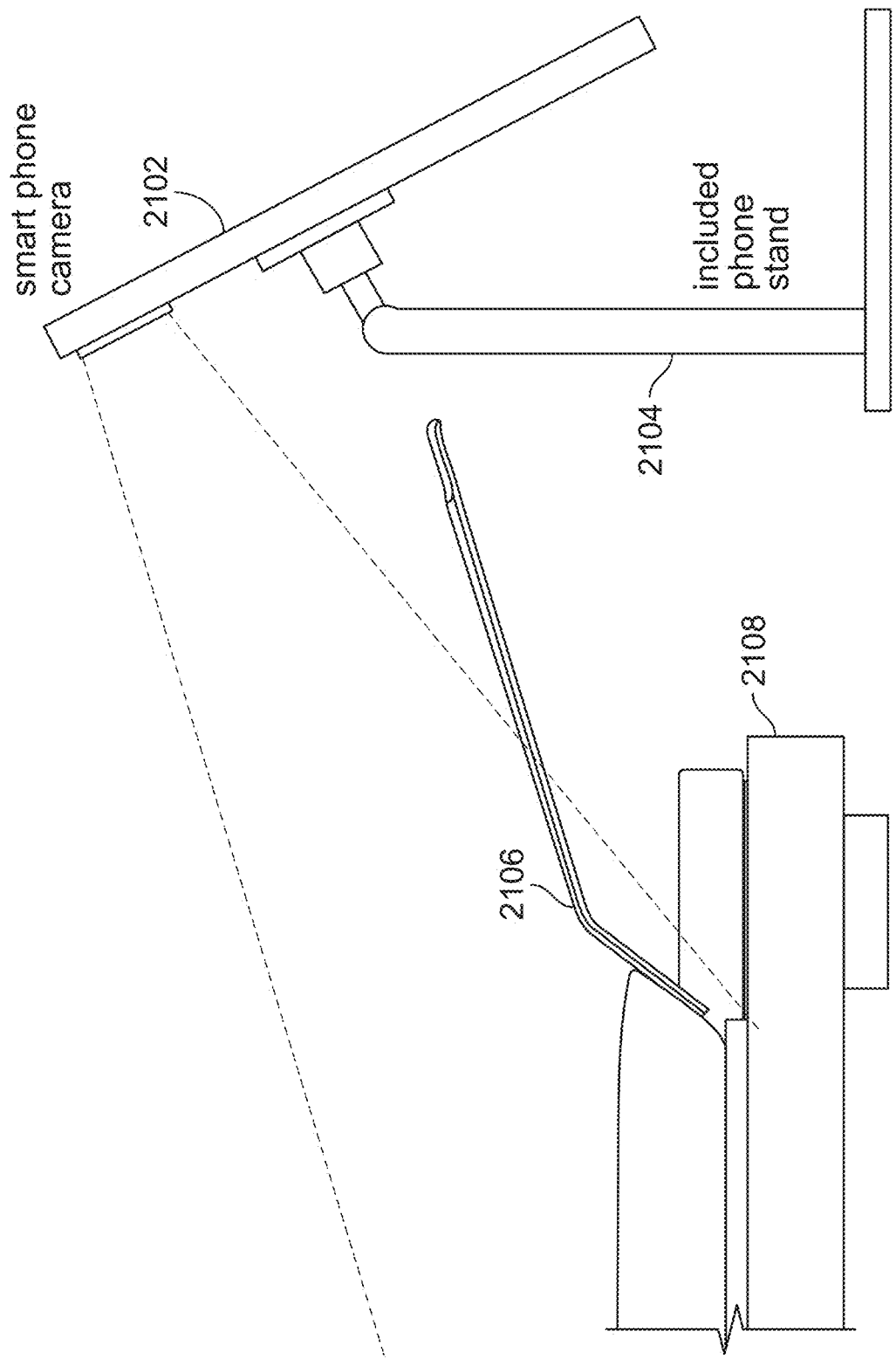
FIG. 21 illustrates an example of a use of an external device with the cookware system.

FIG. 21 illustrates an example of a use of an external device with the cookware system. In this example, the mobile device 2102 is placed on a stand 2104 and positioned such that the contents in the cookware 2106 being used with the cooking system 2108 can be captured by the external camera. In some embodiments, a mobile device (e.g., smart phone) running the mobile application is used in conjunction with a magnetic (phone) stand with a pre-set (or adjustable) camera angle and positioning to ensure good visual input.

In some embodiments, the smartphone has installed a companion mobile app that facilitates communication and interaction with the cooking system. For example, the mobile device can be used to issue commands to the cooking system, as well as receive information from the cooking system. In some embodiments, the mobile device and/or cooking system are connected to a remote entity (e.g., over a network such as the Internet). The remote entity is configured to communicate with the mobile device and/or cooking system to perform various processing. In some embodiments, the mobile device is used as a pass-through conduit to provide information from the cooking system to the remote entity, and to provide information from the remote entity to the cooking system. While examples involving a mobile device are described herein for illustrative purposes, embodiments of the recipe recording techniques described herein may be variously adapted to accommodate any other type of external companion recording device as appropriate with audiovisual recording capabilities (e.g., tablet, laptop, desktop, virtual reality/augmented reality/spatial computing headset, etc.). In other embodiments, the cooking device includes an integrated camera or optical sensor for capturing companion audio and video recordings of the recipe. The onboard microphones of the system may also be used to record companion audio content.

In this example, the grandmother uses the app of the mobile device to enter a recording mode. This causes the cooking system to also enter a recording mode. In other embodiments, the recording mode is entered at the cooking system, where the paired external mobile device is then instructed to also enter into a recording mode.

When the cooking system enters a recording mode, the system is configured to record a log of sensor events that occurred or are detected during the cooking session being recorded. For example, the event log includes both sensor events, as well as events that are inferred from sensor events (e.g., insights such as those described above). In some embodiments, sensor readings and detected events are logged with corresponding timestamps. In some embodiments, the recording of cooking system-side events and sensor measurements is temporally synchronized with the companion audiovisual content recording being captured by the external capture device.

When in device recording mode, the cooking system maintains its various functionality, such as the weight scale function, as well as the technique function. For example, suppose that the grandmother places a pan on the cooking system. The pan is recognized using the cookware recognition techniques described above. The type of the pan that is determined to be present and in use is recorded by the cooking system. As one example, suppose the grandmother selects the sear technique. The pan is then heated up (e.g., using the temperature control techniques described above).

After a certain amount of time, the grandmother puts the pork in the pan. After another amount of time, she flips the pork in the pan. At some point in time, she removes the pork from the frying pan.

The system is configured to record these events based on detection of insights. For example, adding of the pork in the pan is detected as a content addition event, where the content addition event is triggered based on detection of an increase in mass that is sensed by the weighing sensor. The user action of flipping the pork in the pan is also detected by detecting a pattern of weight measurements that corresponds to pan flipping (e.g., measured weight becoming lighter, then heavier). With respect to flipping, as the flipping will flip over the content and change which surface of the ingredient is in contact with the surface of the cookware, the system also monitors the condition of each side of the content. For example, if a flip action is detected, then the system uses this as a signal that another side of the content is being cooked. For example, the system makes an assumption that the ingredient has two sides, A and B. When flipping is detected, previous ingredient condition information is assigned to one of the sides, suppose side A. Ingredient condition information monitored after flipping is detected is assigned to the other side, side B of the ingredient.

Removing of the pork is detected based on detecting a content removal event (based on a decrease in measured weight). As described herein, the inferred cooking events are determined based on recognition of the frying pan that is being utilized (e.g., to obtain the weight characteristics of the pan to then deduce that an ingredient has been added or removed).

In some embodiments, as the grandmother cooks the pan-seared pork chop, the cooking system prompts her to speak about what she is doing. Her audio and video are captured as companion content by the external mobile device.

As one example, the grandmother is prompted (e.g., via the graphical user interface, via the speaker, etc.) to describe the ingredients. Suppose the grandmother, when she puts the pork chop in the pan, also says "I am now putting in the pork chop." Her words are recorded by the mobile device. Further, as described above, the addition of the pork is recorded or logged as an ingredient adding event, along with a corresponding timestamp of when the ingredient was added. In some embodiments, the weight of the content that is added is also recorded. For example, as the weight of the pan is known, the amount or weight of the pork added is determined by subtracting the weight of the pan from the total measured weight on the cooking system plate after the pork has been added.

In this example, while the system is aware that an ingredient was added, it does not know from its onboard sensors what particular ingredient was added at that time. However, the video recording, which is time-synchronized with the recording of the sensor events, has recorded the grandmother saying what ingredient she added in at that time. As will be described in further detail below, in some embodiments, the recorded audiovisual content is passed through natural language processing to extract a transcription of the audiovisual recording. At a timestamp corresponding to when the cooking system sensors detected the adding of an ingredient, the transcription is searched for the name of the ingredient that was vocalized at that time. For example, as the transcription includes the term "pork" at a time correlated with the recording of a mass adding event (based on synchronized or aligned timestamps), an integrator augments the recorded mass adding step or event with the ingredient that was added (pork in this example, as extracted from the transcription at the corresponding time stamp, or within a window of time around the detected ingredient adding event). Further embodiments of automatically combining device recorded steps and events with recorded audiovisual information based on time synchronization are described below.

During the recording session, the grandmother may also verbally explain various other information pertaining to her recipe, such that she is watching for when the pork becomes brown, and only then does she add in garlic. She may provide various other verbal or visual information describing her actions or intents or what is occurring as she performs the recipe with the cooking system, all of which are recorded by the external capture device.

In some embodiments, the log of sensor events is converted into a recipe program for playback on another cooking device. For example, the log of sensor events is summarized into a sequence of recipe steps. The sequence of recipe steps is then converted into an executable recipe program that includes a sequence of device commands and parameters. Examples of device commands include device setting commands for automatically adjusting a setting of a playback cooking device (e.g., temperature settings, technique selection, etc.). Device parameters include information for adjusting the setting (e.g., particular value to adjust the temperature to, a particular technique to be selected). Other examples of device commands include commands for the device to issue prompts to the user (e.g., UI notification). In this example, device parameters include the information to present via the prompt (e.g., action to be prompted, such as to flip, ingredient to be added). As described above, some device parameters, such as the specific ingredient being added, are obtained from contextual information extracted from the companion recording. In some embodiments, the executable recipe program further includes triggers for progressing through the sequence of device commands. The triggers can be time-based (e.g., based on an amount of elapsed time), as well as event-based (e.g., based on detection of flipping occurred, initiate the next device command in the sequence). In some embodiments, the condition for performing a recipe step/device command is determined from contextual information extracted from the companion recording. The executable recipe program is then made accessible to other playback cooking devices (e.g., other instances of intelligent cooking device 202 or 2108, or other devices with similar sensor and control capabilities). In some embodiments, during recipe replication/playback, the playback cooking device is commanded to operate according to the sequence of device commands and parameters included in the recipe program.

In some embodiments, the audiovisual recording is made accessible for viewing by others (e.g., published to social media, or hosted by a remote entity for access by other users). In some embodiments, the audiovisual recording is augmented with various annotations, such as text indicating when to perform certain steps, certain events to be aware of, etc. In some embodiments, the audiovisual recording is augmented based on the recipe steps determined from the sensor log events. For example, the audiovisual recording is segmented according to the recipe steps converted from the sensor log events. As one example, markers are added to the audiovisual recording to indicate where certain recipe steps occur. In this way, the audiovisual recording is segmented according to the structure of the recipe derived from the sensor log events. Various processing can then be performed based on the audiovisual recording with recipe markers. For example, cropping and editing can be performed, further details of which are described below. In some embodiments, the annotated audiovisual recording is made accessible for viewing. The annotated audiovisual recording can be viewed in conjunction with playback of a recipe program, where the playback of the annotated audiovisual recording and the playback of the recipe program are synchronized in time. The annotated audiovisual recording can also be viewed independently of recipe program playback. Recipe program playback can also be performed independently of playback of the (annotated) audiovisual recording.

Recipe Recording

Figure 22:
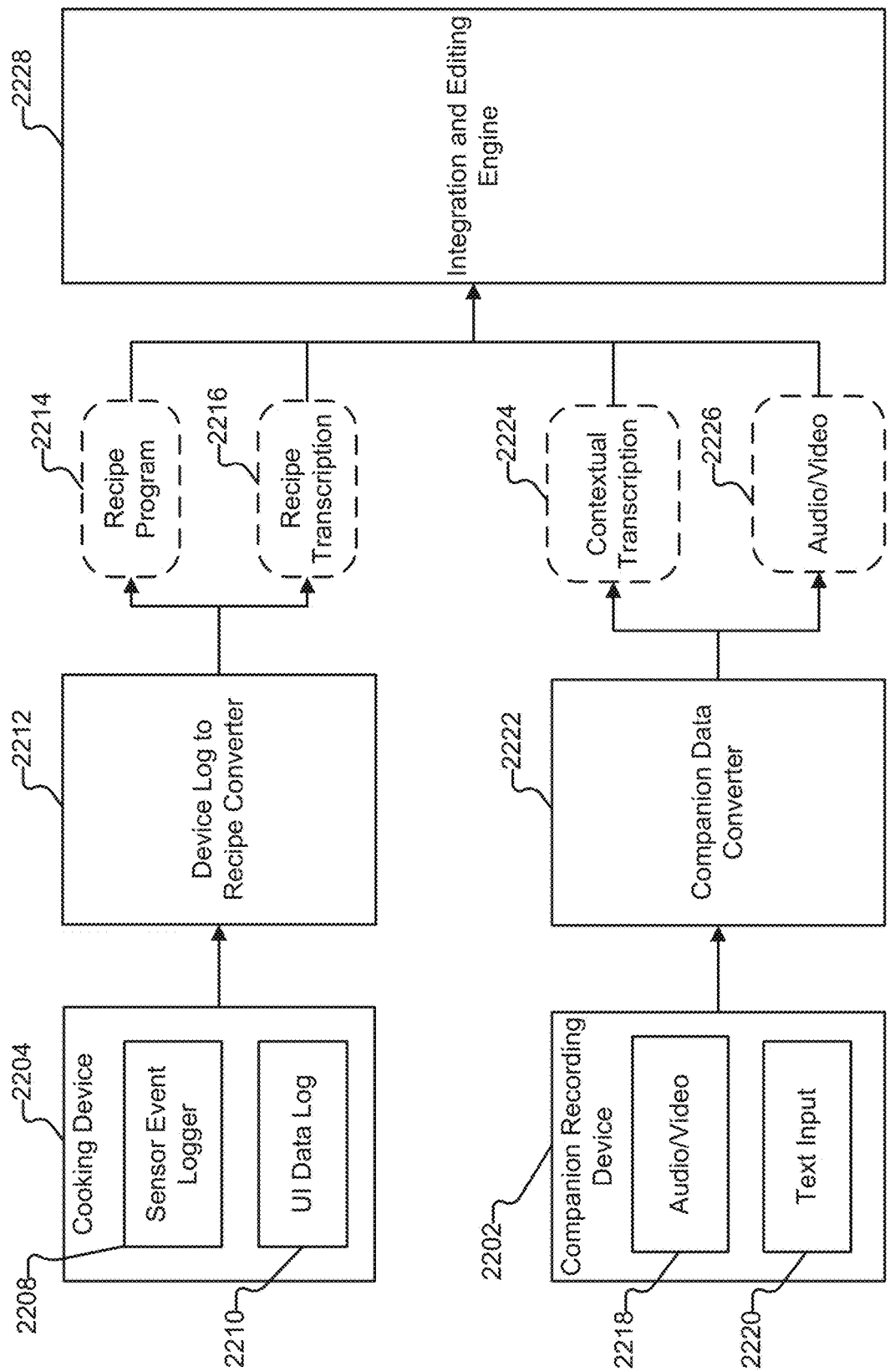
FIG. 22 illustrates an embodiment of a system for recipe recording.

FIG. 22 illustrates an embodiment of a system for recipe recording. In this example, a user, such as the grandmother, enters a recording mode/function. For example, she initiates recording of companion content (e.g., a video recording) on companion recording device 2202 (e.g., initiates recording via a companion mobile app installed on an external mobile device such as a smartphone with audiovisual recording and capture capabilities). In response, sensor event recording on cooking system 2204 (an alternative view of system 300) and audiovisual recording on device 2202 are triggered. In this example, cooking system 2204 is an instance of intelligent cooking device 202. In some embodiments, temporal synchronization is performed between the information generated by cooking system 2204 and external device 2202. In some embodiments, the cooking device, when turned on, automatically turns on recording of sensor log events. In some embodiments, initiating of recording at the external device causes a time synchronization to be performed between the recorded audiovisual content and the log sensor events that are recorded during use of the cooking device. Further embodiments of time synchronization are described below.

As described above, the cooking system 2204 includes various sensors and processing to determine the occurrence of events and insights. In some embodiments, a sensor event logger 2208 of the cooking system is configured to log sensor events (and events derived from sensor readings, such as the insights described above). Examples of sensor events that are logged include events pertaining to weight sensor measurements (e.g., weight changes), temperature measurements (e.g., increases in temperature, reaching of a certain temperature point, etc.). The sensor event logger is configured to log sensor data that is analyzed within the cooking system 2204. The cooking system further records UI data logs 2210. Examples of UI data log information include logs of UI settings selected by the user, or other user actions in interacting with the cooking system, such as the grandmother turning the cooking system on or off, setting the technique to sear, performing resetting, increasing the temperature, etc. Further embodiments regarding logging sensor events are described below.

In this example, the sensor events and UI data logged at the device (collectively referred to herein as "sensor event logs", where UI interactions are an example of events measured by the UI as a sensor) are transmitted to device log to recipe converter 2212. In some embodiments, the device to recipe converter is configured to convert the logged events into a recipe. In this example, the cooking device log converter is located at a remote cloud entity, where the log data from the cooking system is transmitted to the cooking device log converter over a network such as the Internet. In other embodiments, the log conversion is performed locally at the cooking device/system 2204. Converting of device log data can also be distributed across the cooking system and the remote entity. The converter is configured to convert the event log into a recipe.

In some embodiments, the recipe converter is configured to generate a recipe, including a sequence of recipe steps by cleaning and summarizing the log of recorded events. In some embodiments, the converter 2212 is configured to synthesize or coordinate the log events pertaining to multiple channels of sensor readings over time into a sequential structure or representation of recipe steps, events, conditions, and parameters. The recipe steps pertain to what the user did when controlling the cooking device, such as to the cookware and/or foodstuffs (e.g., placed a first type of cookware on, or put a pressure cooker on, etc.), as well as other actions, such as selecting a particular mode, turning of a knob, or any other user instruction to the cooking device.

As will be described in further detail below, in some embodiments, some information pertaining to recipe steps is populated using contextual information extracted from the companion audiovisual recording.

As shown in this example, a sequence of recipe steps and events is determined by summarizing the sensor event logs (which include UI data logs). Further, conditions (e.g., temperature being reached, amount of time having elapsed, event or action detected, etc.) for progressing through the sequence of recipe steps and events are also determined from the sensor event logs. Further embodiments of summarizing sensor event logs into a recipe object, file, document, or data structure are described below.

In some embodiments, the recipe converter generates various types of representations of the recipe that is converted from the log of events. The following are various embodiments of generated recipe representations. The different representations are usable in different contexts. In some embodiments, the device log to recipe converter generates as output a variety of representations of the recipe for consumption.

One example representation is a recipe program 2214 for playback on a cooking device. The executable recipe program is an example of a programmatic transcription of the recipe. In some embodiments, the recipe program includes a sequence of device commands and parameters that are interpretable by a cooking device for playback of the recorded recipe program. In some embodiments, the recipe converter 2212 is configured to clean up, summarize, or otherwise convert the event logs into device parameters and commands. Examples of device parameters and commands include commands to set the power parameter to a certain value, commands to hold at a certain temperature for a certain period of time, etc. The device parameters and commands are included in a recipe program for playback on other cooking devices.

As one example, the recipe program is a script that will be loaded by the playback cooking device. The cooking device then operates according to the loaded recipe program. For example, the recipe program includes logic that, which when executed by a processor or controller of the playback cooking device, issues various device commands to the cooking device, driving its operational behavior. Decision logic encoded in the recipe program is also generated according to the recorded or logged sensor events. The decision logic includes conditions for determining whether to trigger issuing of one or more device commands in the sequence of device commands. The device parameters and commands included in the recipe program or script are generated by translating or converting the raw sensor event log data via recipe converter 2212. Further embodiments regarding generating executable recipe programs are described below.

Another example recipe representation is a transcription 2216 of the steps and events that is human-readable (as the device event log may be difficult for humans to parse and understand). For example, the transcription 2216 is a user facing text transcription of the steps of the recipe, which are synthesized by recipe converter 2212 from the sensor event logs recorded and outputted by cooking device 2204.

In some embodiments, the transcription includes recognition of events that a user performed in time, such as adding mass (e.g., ingredients added), the user performed mixing (because stirring was detected), the user flipped the ingredient (based on detecting a pattern of a loss in mass then an increase in mass according to weight sensor measurements)

in the cookware (where the system may not be aware of what content is actually in the cookware).

In some embodiments, recipe converter 2212 is configured to summarize sensor event logs to generate a summarized natural language output. In some embodiments, the summarized natural language transcription is generated by applying a language model to the recipe object generated from the sensor event logs.

In this example, processing of the recorded companion content is also performed. For example, the audiovisual recording 2218 of the cooking, as well as any inputs 2220 to the companion app are passed to companion data converter 2222. The video recording and app text inputs are examples of companion content accompanying the cooking that has been recorded.

In some embodiments, companion data converter 2222 is configured to extract or otherwise determine contextual information from the companion recording.

In this example, the companion data converter is located at a remote cloud entity, where the companion data from the companion recording device is transmitted to the companion data converter over a network such as the Internet. In other embodiments, the companion data conversion is performed locally at the companion data recording device 2202. Converting of companion data can also be distributed across the external device and the remote entity.

In some embodiments, companion data converter 2222 is configured to perform natural language processing on the recorded companion content, such as speech-to-text processing and image recognition to extract various information such as a transcription of what the user said, user intents, user descriptions, ingredients, etc. Such extracted information is included in contextual transcription 2224 generated by the companion data converter. For example, contextual transcription 2224 is generated by performing speech-to-text and image recognition to obtain a list of text description of user ingredients and descriptions. In some embodiments, the companion data converter also passes the raw audio/video recording as output. In some embodiments, the audio/video recording provided as output is annotated. Further embodiments regarding processing of recorded companion content are described below.

In the example of FIG. 22, the outputs of recipe converter 2212 and companion data converter 2222 are passed to integration and editing engine 2228. For example, recipe program 2214, recipe text transcription 2216, contextual transcription 2224, and audiovisual recording 2226 are provided as input to the integration and editing engine. In some embodiments, the integration and editing engine is configured to combine the device event log-derived information with the contextual information extracted or converted from the recorded companion content. For example, the integration and editing engine is configured to automatically combine the video recording with sensor-derived recipe steps, including performing time synchronization. In some embodiments, the integration and editing engine is also configured to automatically mark or segment the video recording based on recipe steps determined from sensor event logs. The integration and editing engine is also configured to perform automated editing and automatic cropping of the video recording. In some embodiments, automated synchronization of the video recording with music is performed.

In some embodiments, the integration and editing engine 2228 is also configured to facilitate user adjustment and editing of recipe programs, text transcriptions, annotated video recordings, etc. For example, the integration and editing engine 2228 provides an interface (e.g., web-interface) via which users can access, browse, select, and/or manually edit device sensor event logs, (augmented) recipe programs, (augmented) text transcriptions, annotated video recordings (including recordings augmented based on auto-generated recipes), etc. For example, the user can remove a recipe step from a recipe, add annotations to videos, etc. The user can also add dub overs to the video recording.

Figure 23B:
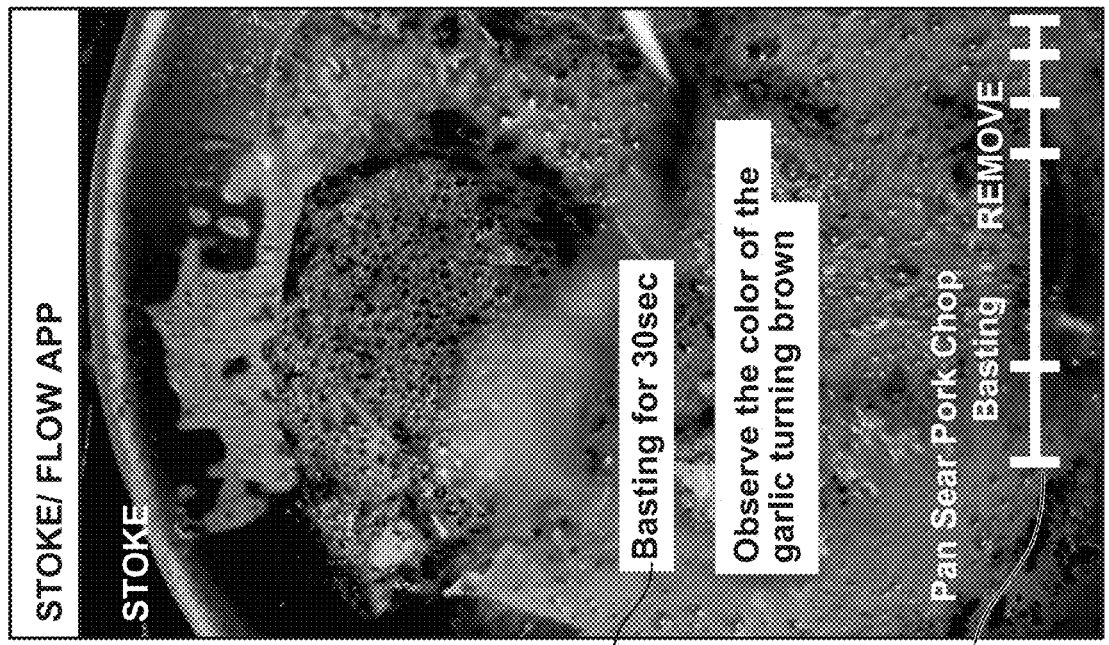
FIG. 23B illustrates an embodiment of companion cooking content.
Figure 23A:
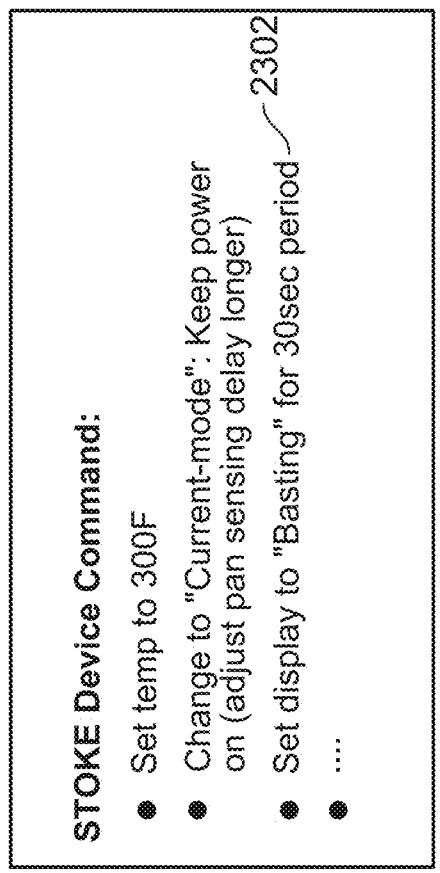
FIG. 23A illustrates an example of device commands.

In some embodiments, the integration and editing engine is configured to facilitate augmenting of recipe programs and transcription derived from sensor event logs with contextual information extracted from the companion data recording. One example output of the integration and editing engine is an augmented recipe program, an example portion of which is shown in the example of FIG. 23A. The example of FIG. 23A illustrates a portion of a sequence of device commands to be issued to a cooking device during playback.

One example type of augmentation is augmenting a sensor-derived recipe program or recipe text transcription with ingredients and user intents derived from the audiovisual recording. For example, while certain types of information can be inferred from the device sensor measurements, other types of information, such as what ingredients were added, or what the user's intent was in performing a certain action, may be more challenging to ascertain from sensor events alone. In some embodiments, the executable recipe program and transcription are passed to the integration and editing engine 2228, which is configured to augment the executable recipe program and recipe transcription with contextual information extracted from the external device, such as user intents, ingredients, etc. Further details regarding such augmentation of sensor event-derived recipe representations are described below.

In some embodiments, the integration and editing engine is configured to facilitate augmenting and annotation of the video recording with recipe information derived from the sensor event logs. One example out of the integration and editing engine is an annotated video recording, an example of which is shown in FIG. 23B. As shown in the example of FIG. 23B, the video is annotated with recipe information converted from device sensor event logs. For example, at 2312, the video is annotated with a technique that is being applied ("basting"), along with parameters for the technique ("for 30 sec"). This corresponds to the device command "Set display to 'Basting' for 30 sec period" shown at 2302 of FIG. 23A, which is a recipe step that is synthesized from the sensor event logs generated by the recording cooking device (e.g., where the sensor event log detects a technique selection event from the UI of a user selecting the "basting" technique and being in the basting mode for 30 seconds). Another example of an annotation to the video that is based on information derived from sensor event logs, is the scrollable timeline 2314. In this example, the scrollable timeline shows markers indicating where different recipe steps in the video occur. In some embodiments, the video recording is segmented according to the recipe steps synthesized from the sensor event logs. The user can then access different portions of the video based on recipe step by interacting with the appropriate corresponding portion of the scrollable timeline.

In some embodiments, the annotation of the video is based on time synchronization between the audiovisual recording and the log of sensor events. For example, different segments of the video are marked at appropriate times based on the matching times at which recipe steps were determined to have occurred from the timestamped sensor event logs. The time at which the text annotation of basting is rendered is based on a corresponding time at which the basting event was detected in the sensor event logs.

Further details regarding such augmentation are described below.

In this example, integration and editing engine 2228 is located at a remote cloud entity. In other embodiments, the integration and editing are facilitated locally at a device such as a smart phone, tablet, laptop, desktop, etc. Integration and editing can also be distributed across a client device and the remote entity.

Further Embodiments of Logging Sensor Events

The following are further embodiments of logging sensor events. FIG. 24 illustrates an embodiment of a log of sensor events outputted by cooking device 2204. In this example, an output log data file generated by the cooking system is shown. Examples of device parameters and their values at certain times are shown. This includes the measured temperature at various points in time, the measured weight at various times, whether a user action was detected at a certain time, the desired set point temperature at various points in time, the detected state or condition of content/ingredients at various points in time, the recognized cookware at various points in time, etc. In some embodiments, the state of each parameter or event shown is determined on a periodic basis and logged periodically (e.g., according to 10 or 20 millisecond time constants).

In other embodiments, a log line is generated in response to corresponding triggering criteria, such as a change in state of a monitored-for event or parameter value. For example, recording of an event to the log of events is only performed when an instance of an event being monitored is detected by the cooking device. Examples of triggering events include events that indicate that a user performed an action. One example of such a trigger event is an element in the UI being set or changed or selected (e.g., as determined from UI data logs). Another example type of trigger event is detecting that the user performed an action with respect to ingredients in the cookware or the cookware itself, such as stirring ingredients, removing the cookware, flipping the cookware, adding of ingredients, removal of ingredients, etc. For example, the system's operation may be event driven. In some embodiments, such event driven triggers are logged, along with corresponding timestamps, for recipe recording and playback. For example, a logged event includes a timestamp of what was occurring at the point in time, as initiated by detection of an event using one or more sensors of the cooking device.

In this example, FIG. 24 illustrates an embodiment of events detected from analysis of sensor and UI measurements captured during the recording session, along with corresponding timestamps of when the events were detected. The types of events that are monitored for during a recipe recording session are configurable. The list of events that are shown in the example table of FIG. 24, is non-limiting. In some embodiments, even when a single type of event is detected and recorded, the values for all other types of events at that time that are monitored for are also recorded. In some embodiments, when a monitored-for event is detected, the sensor measurements (of which there may be multiple channels corresponding to multiple sensors) before and after the time of the detected event (e.g., in a window of time one second before the event to one second after the event) are also saved as metadata for the detected event that is logged. In some embodiments, such sensor measurement data is included in the log line recorded for a detected event. (e.g., temperature measurements, weight measurements when a flip event was detected, etc.). In some embodiments, the table of FIG. 24 is also referred to herein as an event trigger table.

The logging of event driven triggers (versus all sensor measurements over the course of a recording session) improves the efficiency of the system, reducing the computing resources used in recording data, as well as reducing the memory needed to store logged events (as less data is recorded as compared to recording all sensor data).

In this example, the timestamps of the logged events are measured relative from the time since the recording session was initiated. In other embodiments, the timestamps of the logged events are determined according to a time standard such as UTC (coordinated universal time).

The following are further details and examples regarding the table shown in FIG. 24. In this example, parameters such as set point and device state correspond to user device commands (e.g., set by the user via the UI).

In this example, the columns for stir detected, flip detect, and removal detect correspond to detection of user actions/interventions that are inferred from other sensor readings. In this example, weight delta is also indicative of a user action, such as adding an ingredient, removing an ingredient, etc. In this example, whether a particular type of user action or device action is detected is indicated with a Boolean value, where the value is True if the user action is detected, and False if the user action is not detected.

As shown in this example, "browning % detected" indicates a condition of the ingredient being cooked (percentage browning).

Further details regarding detecting events based on monitoring for, and detecting, corresponding patterns of sensor measurements are described above.

The following is another example of a process for recording a log of events that occurred during cooking. For example, a user indicates a request to initiate recording. For example, a user selects an option to record in a connected app (e.g., app that is connected to the cooking device). The devices registers a request to record. The user uses the cooking device to cook food, such as in a manual control mode, or using a pre-existing technique.

The cooking device is configured to register the timestamp and information for each of the following events:

Temperature (each time the set temperature is changed)

Temperature reached (in some embodiments thermal constants are used to compensate for mass)

User interventions/actions, including, without limitation:
  addition of ingredients, based on detecting mass increase
  stirring, based on detecting a pattern of mass increasing and decreasing rapidly. Stirring can also be indicated via detecting of a corresponding acoustic signature.
  flipping of ingredients, based on detecting a pattern of mass increasing, then decreasing, then increasing again. Flipping can also be indicated via detecting of a corresponding acoustic signature.
  removal or replacement of cookware, based on detection of a change in mass, acoustic signature of cookware, inductive signature signals of cookware, etc. In some embodiments, an identifier of the recognized cookware is also recorded.

Food doneness, based on detection of a corresponding signature (e.g., acoustic signature, weight signature, etc.)

Timer set (each instance of setting a timer via the user interface)

Timer dismissed (each instance of dismissing a timer, such as by relevant user intervention, or explicit user dismissal)

Device turned on/off (via, for example, the dial interface described above)

Further Embodiments of Converting Sensor Event Logs to a Recipe

The following are further embodiments of converting a log of sensor events into a recipe (e.g., performed by recipe converter 2212). In some embodiments, the device log converter automatically generates a recipe from the device event log by cleaning up and summarizing events in the device event log. For example, the device log converter includes a script that identifies patterns in the device event log and combines multiple event logs into a summarized event.

The following are embodiments of a recipe structure. In this example, the log of events recorded during the cooking is converted into a recipe. The following are embodiments of a recipe structure. In various embodiments, a recipe is determined as steps/conditions, ingredients, descriptors of foodstuffs at any stage in the cooking or preparation process. In various embodiments, the recipe structure includes elements or fields (also referred to herein as "slots") for:

- steps or versions of technique (e.g., searing, frying, boiling, chopping, dicing, mincing, crushing, pureeing, etc.)
- conditions (e.g., temperature (350 C, 275 C/F, etc.), smoking, simmering, rolling boil, time periods, etc.)
- ingredients (e.g., salmon, fish, meat, egg white, chicken egg, egg, whole cloves, ground cloves, etc.)
- Descriptors (e.g., browned, crispy, clarified, melted, transparent, etc.)
- Meta-references, such as techniques that describe multi-step results, pre-prepared ingredients, entire sub-recipes (e.g., beurre blanc, over easy eggs, blanched almonds, hard-crack sugar, braised roast, puff pastry in a beef wellington, etc.)

As described above, various representations of the recipe are generated by the recipe converter 2212. One example of a representation of the recipe generated by the converter is a recipe program that is executable by a cooking device. The recipe program (corresponding to the generated recipe) includes a sequence of device commands and parameters usable to control operation of a cooking device. In some embodiments, the converter pushes or transmits the recipe program to a cooking device (same cooking device on which the recipe was recorded, or another cooking device that is using the recipe program to replicate the recipe). For example, the cooking device is updated with a new cooking technique option corresponding to the recipe.

Another example representation of the recipe is a text transcription of the recipe. In some embodiments, the text transcription is generated from the recipe using a natural language model. This allows the recipe to be translated into text with language that is natural to users reading the recipe text. In some embodiments, the converter allows users to make edits to the recipe text, such as annotating the text with pictures, videos, or additional text descriptors.

In some embodiments, the generated recipe is tagged with a particular user identifier and made available for sharing via a social backend. For example, both recipe programs and text transcriptions are available for sharing.

As described above, automatically generating a recipe includes summarizing a set of recorded event logs. In some embodiments, generating a recipe from cooking device sensor events includes translating or summarizing the recorded device log data into a sequence of steps and events, including conditions for progressing through the steps and events. The summarization of the steps and events detected during the recorded recipe is used to generate corresponding prompts to users as well as device settings adjustments during playback of the recorded recipe on another device. Such summarization is also used to generate a text transcription of the recorded recipe.

The following are further embodiments of synthesizing or summarizing or converting sensor event logs, recorded during cooking using a cooking device, into a sequence of recipe steps and events, along with corresponding trigger conditions and parameters for the recipe steps and events. In some embodiments, each recipe step is associated with a time at which the corresponding event (that forms the basis of the recipe step) was performed, as well as the amount of time elapsed between the current recipe step and the previous recipe step (based on the time delta between the events that form the bases for the consecutive recipe steps). In the below example, summarization of the sensor event log of FIG. 24 is described for illustrative purposes.

In some embodiments, converting the sensor events into a recipe includes identifying recipe steps from the sensor logs. For example, the sensor event log is scanned. Sensor events corresponding to recipe steps or events are identified. For example, a list of various types of recipe steps or recipe events is maintained, such as adding an ingredient, flipping, basting, adjusting a temperature, turning off the device, etc. Each type of recipe step is associated with a corresponding pattern of sensor events that is used to identify when the type of recipe step has occurred.

The sensor event log is scanned to identify any patterns of logged sensor events that match to recipe steps. As one example, the sensor event log is sequentially scanned (e.g., in order according to timestamps). For example, each log line of the sensor event log of FIG. 24 is evaluated (e.g., each row of the table of sensor event logs is scanned sequentially). The sensor events in the event log line are evaluated to determine whether any of the sensor events map to a recipe step. If it is determined that a sensor event (or combination of sensor events) mapping to a recipe step or recipe event has been identified, the corresponding recipe step or event is added to a recipe being generated. The recipe can be implemented in a variety of forms and data structures (e.g., a document object, table, file, list, etc.). In some embodiments, identifying patterns indicative of a type of recipe step involves scanning and evaluating sensor events across multiple log lines over a span of time.

As one example, suppose that a weight delta of positive 250 g is detected. The positive weight delta sensor event is identified as a recipe step of adding an ingredient. The recipe step of adding an ingredient is added to the end of a running list or sequence of recipe steps in the recipe being generated. In addition to recording the detected recipe step in the recipe, additional information for the recipe step is recorded as well. For example, a time at which the recipe step was performed is recorded as the timestamp at which the corresponding sensor event was detected. This timestamp can be used in a variety of ways, including for synchronization with a companion video recording. A condition for performing the recipe step is also recorded. For example, the recipe step is associated with a slot or field for indicating the condition on which the recipe step is performed. If the condition for the recipe step can be determined from the sensor event log, then the condition is populated. In other embodiments, the condition slot for the recipe step is populated using information from another recorded source, such as contextual information extracted from a companion content recording. In some embodiments, parameters for the recipe step are also recorded for the recipe step. Such parameters can include other measurements or events recorded in the logs of the sensor events from which the recipe step is derived. In some embodiments, if there is a previous recorded recipe step in the recipe being generated, a time difference between the previous recorded recipe step and the current recipe step being included is recorded. In some embodiments a recipe step is also associated with a slot for use intent. The user intent slot can be populated with information derived from the sensor events (e.g., from user interactions with the contextual UI), or with contextual information extracted from a companion content recording.

The following are further examples of converting sensor events into a recipe, including cleaning and summarization of sensor event logs. Another example of summarization includes combining multiple instances of a same type of event into a combined event. For example, consider stirring. In this example, the recipe step of stirring is detected if a sensor event of stir detected==TRUE is present in the log of sensor events.

The device is configured to monitor for, and detect each instance of stirring. In some embodiments, if a user performs five stirs in a row, five stirring events are detected and logged in sequence. In some embodiments, the device log converter is configured to collapse the five stirring events into a combined stirring device recipe step in the recipe being generated. As one example, a consecutive sequence of events of the same type is detected. Timestamps of the first and last instances of the event of that type in the block of events are determined. For example, the timestamps of the first detected stirring event and last detected stirring event in the block of stirring events are obtained from the sensor event log (e.g., consecutive block of events where stir detected==TRUE). An elapsed time for the user action of stirring is determined (e.g., determined as difference in timestamps corresponding to first and last detected instances of stirring). A single recipe step of stirring is generated based on the summarization of the stirring events and collapsing of the detected consecutive instances of stirring (which is an example of cleaning and summarizing the event log). For example, a recipe step to perform stirring is synthesized (based on, as described above, detection of events where stir detected==True, which maps to a recipe step of stirring). A parameter of the stirring is also recorded for the recipe step, such as the amount of elapsed time of stirring that occurred. As another example, a count of the number of consecutive instances of stirring that occurred is determined. In this example, five stirring events are detected. Another example parameter that is recorded for the stirring recipe step is the number of stirs that were performed. In this way, five separate recipe steps are not recorded to the generated recipe. Instead, a single recipe step of stirring is recorded to the generated recipe. Parameters of the recipe step are determined based on aggregation and summarization of corresponding sensor events that were logged by the cooking device.

Another example of summarization processing performed by the recipe converter is retroactive determination of recipe steps. One example of such a recipe step or action is sauce reduction. In this example, the converter searches the event logs for a pattern of events (which can span across multiple log lines) that are indicative of the recipe step of sauce reduction. For example, the converter scans for an event of liquid being added, where the system was set to boiling at that time (indication of sauce reduction starting). Suppose that at a later time (e.g., 30 minutes later) in the event log is an event that was detected with respect to the liquid (indication of when sauce reduction was stopped). The time between the event of adding the liquid and the second event in which a different event happened to the liquid is determined as the time in which sauce reduction was performed. The measured weight of the liquid at the time of the second event is determined. The weight of the liquid at the time of the second event is compared to the initial weight of the liquid at the time the liquid was added. The comparison is used to determine a percentage reduction for the sauce reduction (e.g., that the sauce or liquid was reduced by 50% if the weight at the time of the second weight measurement is half of the initial weight of the liquid). The percentage reduction is used to populate a parameter slot of the recipe step recorded to the recipe being generated (e.g., to perform sauce reduction until the determined percentage reduction is achieved).

In some embodiments, for each type of recipe step that can be detected from sensor event logs, in addition to storing a corresponding pattern of sensor events that is indicative of the recipe step, logic for determining corresponding conditions and parameters is also stored for a given recipe step for use by the recipe converter.

As an example of event log cleaning, the recipe converter is configured to filter out or discard events that are noise and are not recipe steps. For example, the device may record a user moving a pan. However, the user may have been moving the pan around due to nervousness. The device log converter discards such events.

In some embodiments, a recipe step includes an action to be performed (and that a user will be prompted to perform during recipe playback). In some embodiments, a recipe step also includes a trigger or condition for performing of the recipe step.

In some embodiments, the indication of when the recipe step is to be triggered/performed is time-based, such as an elapsed time since a previous step. For example, some user actions are driven by passage or elapsing of a specific amount of time. For example, performing the sous-vide technique or braising involves performing actions at specific times. In such cases, the trigger for such actions is time-based.

In some embodiments, the indication of when to trigger the user action or perform the recipe step is based on the state or value of one or more detected parameters. In some embodiments, a recipe step's deduced user action and when to perform the user action are synthesized by correlating multiple cooking device parameters. For example, the user action of flipping is associated with further contextual information such as the state of the ingredient (percentage browning) when the flipping was performed. In this example, the condition that triggers performing the user action of flipping is when a condition of the ingredient reaches a certain state or value.

In some embodiments, a recipe step is generated based on a change in a parameter value. For example, a recipe step is generated when a state or value of a user action or command changes, such as when the detected state of stirring changes from False to True. As another example, a recipe step is generated when the device state changes from off to on, or from on to off. As another example, a change in set point temperature is another indication of a user command to the cooking device. In some embodiments, a recipe step is generated when a change in set point value is detected (e.g., from 20 degrees C. to 100 degrees C., or from 100 degrees C. to 40 degrees C.). In some embodiments, the driver or reason (e.g., user intent) or condition/trigger for performing the user action is included in the synthesized recipe step.

In some embodiments, as described above, the driver or condition for generating a recipe step for a user action can be based on the occurrence of another event. For example, in the example event logs of FIG. 24, flipping is detected as having been performed after 7 minutes. A recipe step of flipping is determined to have occurred. A new step in the recipe has been determined from the sensor event log. In some embodiments, the time associated with the recipe step is also recorded. For example, the timestamp of the detected flip event is stored for the recipe step (e.g., 7 minutes since start). A condition or trigger for the flipping step is also determined and associated with the recipe step. In this example, the condition or trigger is determined to be the percentage browning that was detected at the time flipping was detected. In some embodiments, user intents with respect to recipe steps are obtained from companion recordings of the cooking of the recipe, further details of which will be described below.

In some embodiments, a generated recipe step includes contextual information or notification information such as an amount of time before a state of an ingredient is reached. In some embodiments, the contextual information included in a recipe step is determined based on the action being performed. For example, suppose that the action is the addition of content, which is measured by an increase in weight. In some embodiments, contextual information is associated with the action, including the weight of the content or ingredient that was added. In some embodiments, the weight of the content that was added is determined from the weight delta measurement. As described above, the weight delta measurement can also be determined based on access to weight information pertaining to a recognized cookware that is in use (indicated, for example, via the pan or cookware identifier column).

In some embodiments, the determination of what trigger or condition to specify for a recipe step/user action (e.g., elapsed time trigger, or trigger based on event/state detection) is based on what type of user action is being performed in the recipe step.

For example, in some embodiments, a recipe step includes an action that was performed, and an indication of the condition on which the recipe step was performed. The indication of when to perform the action can be an amount of elapsed time from the previous step. The indication of when to perform the action can also be based on the state of one or more other parameters. In some embodiments, an indication of an amount of time before the action was performed (relative to the previous step) is determined (e.g., to provide users an indication of at least a temporal approximation of when the trigger for performing a user action will occur).

Some recipe steps include user actions that are not correlated or triggered by another event. For example, during manual control, a user may turn the cooking device on or off, or adjust a set point temperature. As another example, the user selection of a technique is logged as an event. Such user command events are designated as, and converted into, recipe steps.

The following is another example of synthesizing a recipe step from event log data. Referring to the example table of FIG. 24, in this example, 30 seconds after start, a weight delta was detected. In this example, a positive weight delta was determined. The positive weight delta is indicative of the adding of an ingredient. In this example, the converter synthesizes a recipe step of adding an ingredient. The amount of the ingredient to add is also recorded as a parameter of the recipe step. The amount of ingredient to add is the weight delta in this example. A condition for the synthesized recipe step is also determined. In this example, the condition for adding ingredients is determined to be the elapsing of 30 seconds of preheating. For example, from the event log, the converter determines that pre-heating occurred or was requested, based on the set point temperature being increased, such as by more than a threshold amount. The amount of time that pre-heating took is based on a determination of the time that elapsed until the measured temperature reached the set point temperature.

In some embodiments, the synthesized or sensor event-converted or sensor event-derived recipe is stored. In some embodiments, the synthesized recipe is used to generate various outputs. For example, the synthesized steps and events are used to generate a recipe program that includes device settings and prompts to be provided to users of playback cooking devices that are playing back the recorded recipe. In some embodiments, a natural language processing model or LLM is used to summarize the device logs into a natural language transcription for presentation to users. A text representation of the above-described summarization of the event logs in FIG. 24 is shown in the example of FIG. 25. In other embodiments, device programs and text representations are generated directly from synthesis of sensor event logs.

Further Embodiments of Generating Recipe Programs

The following are further embodiments of generating recipe programs.

In some embodiments, the recipe converter uses the data contained in the slots of the automatically generated recipe (converted from the log events) to generate a sequence of device commands and parameters that is executable on a cooking device. Two example types of device commands are device setting commands and prompt commands. Device setting commands include commands to adjust a cooking device's settings. A prompt command includes a command to issue a prompt or communication to a user via the UI of the cooking device. As one example, the recipe program is a script that has an if/then case structure that encodes the sequence of device commands and parameters, as well as conditions for triggering device commands. As another example, the recipe program is implemented as a branch model. Other code structure representations can be utilized and sent to other cooking devices for playback. The following are further embodiments of generating a recipe program.

In various embodiments, the device log converter uses slot information of the auto-generated recipe to:

- convert steps to either operating conditions (device settings) or communications (prompts) to the user of expected actions
- convert ingredients to communications to the user and control parameters
- convert descriptors to user communications and conditions
- convert conditions to output power settings
- determine relationships between sensor input, ingredients, user actions, descriptors of desired output.
- determine operating conditions, including in real-time, near real-time, or preconfigured (e.g., output power and time relationships between device output and known temperature of cooking vessels or foodstuffs).
- adapt output power settings and communications based on predictive relationships in order to adapt to actual cooking conditions (e.g., actual weight, actual heating profile, actual temperature, etc.).

In various embodiments, parameters of device commands include information such as:
- to communicate to users (e.g., "add ingredient now")
- for system settings (e.g., "set power level to 5")
- to feed system algorithms (e.g., temperature setting and measurement frequency relevant to specific recipe, type of ingredient and the masses for the system to calculate how much energy that the cooking system should apply, etc.)

In some embodiments, the device commands and parameters are generated based on summarizing of the log of sensor events. The following are further embodiments of using summarized events to generate an executable recipe program that includes a sequence of device commands for controlling the operation of a cooking device when playing back or executing the recipe program.

In some embodiments, a step in the sequence of steps includes a device command to be issued, and a corresponding trigger for indicating when to issue the device command.

For example, the recipe program includes device commands to adjust settings of the cooking or to issue prompts to the users. The device commands are associated with parameters or information used when issuing the device commands, the recipe program includes conditions on which to perform the device commands.

In one embodiment, the device commands and parameters are generated from the above-mentioned recipe converted from the sensor event logs. For example, the generated recipe file or recipe entity includes a sequence of recipe steps or recipe events determined based on scanning of the sensor event logs for patterns of detected sensor events corresponding to various types of recipe steps and recipe events. Each recipe step recorded in the recipe file is associated with corresponding parameters and fields, such as conditions for performing the recipe step, information on how to perform the recipe step, temporal information pertaining to the recipe step, etc. In some embodiments, device commands are generated from the sequence of recipe steps in the recipe file. As one example, different types of device commands are generated based on the type of recipe step to be converted into a device command. For example, recipe steps are identified as being device setting commands or device prompt commands. As one example, device setting commands are generated for recipe steps that involve an adjustment to a device setting that the cooking device can be commanded to automatically set, such as an adjustment to temperature, auto-selection of a technique, etc. In some embodiments, device prompt commands are generated for recipe steps that are not performed by the cooking device, but by the user. For example, recipe steps such as stirring, basting, flipping, adding an ingredient, etc. are to be performed by a user. For such user-performed recipe steps, a device prompt command is generated that commands a cooking device to issue a prompt (e.g., via its UI) to perform the user action corresponding to the recipe step. Parameters for the device command are also used to generate the message that the device is to deliver and prompt the user with. In other embodiments, the recipe program is generated by adapting the recipe conversion processing described above to directly convert the sensor event log into the recipe program (e.g., by using mappings of different types of device commands to corresponding patterns of sensor events to identify and generate a sequence of device commands from a sensor event log).

In some embodiments, the recipe program includes a script with conditions/commands specified for the steps of the recorded recipe. In some embodiments, the code corresponding to the recipe steps is executed in a sequence or flow that corresponds to the sequence of recipe steps generated from the sensor event logs. The following is an example of a portion of a recipe program including pseudocode corresponding to sequential execution of two recipe steps:

```
// recipe step N
if (recipe_N_condition)
{
device_command_N(device_command_N_parameters)
}
// recipe step N+1
if (recipe_N+1_condition)
{
device_command_N+1(device_command_N+1_parameters)
}
```

As described above, the device commands and device parameters, as well as the conditions or logic for issuing device commands, are derived from event logs. One example type of device command is a command to generate a prompt to a user. Another example type of device command is a command to set a parameter or setting of the playback cooking device. In some embodiments, generating the recipe program includes generating a sequence of device commands. The sequence of device commands in the recipe program that are generated corresponds to a summarization of the events detected and logged from the recipe recording. At playback time, the playback cooking device executes the recipe program, including playing the sequence of device commands (for prompts and device settings).

As shown above, in some embodiments, a device command includes device type actions. As described above, one example of a device type action is setting of parameters of the device (e.g., temperature, technique, operating mode, timer, etc.). Another example of a device type action is to provide a prompt (e.g., via the UI) to the user to perform a user action (e.g., to add ingredients, flip the ingredient, stir the ingredient, etc.). In some embodiments, device commands include parameters specifying how the device commands are issued (e.g., message to include in a prompt command, set point temperature for a temperature adjustment command, technique to be selected for a technique selection command, etc.). In some embodiments, device commands include a condition for issuing the device command.

In some embodiments, the recipe program includes logic for determining when to proceed to a next step in the playback of the recipe. In some embodiments, the recipe program determines to proceed to a next step in the playback of the recipe based on an elapsed time from the previous step. As one example, the amount of elapsed time to wait between steps in recipe playback is determined based on the difference in timestamps between detected events in the event log (that determine when, for example, a device command such as a prompt should be issued).

In some embodiments, the conditions on which to issue device commands are obtained from a separate set of contextual information, such as that extracted from a companion recording of the cooking. The command conditions may include compound conditions to be met before a particular command is executed. Examples of command conditions include time-based conditions (e.g., elapsed amount of time), ingredient content state conditions (e.g., percentage of browning), temperature-based conditions (e.g., when a certain temperature is reached), etc. In some embodiments, the command condition is determined based on the contextual information. For example, suppose a command to issue a UI prompt to the user to perform stirring. There are several candidate or potential conditions for performing the UI prompt command. In some embodiments, the selection or determination of the condition to include for the command in the program is determined based on information such as user intent extracted from the external source (e.g., time synchronized recorded video stream).

As another example, suppose the command is to add an ingredient, and a parameter of the command to prompt the user to add the ingredient is a name or identifier of the ingredient to be added. The name of the ingredient can be identified from the companion data recording, such as the recorded video of the cooking.

The following is another example of determining device command conditions (e.g., conditions for performing a device command corresponding to a recipe step).

In some embodiments, the trigger for a user action (which can be used as the basis for a recipe step) that was recorded is identified based on user interactions with the user interface, as well as what the cooking device sensors measured with respect to the cookware and the ingredients. This includes identifying whether the trigger or intent for performing some user action or transition to a next recipe step (or phase of cooking) was based on time, food condition (e.g., percentage browning), a certain temperature being reached, a certain sauce's mass being reduced down to (e.g., to stop performing sauce reduction), or another type of condition.

In some embodiments, the trigger (or condition for when to perform a recipe step) is a reflection of user intent. In some embodiments, the trigger event for a user action or for progressing to a next step or for determining that a current step is complete is determined from the companion content or contextual information extracted from the companion content. For example, from a device perspective, when a user action is detected, there may potentially be multiple other sensed events that are occurring at the same time as the user action. While there may be multiple correlated events, the device may not be aware of which of the sensor-derived measurements (or combination of sensor events) is the actual trigger for the action (and that corresponds to the user's intent for a recipe step). In some embodiments, which other parameter or logged event is the trigger condition corresponding to the recipe step is determined from the companion recording (e.g., from the video from the external device).

Returning to the example of sauce reduction, suppose that two candidate sensor events to convert into conditions or triggers for when to stop sauce reduction (or to move to a next recipe step) are the mass of the sauce reducing down to a certain point, and a specific temperature being reached. Contextual information extracted from the video recording that matches to the time that sauce reduction was halted is obtained (e.g., based on time synchronization between the video recording and the sensor events). In this example, from the user's description in the portion of the video corresponding to sauce reduction, a user intent is extracted. For example, from the user's description, it is determined that the user's intent was to use the mass as the driver or trigger for when to stop sauce reduction. Based on the user intent derived from the companion video recording, the integration engine is configured to select the amount of mass reduction as the condition for the recipe step. The recipe program and text transcription are updated or augmented accordingly.

Further details regarding integration of contextual information extracted from a companion recording are described below.

In some embodiments, the recipe program includes logic for entering a standby mode if the conditions for progressing to the next device command in the sequence of commands of the recipe program are not met within a threshold amount or period of time. As one example, suppose that the device command is to issue a prompt to a user to perform a user action. Suppose that the condition for the next device command to be issued is the detection of the occurrence of the prompted user action. If the occurrence of the previously prompted user action is not detected within a threshold of time (e.g., based on analysis of live sensor measurements), the recipe program is configured to cause the playback cooking device to enter into a standby mode. As one example, when in standby mode, the heat is turned down. The standby mode can be configured with other actions to perform.

The following is another example of a standby mode. In some embodiments, the recipe program causes the playback cooking device to enter a standby mode in the event that certain expected or prompted behavior does not occur. For example, suppose that a device command is to issue a prompt to perform a user action such as flipping the ingredient. The system then monitors for whether the prompted user action has been taken. For example, the cooking system analyzes the raw sensor information to determine whether the sensor signature for flipping has been detected. If the prompted user action does not occur within a threshold amount of time, then the system enters a standby mode, such as for safety, to protect the integrity of the ingredients, etc.

Further Embodiments of Natural Language Text Transcriptions

In some embodiments, the recipe converter is configured to generate a human-readable transcription of the recipe. As one example, the slot information of a generated recipe is converted into the transcription. In some embodiments, language models are used to convert the recipe slot information into a natural language format. Examples of types of output transcriptions include written, audio, and/or video format transcriptions.

In some embodiments, the recipe converter is configured to summarize the sensor event log into a human-readable recipe transcription by using natural language summarization, such as an oversized text-to-speech model, or any other language model as appropriate. For example, a large language is used in some embodiments. In some embodiments, the language model operates directly on the event log. In other embodiments, the language model operates on the summarization of the event log (recipe) generated by the device log converter. In some embodiments, a language model is configured to consolidate sensor-detected events (recorded by the device) into language logical blocks. In some embodiments, the text transcription is generated by adapting the recipe conversion processing described above to directly convert the sensor event log into the text transcription. In other embodiments, the text transcription is generated from the recipe file that is created based on the above-mentioned scanning and evaluation of the sensor event log.

FIG. 25 illustrates an embodiment of a transcription of recipe steps and events. The text transcription of FIG. 25 is a textual representation of the sensor event logs shown in FIG. 24. In this example, the transcription of recipe steps and events is generated by summarizing or synthesizing the log data shown in the example of FIG. 24.

As shown in the example of FIG. 25, the text transcription includes a placeholder value of "protein" in various recipe steps that pertain to ingredients. While some types of ingredients can be classified and synthesized from a recorded sensor event log (e.g., whether water or oil is in the cookware can be detected based on how the temperature of the cookware heats in response to given amounts of applied input power), other types of ingredients may be more difficult to classify from sensor measurements. User intent is another example of information that can be difficult to determine for sensor event logs. The augmented, natural language text transcription can then be provided as output, such as for offline viewing.

Augmenting Sensor Event-Derived Recipe Steps and Events

The following are embodiments of augmenting sensor event-derived recipe steps with contextual information from companion data. In some embodiments, the augmentation is performed by integration and editing engine 2228. In some embodiments, the augmentation is performed to converted recipe steps, which are then passed to recipe programs and recipe text transcriptions. In other embodiments, the augmentation is performed on the recipe programs and the recipe text transcriptions.

When generating recipes, it would be beneficial if the text transcription, as well as recipe program, included the specific ingredient or user intent that is involved in recipe steps. As described above, in some cases, such information can be difficult to infer directly from sensor events. In some embodiments, when synthesizing recipe steps that include information pertaining to ingredients or user intents, the data structure for the recipe step includes a field or slot for indicating the ingredient or user intent that is associated with the action or cooking operation. In some embodiments, where the specific ingredient or user intent is not identified from the cooking device sensor measurements, the recipe converter includes a placeholder variable in the place of the ingredient field or user intent field in the recipe step. "Protein" is one example of an ingredient placeholder value for an ingredient slot in the recipe step data that is manifested in the example text transcription of FIG. 25. Other placeholder values may be utilized as appropriate.

In some embodiments, the placeholder values for such ingredient or user intent slots are replaced with contextual information received from another source of accompanying or companion data, such as inputs provided via the external device, information extracted from the audiovisual recording made using the external device, etc. For example, with respect to populating ingredient slots in recipe steps, the ingredient can be obtained from the record of text inputs that the user typed into the app (e.g., ingredient that the user typed into the companion mobile app). The ingredient information can also be extracted from the audiovisual stream via speech-to-text conversion, image recognition, etc. The ingredient and user intent slots of recipe steps can also be augmented using information provided via the cooking device itself (e.g., via a keyboard connected to the cooking device, or by the user speaking the ingredient to the device, which is captured by the microphones on the cooking device). As another example, recorded recipes can be maintained at a remote entity that is accessible over a network such as the Internet. In some embodiments, a cloud-based web interface is provided that allows users to annotate recipes, including adding ingredient information, updating information (e.g., filling in actual ingredients, making corrections to ingredients that were incorrectly specified), etc.

The following are further examples of populating user intent and/or ingredient slots with data extracted from companion recordings. For example, for a device command, the intent associated with an action is included in the message that the user is to be prompted with (e.g., as a parameter of the command). Different types of intents may be associated with different types of actions or recipe events. For example, suppose a recipe event/step of adding an ingredient. A device command is generated to command the display of the cooking device to prompt the user with a message to add an ingredient. A slot for populating in the ingredient is included. A slot for populating an intent associated with the action is also included. For example, from the video recording, suppose it is determined that, at the time of the action (determined based on synchronization of timestamps), the ingredient garlic is extracted from the video recording. Garlic is populated as the ingredient in the device command prompt. (In some embodiments, if no ingredient is identified from the video, then a default ingredient value is used, such as "ingredient"). Suppose that from the video, it is also determined that the user said to put the garlic on the pork chop. In this case, positioning of the garlic on the pork chop is an example of a positional intent associated with the action of adding the ingredient. The intent slot in the recipe step (as well as recipe program and text transcription) is populated with the information obtained from the video analysis. For example, the device prompt command includes parameters pertaining to the message to be displayed in the commanded prompt, such as the ingredient to add, as well as a user intent with respect to the adding of the ingredient, which in this example is the position of where the garlic is to be added (which is derived from the analysis of the companion video recording). If no intent is available, then one need not be specified in the device command.

Further embodiments and details regarding extraction of contextual information from companion recordings and augmenting of sensor event-derived recipe representations (e.g., sensor event-derived sequence of recipe steps, programmatic recipe representation, text recipe representation, etc.) are described below.

Further Embodiments of Companion Content Processing

The following are further embodiments regarding processing of recorded companion content, such as companion multimedia content such as video recordings. As will be described in further detail below, processing of companion content includes extracting contextual recipe information from the companion recording. This includes recognizing of information such as ingredients and user intents from video recordings. Embodiments of using such information recognized from a video recording to augment or annotate information derived from sensor event logs is also described below.

In the following example, an external device (e.g., companion recording device 2202) is configured to capture an audiovisual recording of the cooking performed using the cooking device. In some embodiments, the audiovisual recording of the cooking is time synchronized with the sensor events that are logged, further details of which are described below.

In this example, the companion data converter is configured to extract contextual recipe information. In some embodiments, the companion data converter extracts contextual information by performing image and video analysis processing on the video recording. As one example, the companion data converter makes calls to a service such as Amazon Rekognition.

In some embodiments, image and video analysis is used to perform image recognition, including using images in the video recording to recognize what objects are in frame, as well as different aspects of the image. For example, the image recognition determines that boiling butter is seen in the video, or that raw steak is seen now, or that semi-cooked steak is seen. In some embodiments, the companion data converter is configured to generate automated annotations of what is predicted to be in the video recording.

In some embodiments, if there is audio, the companion data converter is configured to convert the recorded audio into words, and map one or more words to an intent. In some embodiments, both the detected words and the predicted intent are stored so that the annotations and verbalizations are accessible.

In some embodiments, the companion data converter is configured to generate a transcription of the audiovisual recording. The transcription includes ingredients, user descriptions, and user intents extracted from the audiovisual recording. In some embodiments, the video is annotated with summarizations of what was verbalized (e.g., intents). Annotating with summarizations reduces the amount of text that the video is annotated with, improving readability on devices with smaller screens. For example, video recognition services such as Amazon Rekognition are used to generate speech-to-text of what was verbalized in the video. A summarization engine such as Amazon Comprehend or Olympus is called to summarize the text generated based on the video recognition. In some embodiments the video recording is annotated with such summarizations (e.g., intents) derived from the verbalized audio.

In some embodiments, the contextual transcription generated by the companion data converter includes slot inputs. For example, verbs are converted to actions, and nouns are converted to slots. The ingredients in slots can then be plugged into the device-converted recipe transcription and recipe program. For example, the "protein" placeholder variable shown in FIG. 25 is replaced with the ingredient extracted from the video that is correlated in time. In some embodiments, which placeholder variable to populate an ingredient with is based on time synchronization (e.g., based on timestamps) between the device-derived transcriptions/recipe programs (output of device log converter) and the video recording. Similarly, user intent is extracted from the video or the verbal description of the user and slotted into appropriate regions of the text and programmatic representations of the recipe to make instructions and device commands richer. In some embodiments, the augmentation of the sensor event log-derived outputs is performed by the integration and editing engine 2228.

In some embodiments, the companion data converter is run in the cloud and is called by an API (Application Programming Interface). In some embodiments, the companion data converter includes a wrapper that converts the outputs of the API calls. For example, the wrapper is configured to access the noun slot intents that are relevant and then map them into ingredient slots in the text transcription and/or recipe program synthesized from the sensor event log. The wrapper is also configured to convert adjective elements to text to render by the integration and editing engine 2228. This includes determining what text to render over the video during playback. In some embodiments, the determination of what text to render and annotate the video with is based on a desired size of token to render on screen. In some embodiments, the wrapper is also configured to determine what user descriptions or summarization should be rendered on the screen.

Augmenting Companion Content Based on Sensor Event Logs

The following are further embodiments of augmenting a companion recording of user control of a cooking device based on a log of sensor events recorded during user control of the cooking device. Embodiments of the augmenting described herein are performed by integration and editing engine 2228.

In some embodiments the audiovisual recording of the user's cooking on the cooking device (or a version of the audiovisual recording annotated by the companion data converter) is integrated with, or augmented based on, the events in the device sensor event log. In some embodiments, the augmentation is performed based on correlation between the video and the summarized events based on time synchronization.

As one example, recipe events or steps generated from summarizing or otherwise converting sensor event logs are used to demarcate segments or blocks within the video recording. For example, if the recipe steps or events are basting, flipping, and stirring, corresponding sections of the video (based on synchronized timestamps) are demarcated or segmented (e.g., basting section, flipping section, stirring section). For example, the sections are indicated as chapters in the recipe. As one example, if a recipe event derived from the event log is basting for 30 seconds, the corresponding 30 second segment in the video recording is demarcated as pertaining to basting. An example of such demarcation is shown in the timeline of FIG. 23B.

In some embodiments, editing of the video recording is performed based on the synchronized event logs. As one example, automatic clipping of the video recording into blocks or segments is determined based on the recipe events and steps synthesized from the device event log.

As another example, the audiovisual recording is annotated with text that is determined based on the log of sensor events. For example, at times in the audiovisual recording corresponding to recipe steps, a text indication of the recipe step is rendered or overlaid on the audiovisual recording. For example, if a section of the video corresponds to a recipe step of performing of a user action, a label of the user action is overlaid on the video.

Time Synchronization of Recorded Sensor Events and Companion Recording

The following are embodiments of synchronizing recording of sensor events logged during cooking with a companion (e.g., audiovisual) recording of the cooking.

In some embodiments, a marker is used for time synchronization. For example, time synchronization is facilitated by a signal that is sent between the cooking device and the external companion recording device. In some embodiments, the external device issues a time synchronization request. For example, video recording of the cooking is requested via a mobile app installed on the mobile device. In response, the mobile device sends a time synchronization request or marker to the cooking device. The cooking device then temporally synchronizes its logging of device sensor-detected events (e.g., synchronization of timestamps) with the external device's audiovisual recording.

In other embodiments, the time synchronization indication is sent from the cooking device to the external device. For example, the time synchronization signal is transmitted over the air (e.g., over Wi-Fi, or Bluetooth), or via a wired communication (e.g., USB-C). In another embodiment, the cooking device logs events according to a standard such as UTC time (Coordinated Universal Time). The video recording is also timestamped according to the same time standard.

In some embodiments, when video is being recorded by an external device, the time synchronization that is transmitted is used to synchronize the start of cooking device sensor recording and video recording. In some embodiments, the cooking device automatically records sensor measurements when turned on (without requiring explicit user commands to initiate recording). For example, recording or logging of sensor/UI events is automatically initiated whenever a user starts to cook with the device. The user has the option later to save or delete the recorded sensor/UI event logs.

As described above, the companion data converter is configured to process the companion recording of the cooking (e.g., audiovisual recording). For example, the companion data converter is configured to take the inputs from the mobile device, such as video, audio, and text, and then synthesize a transcription from the contextual recording. For example, ingredients and user intents are extracted from the audiovisual recording.

Using the time synchronization, information extracted from the audiovisual recording is used to augment the executable recipe program and the transcription generated by the recipe converter. For example, the recipe program 2214 and the transcription 2216 are updated to include the names of the specific ingredients that were added at specific times. As another example, the user intent is used to determine the condition for triggering a device command in the recipe program. In some embodiments, the time synchronization of the audiovisual recording of the recorded device events is used to determine where the contextual information extracted from the audiovisual recording is applied in the executable recipe program and the recipe transcription. In this way, the contextual information extracted from the audiovisual recording is another channel of information that can be used in generating executable recipe programs and the recipe transcription.

Embodiments of Editing Companion Content

The following are embodiments of editing companion content using information determined from sensor events logged during user control of a cooking device. In the following examples, editing of a companion audiovisual recording is described for illustrative purposes. Embodiments of the techniques described herein can be variously adapted to accommodate editing of other types of companion content (e.g., audio streams) using sensor-event derived information. In some embodiments, the editing is performed or otherwise facilitated by integration and editing engine 2228.

One example of supported editing functionality is automatic cropping. For example, cropping is performed to shorten the duration of the video recording pertaining to recipe steps. For example, suppose that the unedited segment of video corresponding to sauce reduction is 10 minutes in length. In some embodiments, the video segment is cropped or shortened so that a user need not spend 10 minutes watching sauce be reduced. In some embodiments, the timestamps of the video recording used to demarcate the sauce reduction segment are determined based on the recorded sensor event logs, as described in further detail above.

As described above, in some embodiments, the integration and editing engine facilitates manual editing of companion content. As also described above, in some embodiments, the video recording is segmented according to markers determined from summarization of sensor event logs. In some embodiments, potential events to demarcate videos are also obtained from the extracted features of the video. In some embodiments, mismatches between events derived from sensors, and events obtained from the video feature extractor are identified. Such mismatches are surfaced to users, who can decide whether or not there should have been a recipe event/step at the indicated time (and thus, whether a section of the video should be demarcated). For example, suggested markers are determined based on the processing performed by the recipe converter. The suggested markers for marking sections of a video can be overridden by users.

As one example, suppose that during cooking, the user added an herb. Because of the lightness of the herb, the device did not detect the recipe event of adding content, and does not have, in its sensor event-derived recipe, a recipe step of adding an ingredient at that time. However, suppose that a video extractor of the companion data converter annotates a frame in the video as showing that an ingredient was placed in the pan. Such extractions are labeled as candidate recipe steps events. As a recipe event from the device log converter was not generated for that time, but there is a candidate recipe event from the video analyzer, the user is flagged and prompted to determine whether a recipe event should be added to the recipe at the corresponding time.

Embodiments of Recipe Replication and Playback

Based on the recipe recording and conversion described above, various types of recipe representations are generated. One example type of recipe representation is a text transcription of the user control of the cooking device. Another example type of recipe representation is a programmatic representation, including a recipe program executable by a cooking device. Another representation of the recipe is an audiovisual recording of the user control of the cooking device. By using such recipe representations, a user can replicate a recorded recipe by viewing an annotated video, read a text version of the recipe with further detailed information, while having their cooking device operate automatically in a synchronous manner.

The following are further embodiments of recipe replication and playback.

Coordinated Playback of Recipe Program and Companion Content

The cooking device can run the recipe program independently of the video recording. For example, the recipe program (augmented or un-augmented) can be sent to the cooking device, where it is run automatically.

A mobile device can playback the video recording (augmented or un-augmented) independently of the cooking device. For example, the video with augmented descriptions can be shared on social media for viewing by others.

The running of the recipe program and the video recording can also be played together in a coordinated manner. Embodiments of coordinated playback of a recipe program and a companion recording are described below.

In some embodiments, during playback, time synchronization is performed between execution of a recipe program on a playback cooking device and playback of the edited/annotated video recording (e.g., on an accompanying mobile device). For example, the user can initiate execution of a recipe from the cooking device or the mobile device. Time synchronization is performed to have the video recording and the recipe program run concurrently. In some embodiments, time lag or stretching/compressing is performed so that the video and the cooking device operations are synchronized based on events, or otherwise linked by the occurrence of events or recipe steps. For example, if the video shows an action taking 7 minutes, but the user used a smaller steak and an event finished sooner, the video, in response to receiving a signal from the cooking device that a next recipe event or step is occurring on the cooking device, also skips ahead to the next event demarcated in the video. Embodiments of demarcation of video recordings based on recipe steps are described above. In this way, video playback and recipe program playback are coordinated both in time and based on events.

For example, the cooking device and the video playback device are made aware of each other's playback position by communicating with each other where they are in time in the playback, and/or what recipe step they are currently in. For example, while the cooking device is in a step of holding the temperature for some amount of time, they may scroll back through the video to revisit an earlier part of the recipe. When done reviewing, the user can then re-center the video based on where the cooking device is in the recipe program. For example, the cooking device reports to the mobile device its location (e.g., recipe step) in the recipe program. The mobile device uses the reported location of the cooking device to seek or move playback to a corresponding location in the video (e.g., based on corresponding markers of matching recipe events/steps and/or timestamps that the video has been augmented with).

Embodiments of Recipe Program Playback

The following are further embodiments of recipe program playback. In some embodiments, performing recipe playback includes operating a cooking device in playback mode in which the operation of the cooking device is controlled based on the sequence of device commands and parameters included in a recipe program that was generated from a recorded log of sensor events.

In some embodiments, the recipe program is communicated to a cooking device. In some embodiments, a generated recipe program is published (e.g., hosted on a remote entity). The recipe program can then be searched for and downloaded by other users of instances of the cooking device. A recipe program can also be downloaded, installed, or stored to the cooking device that was used to generate the recipe program.

The recipe program is installed on the cooking device. As one example, a menu of available recipes for playback is updated to include the installed recipe program as a selectable option. In this example, suppose that a user of the cooking device (referred to in this example as the "playback" cooking device) selects the recipe program for playback. Ater detecting that the user has selected this particular recipe for playback, the recorded recipe program is loaded. The playback cooking device operates according to the sequence of device commands (e.g., device prompts and device settings commands, along with accompanying parameters) and logic (e.g., conditions for progressing through the sequence of device commands) of the loaded recipe program or script.

In this example, suppose a recipe program corresponding to the text transcription of FIG. 25, and generated as described above, is selected by the user for playback. In this example, in response to selecting of the recipe program, the cooking device is configured to set its temperature setpoint to 100 degrees Celsius, and pre-heat the pan. After 30 seconds, the recipe program causes the playback cooking device to issue a prompt to add ingredients. After another 10 seconds have elapsed, the cooking device is caused to issue a prompt to perform stirring. After seven minutes have elapsed, if a certain level of brownness has been achieved, the cooking device is commanded to issue a prompt to the user to flip the content (where the content or ingredient can be populated with information extracted from a companion recording, further details of which are described above). After another six minutes, if the recipe program determines (from the evaluation of cooking device sensor measurements) that the content is brown, the device is commanded to enter a warming mode (e.g., to automatically set the cooking device to a warming mode, or issue a UI prompt to the user to set the cooking device to a warming mode). After 35 seconds in the warming mode, the recipe program issues a command or instruction to the cooking device to provide a UI notification to the user that the food is ready.

Embodiments of Standby Mode

As described above, in some embodiments, during playback of a recipe program, the playback device is also configured to enter a standby mode under certain conditions. The configuration of the standby mode can be included in the recipe program. In other embodiments, the playback cooking device is configured with a default standby mode that can be entered into under corresponding conditions.

The following are further embodiments of a cooking device standby mode. In some embodiments, during playback mode, the playback cooking system monitors for deviations from expected behavior as specified in the recipe program. For example, heating control is constrained or limited based on device parameters and monitored events exceeding thresholds relative to expected device parameters and monitored events as specified in the recipe program.

For example, suppose that cooking of an egg was previously recorded. The recipe program includes a device command to prompt the user to flip the egg based on the condition of a measured level of doneness. A next device command in the recipe program is to prompt the user to perform another action in response to detection of flipping.

In this example, in response to detecting the egg reaching the desired level of doneness, the device prompts the user to flip the egg. Suppose that during playback, the user of the playback cooking device, as the egg reached the level of doneness, walked away, and did not flip the egg as prompted when the corresponding level of doneness indicated in the recipe program was reached. By not flipping the egg and leaving it on the pan, the egg may become overcooked.

In various embodiments, the device is configured to monitor whether the prompted user action specified in the device prompt command was performed, whether a state of the ingredient is deviating from an expected state, etc. For example, the cooking device monitors whether flipping is detected (and how long it has been since the user action was prompted). The device also monitors the level of doneness of the egg.

If the level of the doneness of the egg exceeds the desired level of doneness and/or a flipping action was not detected by the system within a threshold amount of time, the cooking device enters a standby mode to prevent overcooking of the egg. As one example, the cooking system automatically turns the temperature down to prevent overcooking of the egg.

As another example, the cooking system monitors when measured parameter values match triggering parameter values used to determine when a user action is to be performed. In some embodiments, the cooking system also measures the amount of time that is elapsing from when the triggering threshold was reached. The cooking system also monitors for whether the user action corresponding to the triggering threshold, as specified in the recipe step, has been performed. If the corresponding user action has not been performed within a threshold amount of time of the triggering threshold being reached, the cooking system is configured to enter into a default or standby or safe mode. This is done to, for example, preserve the integrity of the ingredients being cooked.

As another example, suppose that a device command corresponds to the technique of sauce reduction. According to the recipe, an action is to be taken when a sauce is reduced to a certain reduction level. In this example, the playback device monitors the current reduction level and compares it to a specified reduction level. In this example, when the specified reduction level is reached, and the corresponding user action has not been performed in the threshold amount of time, the system automatically enters a standby mode and turns the power to the heating element down to prevent the sauce from boiling down further.

In some embodiments, entering the standby mode pauses the playback of the recipe program, where the recipe playback does not proceed to the next recipe step until the conditions for exiting standby mode are satisfied (e.g., completion of the current recipe step). In some embodiments, the standby mode is exited when the user performs the user action of the current recipe step. The cooking system then reverts back to regular playback mode.

In some embodiments, each device command is associated with standby logic for determining when to enter a standby mode, as well as the standby action to perform. For example, a device command includes a set of corresponding standby conditions (e.g., pattern of monitored events that is a signal or condition or trigger for entering standby mode) for entering a standby mode. In some embodiments, the device command is also associated with a set of conditions for exiting standby mode. Different device commands can be associated with different standby mode conditions and actions. In other embodiments, the standby mode action is a default set of actions that is applicable whenever standby mode is entered, where the conditions for entering and exiting standby mode are specific to the device commands and their parameters.

Live Streaming

The recipe recording system of FIG. 22 can be adapted for live-streaming of cooking. The following are embodiments of recipe live-streaming.

Figure 26:
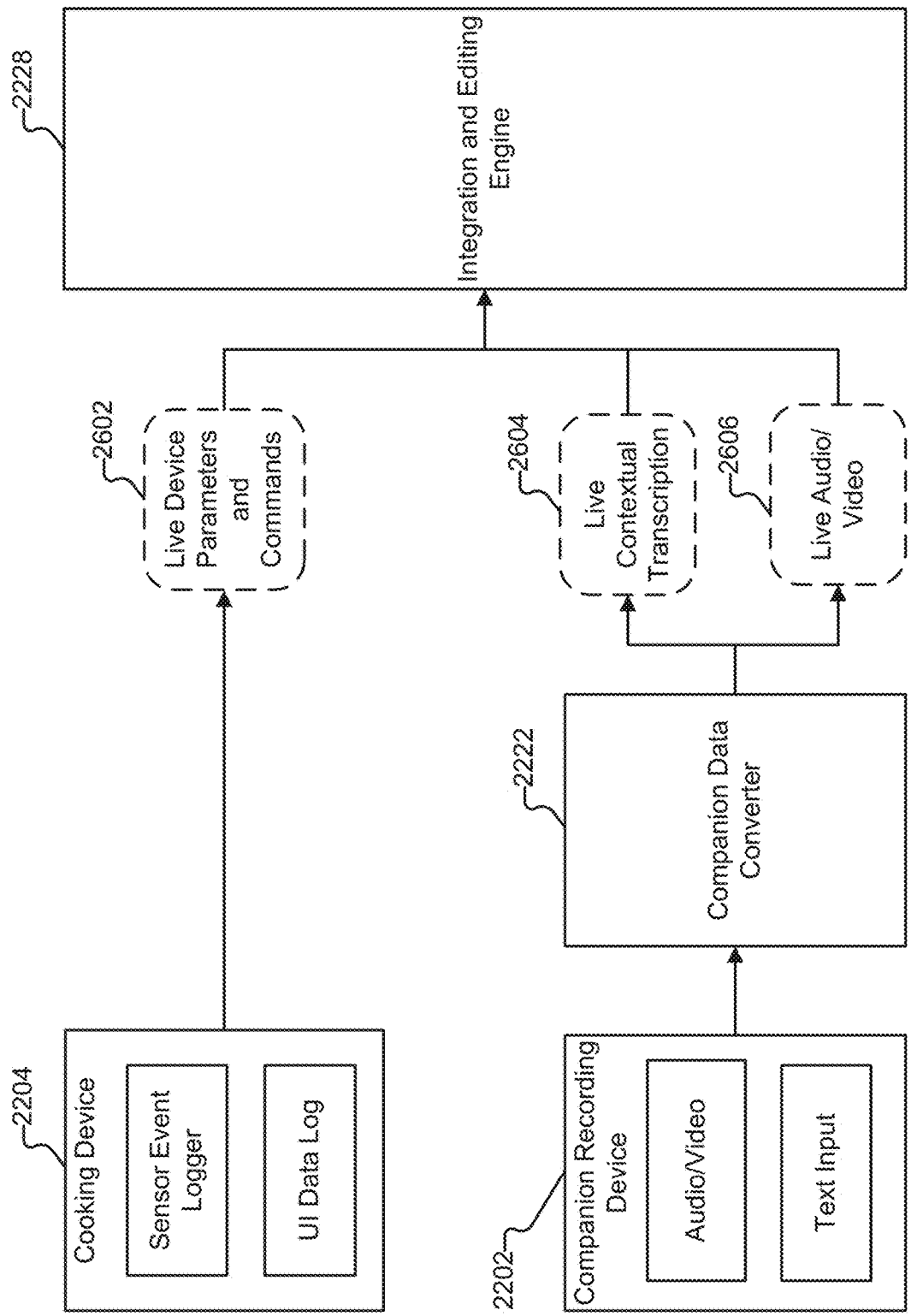
FIG. 26 illustrates an embodiment of a system for recipe live-streaming.

FIG. 26 illustrates an embodiment of a system for recipe live-streaming. In some embodiments the cooking device and the companion recording device are time synchronized. In this example, device parameters and commands determined from sensor events and data logs outputted by the cooking device in real time are combined (by the integration and editing engine 2228) with the converted output of the companion recording device 2202. In some embodiments, integration and editing engine 2228 is configured to automatically combine the live video recording with device steps via time synchronization. In this example, a live video stream recorded by the companion recording device is augmented with detected device events as they occur, including live device parameters and commands 2602 as they are registered or recorded or outputted by the cooking device 2204. For example, each time a stirring event is detected from the sensor recordings, the live stream is annotated with text indicating that stirring is occurring. The video is also augmented with UI events (e.g., user changing of temperature, setting of timers, etc.).

As one example, the integration and editing engine 2228 adds the UI and device settings to the live transcription 2604 of what the person is saying and doing (e.g., based on the processing performed by the companion data converter 2222, such as video analysis). In this example, the transcription is generated by operating companion data converter 2222 in a real-time mode, where natural language processing (e.g., speech to text and intent) and image recognition are performed in near real-time (e.g., 0.5 seconds of processing). In some embodiments, each instance of device event or command is displayed or rendered in the live video stream. In other embodiments, a first instance of a device event is displayed and held on the screen until a new, different type of device event is outputted by the device. In some embodiments, the integration and editing engine determines which type of device events or UI settings are available for rendering on live recording 2606.

Live streaming is beneficial in contexts such as live teaching or live cooking instruction. In some embodiments, to facilitate live streaming, time synchronization, such as via UTC, is performed. Buffering is also performed. An instructor device is time-synchronized with the cooking devices of remote students. Device events (e.g., device commands and parameters detected from the sensor event logs and UI data logs) can be transmitted from the instructor's cooking device to the cooking device of remote students, allowing them to follow live with what is happening with the instructor's device.

The instructor can also view a console that receives device event logs (and derived device parameters and commands) from student cooking devices. This gives an instructor a view of how cooking is progressing for individual students. The instructor can then provide specific instructions to students as needed. In some embodiments, the instructor can also send or issue device commands to student devices (e.g., to command a device to adjust temperature downwards).

In some embodiments, a student device is time delayed relative to the instructor device. In some embodiments, the integration and editing engine generates two files, an executable recipe program (that may not be augmented), and the real-time edited live stream video. In this example, the settings of the student cooking device follow the settings of the instructor's device. The student can also watch the live stream video that is coordinated with the cooking device. This allows the student and the instructor to cook together.

In some embodiments, after the cooking is completed, the recorded log of sensor events can be summarized as described above to generate recipe programs and/or text transcriptions. The live video, when completed, can also be edited using the techniques described above.

Figure 27:
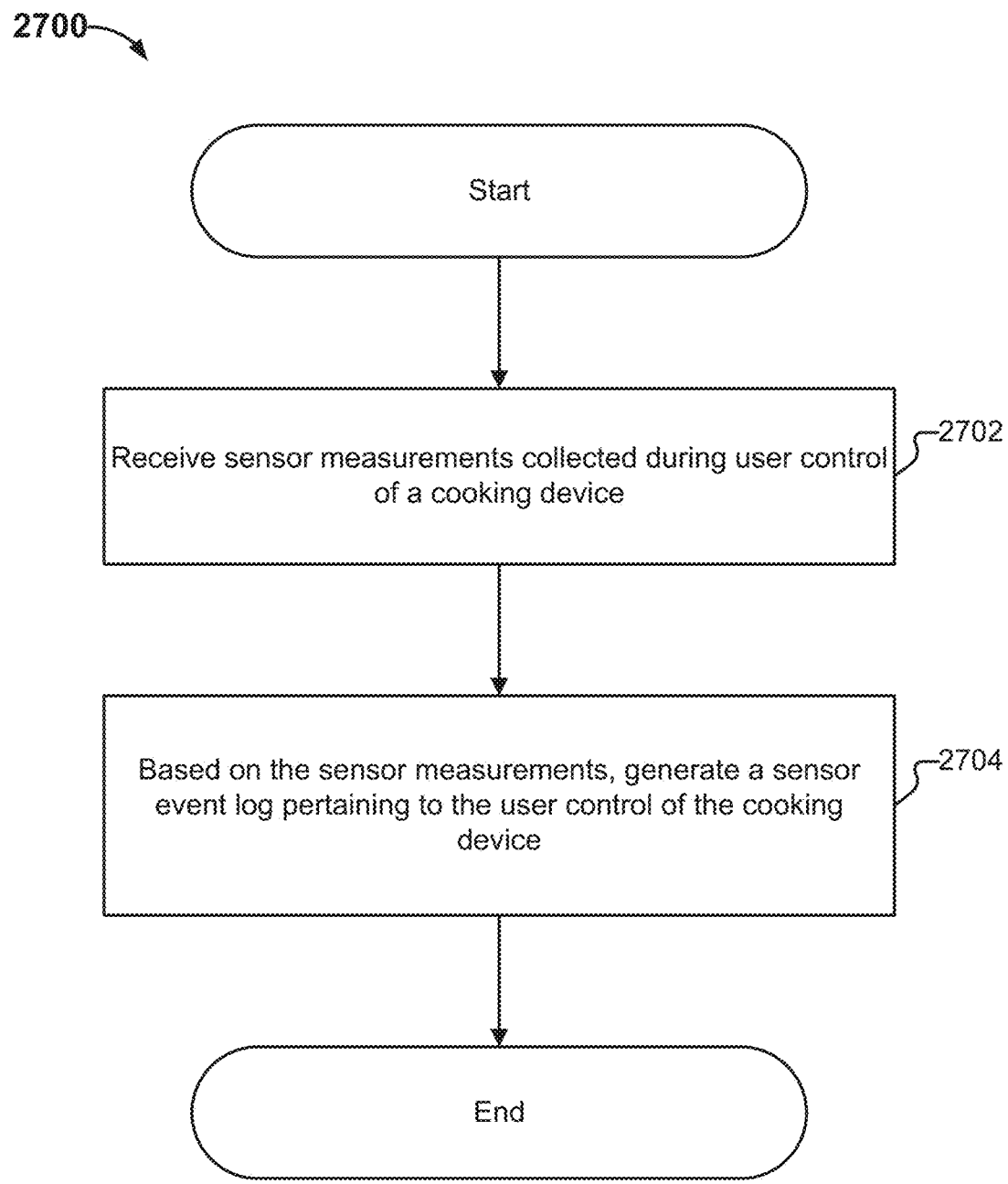
FIG. 27 is a flow diagram illustrating an embodiment of a process for recording a log of cooking events.

FIG. 27 is a flow diagram illustrating an embodiment of a process for recording a log of cooking events. In some embodiments, process 2700 is executed by cooking device 2204. The process begins at 2702, when sensor measurements collected during user control of a cooking device are received. At 2704, a sensor event log pertaining to the user control of the cooking device is generated based on the sensor measurements. Examples of sensor events include both timestamp measurements collected by onboard sensors (e.g., temperature and weight sensors), as well as timestamped UI events (e.g., recorded user interactions with the user interface, where the device is a sensor that registers and logs such user interactions). In some embodiments, the timestamped sensor events include events detected based on a pattern of combined measurements, either over time or across different sensors. A timestamp for a detected event is logged. In some embodiments, an event is detected from an evaluation of at least some of the sensor measurements. The event is logged with a corresponding timestamp in the generated log of events pertaining to the user control of the cooking device. Further examples and embodiments of detecting events from sensor measurements are described above.

Figure 28:
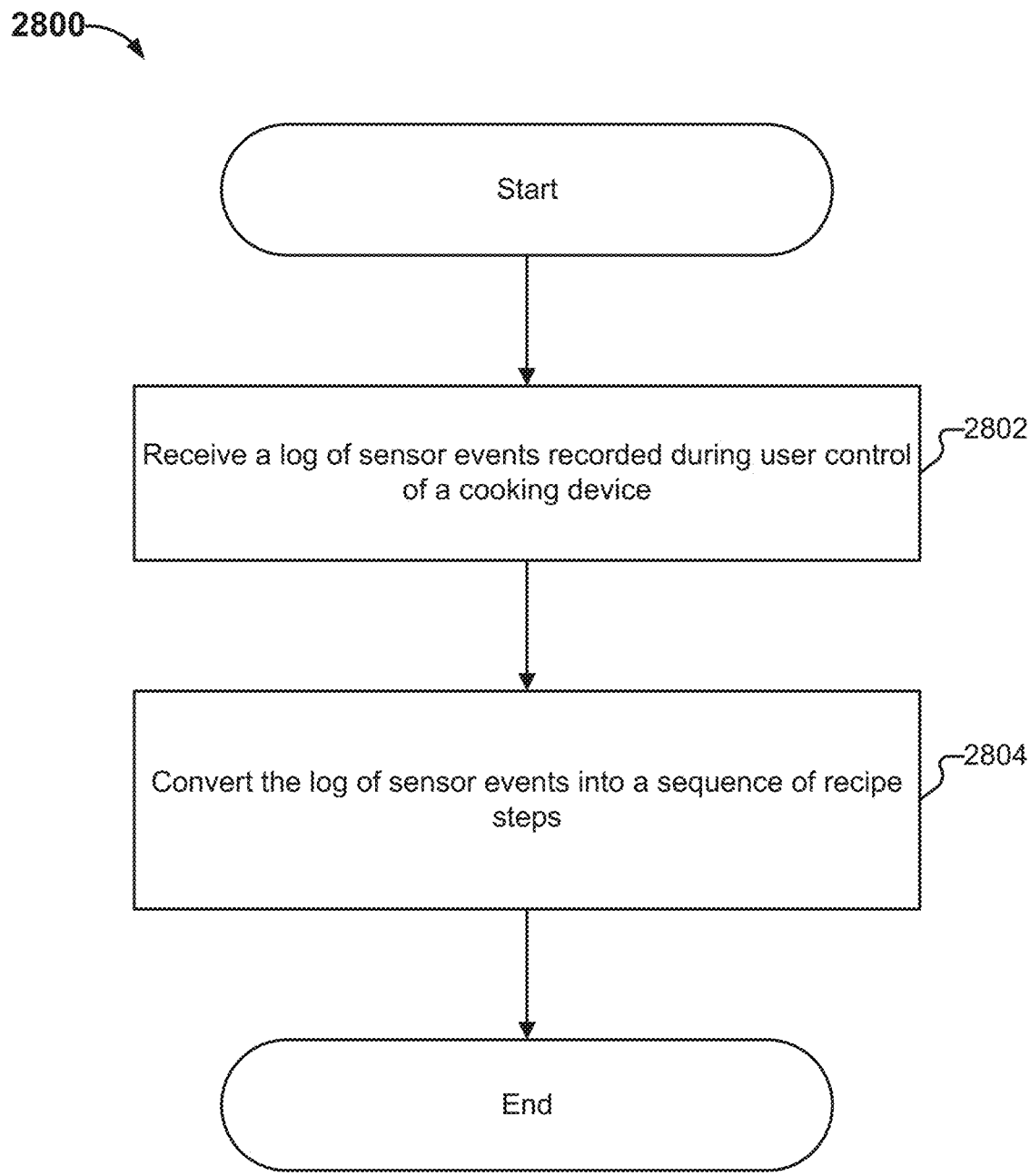
FIG. 28 is a flow diagram illustrating an embodiment of a process for converting a log of sensor events into a recipe.

FIG. 28 is a flow diagram illustrating an embodiment of a process for converting a log of sensor events into a recipe. In some embodiments, process 2800 is executed by recipe converter 2212. The process begins at 2802, when a log of sensor events recorded during user control of a cooking device is received. For example, a log of sensor events generated using process 2700 of FIG. 27 is received. At 2804, the log of sensor events is converted into a sequence of recipe steps. For example, the sequence of recipe steps is generated by summarizing the sensor events in the log of sensor events. In some embodiments, output is generated based on the conversion, such as text transcriptions and recipe programs (e.g., a programmatic transcription or summarization of the log of sensor events). Further examples and embodiments of converting sensor events to a recipe are described above.

Figure 29A:
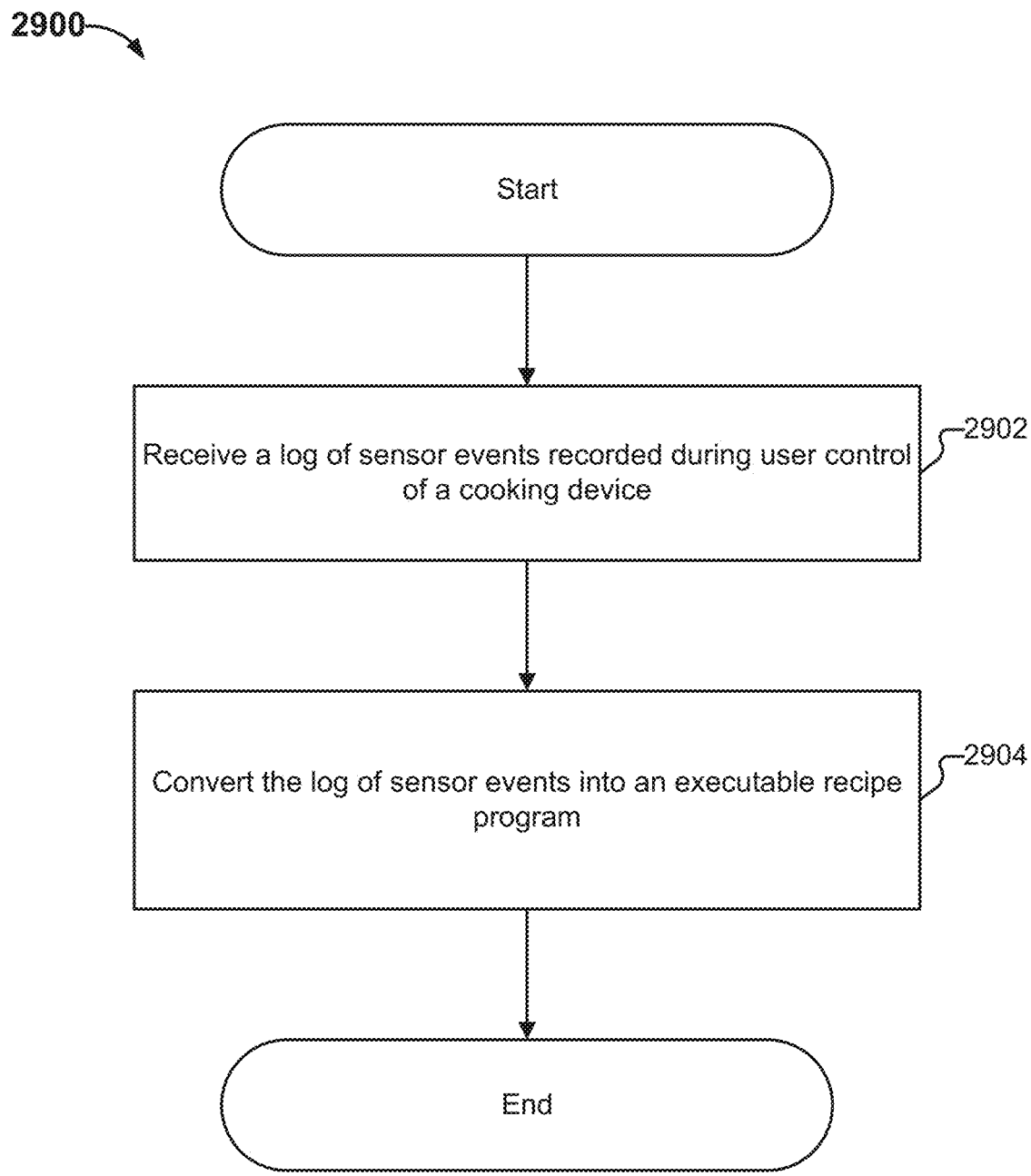
FIG. 29A is a flow diagram illustrating an embodiment of a process for generating a recipe program.

FIG. 29A is a flow diagram illustrating an embodiment of a process for generating a recipe program. In some embodiments, process 2900 is executed by recipe converter 2212. The process begins at 2902, when a log of sensor events recorded during user control of a cooking device is received. For example, a log of sensor events generated using process 2700 of FIG. 27 is received. At 2904, the log of sensor events is converted into an executable recipe program. In some embodiments, the executable recipe program includes a sequence of device commands and parameters. In some embodiments, the device commands include commands for adjusting or selecting a cooking device setting (e.g., temperature, technique, operating mode, etc.). In some embodiments, the device commands include commands for generating a prompt via a cooking device user interface. The prompts include prompts to a user to perform an action associated with a recipe step (e.g., to add ingredients, flip the ingredient, stir the ingredient, etc.). In some embodiments, a device command is associated with a device command condition that indicates when the device command is to be issued. Examples of device command conditions include time-based triggers (e.g., amount of elapsed time), event-based triggers (e.g., based on detection of certain patterns of sensor events), etc. In some embodiments, a device command is associated with one or more command parameters that specify how the device command is to be issued. In some embodiments, the device commands are generated based on summarization of sensor events in the log of sensor events. In some embodiments, the executable recipe program is augmented using contextual information. For example, the contextual information is extracted from companion content also recorded during the user control of the cooking device. One example of companion content is a companion audiovisual recording that was captured during the user control of the cooking device. Other examples of companion content include text inputs made by the user (e.g., to the cooking device or an external device), audio recordings, etc. In some embodiments, the companion content is temporally synchronized with the log of sensor events. In various embodiments, contextual information includes ingredients and user intents extracted from analysis of the companion content. In some embodiments, the recipe program (e.g., device commands and parameters) is updated or augmented with the extracted ingredients and/or user intents. Further examples and embodiments of generating recipe programs are described above.

Figure 29B:
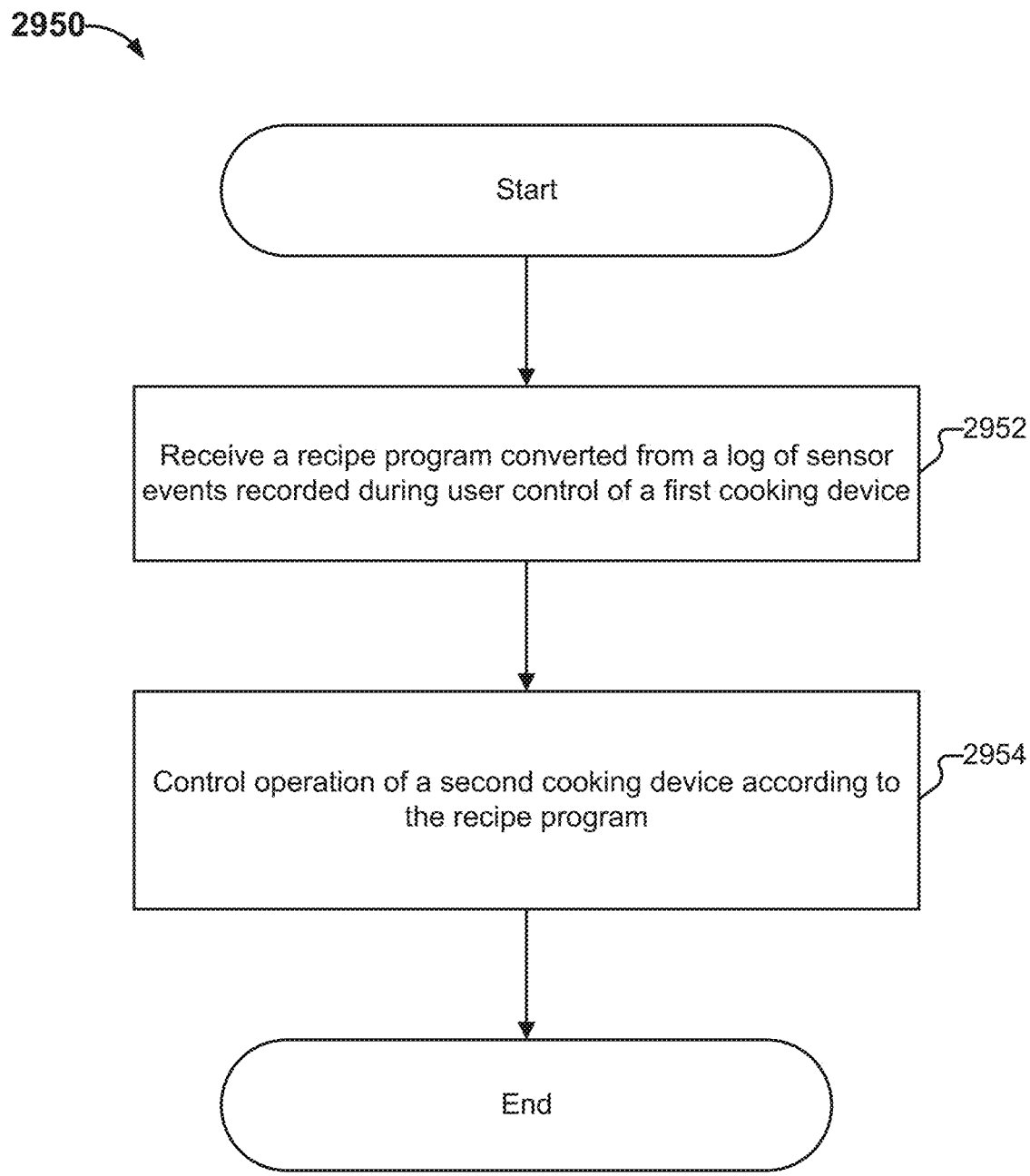
FIG. 29B is a flow diagram illustrating an embodiment of a process for playback of a recipe program.

FIG. 29B is a flow diagram illustrating an embodiment of a process for playback of a recipe program. In some embodiments, process 2950 is executed by a cooking device. The process begins at 2952, when an executable recipe program is received. The recipe program was converted from a log of sensor events recorded during user control of a first cooking device (which can be the same or different from the cooking device on which playback of the recipe program is performed). For example, the received recipe program is generated using process 2900 of FIG. 29A. At 2954, operation of a second cooking device is controlled according to the recipe program. For example, as described above, the recipe program includes a sequence of device commands and parameters. Components of the second cooking device are operated according to the sequence of device commands and parameters. In some embodiments, playback of the recipe program is coordinated with playback of a companion content recording. For example, the playback of the recipe program and playback of the companion content recording are coordinated using a synchronization signal (e.g., time signal). Further examples and embodiments of recipe program playback are described above.

Figure 30:
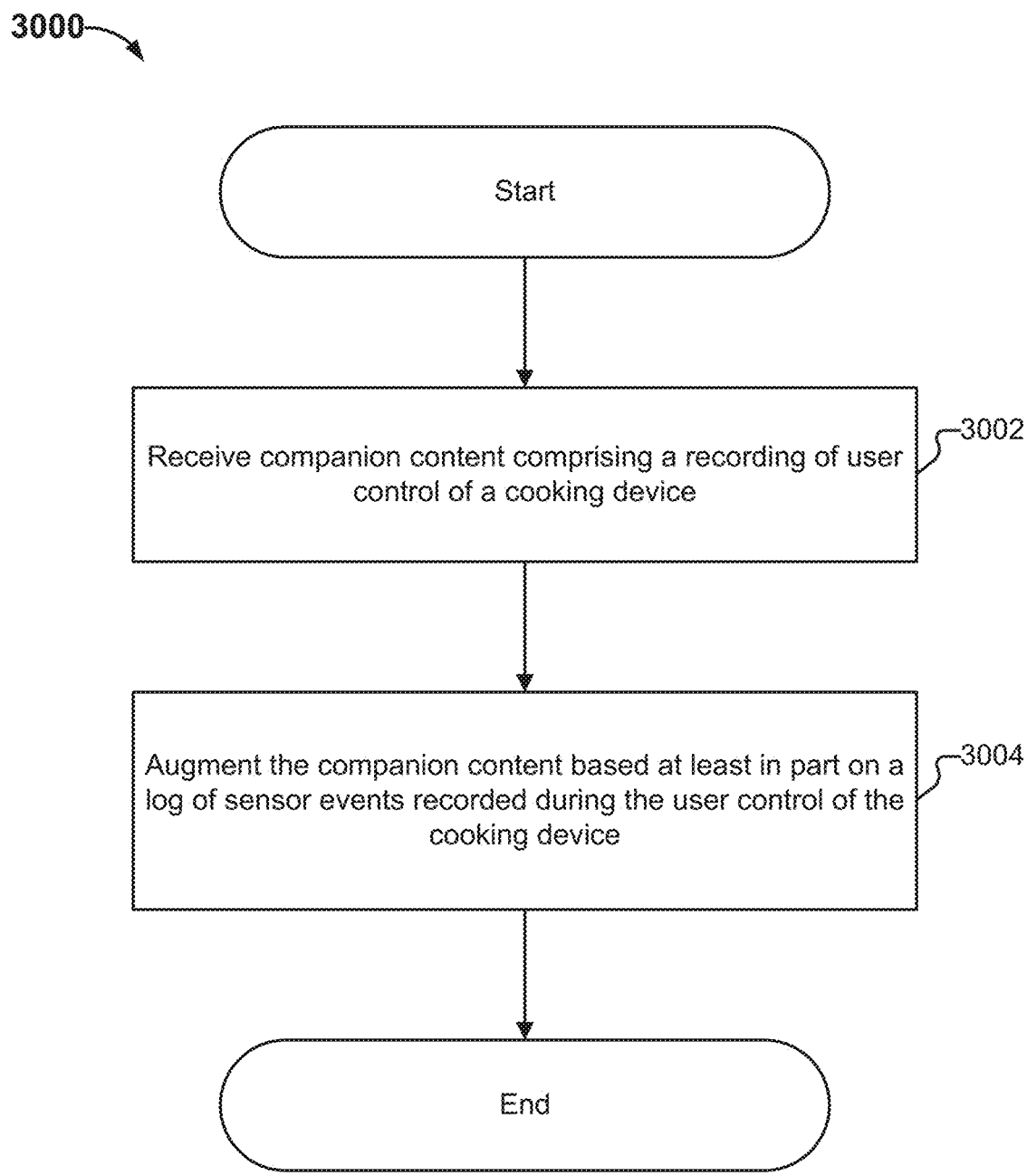
FIG. 30 is a flow diagram illustrating an embodiment of a process for augmenting companion content recorded during user control of a cooking device.

FIG. 30 is a flow diagram illustrating an embodiment of a process for augmenting companion content recorded during user control of a cooking device. In some embodiments, process 3000 is executed by integration and editing engine 2228. The process begins at 3002, when companion content comprising a recording of user control of a cooking device is received. One example of companion content is an audiovisual recording of user control of the cooking device. For example, the companion content is recorded using an external capture device that is external to the cooking device. One example of such an external device is a mobile device with sensors such as one or more cameras, microphones, etc. At 3004, the companion content is augmented based at least in part on a log of sensor events recorded during the user control of the cooking device. For example, the log of sensor events is recorded using process 2700 of FIG. 27. In some embodiments, recipe steps are synthesized based on an evaluation or summarization of the log of sensor events (e.g., using process 2800 of FIG. 28). In some embodiments, the companion content is augmented based on the recipe steps. For example, segments of an audiovisual recording corresponding to recipe steps are marked, demarcated, or otherwise indicated. For example, the log of sensor events (from which the recipe steps were derived) and the companion content are temporally synchronized. The time at which a recipe step occurs is determined from the timestamp(s) of the sensor event(s) in the log from which the recipe step was determined. The corresponding time in the temporally synchronized audiovisual recording is identified. A marker is placed at the corresponding time in the temporally synchronized audiovisual recording. The placed marker is associated with the recipe step. In some embodiments, automatic editing of the video recording, such as automatic cropping, clipping, etc. is performed based on the segmenting of the audiovisual recording based on the (summarization of) cooking device-logged sensor events.

In some embodiments, the augmented companion recording is made available for playback (e.g., on various devices such as mobile phones, tablets, laptops, desktops, etc.). In some embodiments, playback of the augmented companion recording is coordinated with playback of a recipe program on a cooking device. For example, the playback of the recipe program and playback of the companion content recording are coordinated using a synchronization signal (e.g., time signal). Further examples and embodiments of augmenting of companion content recordings are described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A cooking device, comprising:
one or more processors configured to:
recognize a type of a cookware object that is in a presence of the cooking device; and
adapt a contextual user interface of the cooking device based on the recognized type of the cookware object, wherein the contextual user interface is adapted to present maintenance information pertaining to the recognized type of the cookware object; and
a memory coupled to the one or more processors and configured to provide the one or more processors with instructions.

2. The cooking device of claim 1, wherein configuration of at least one menu presented via the contextual user interface is customized to the recognized type of the cookware object.

3. The cooking device of claim 1, wherein adapting the contextual user interface comprises determining a subset of cooking techniques that are applicable to the recognized type of the cookware object.

4. The cooking device of claim 3, wherein the subset of cooking techniques is presented via the contextual user interface as available cooking techniques for selection.

5. The cooking device of claim 4, wherein the contextual user interface is configured to present cooking technique guidance pertaining to a cooking technique selected from the presented subset of cooking techniques.

6. The cooking device of claim 1, wherein the contextual user interface is adapted to present selectable options for ingredient end-state.

7. The cooking device of claim 6, wherein the selectable options for the ingredient end-state are determined based on at least one of the recognized type of the cookware object or a selected cooking technique.

8. The cooking device of claim 1, wherein the type of the cookware object is recognized based at least in part on one or more of a tag, a weight, or a spectral fingerprint associated with the cookware object.

9. The cooking device of claim 1, wherein the one or more processors are further configured to perform automated taring at least in part by accessing weight information pertaining to the recognized type of the cookware object.

10. A method, comprising:
recognizing a type of a cookware object that is in a presence of a cooking device; and
adapting a contextual user interface of the cooking device based on the recognized type of the cookware object, wherein the contextual user interface is adapted to present maintenance information pertaining to the recognized type of the cookware object.

11. The method of claim 10, wherein configuration of at least one menu presented via the contextual user interface is customized to the recognized type of the cookware object.

12. The method of claim 10, wherein adapting the contextual user interface comprises determining a subset of cooking techniques that are applicable to the recognized type of the cookware object.

13. The method of claim 12, wherein the subset of cooking techniques is presented via the contextual user interface as available cooking techniques for selection.

14. The method of claim 13, wherein the contextual user interface is configured to present cooking technique guidance pertaining to a cooking technique selected from the presented subset of cooking techniques.

15. The method of claim 10, wherein the contextual user interface is adapted to present selectable options for ingredient end-state.

16. The method of claim 15, wherein the selectable options for the ingredient end-state are determined based on at least one of the recognized type of the cookware object or a selected cooking technique.

17. The method of claim 10, wherein the type of the cookware object is recognized based at least in part on one or more of a tag, a weight, or a spectral fingerprint associated with the cookware object.

18. The method of claim 10, further comprising performing automated taring at least in part by accessing weight information pertaining to the recognized type of the cookware object.

* * * * *